(12) United States Patent
Wright et al.

(10) Patent No.: US 8,969,435 B2
(45) Date of Patent: Mar. 3, 2015

(54) METHOD AND APPARATUS FOR ENHANCED MINIMAL SHEAR MOLDING UTILIZING EXTRUSIONAL, PELLETIZATION, AND MELT RHEOLOGICAL CONTROL OF PELLETS AND MICROPELLETS AND MOLDED OBJECTS MADE THEREFROM

(75) Inventors: Roger Blake Wright, Staunton, VA (US); Matthew Jean Tornow, Troutville, VA (US); Shawn David Newbury, Monroe, LA (US); Nathan Eugene Weaver, Berkeley Springs, WV (US)

(73) Assignee: Gala Industries, Inc., Eagle Rock, VA (US)

( * ) Notice: Subject to any disclaimer, the term of this patent is extended or adjusted under 35 U.S.C. 154(b) by 1387 days.

(21) Appl. No.: 11/846,372

(22) Filed: Aug. 28, 2007

(65) Prior Publication Data

US 2009/0062427 A1    Mar. 5, 2009

(51) Int. Cl.

| | | |
|---|---|---|
| C08K 7/16 | (2006.01) |
| B29B 9/16 | (2006.01) |
| B29C 47/80 | (2006.01) |
| B29B 9/06 | (2006.01) |
| B29B 13/06 | (2006.01) |
| B29C 47/08 | (2006.01) |
| B29B 9/12 | (2006.01) |
| B29C 47/00 | (2006.01) |
| B29C 47/68 | (2006.01) |
| B29C 47/36 | (2006.01) |
| B29K 105/00 | (2006.01) |
| B29C 47/30 | (2006.01) |

(52) U.S. Cl.
CPC ........... *B29C 47/80* (2013.01); *B29C 2793/009* (2013.01); *B29B 9/16* (2013.01); *B29B 9/065* (2013.01); *B29B 2009/125* (2013.01); *B29C 47/0011* (2013.01); *B29C 47/681* (2013.01); *B29B 13/065* (2013.01); *B29C 47/362* (2013.01); *B29K 2105/251* (2013.01); *B29C 47/687* (2013.01); *B29C 47/0869* (2013.01); *B29C 47/0009* (2013.01); *B29C 47/367* (2013.01); *B29C 47/686* (2013.01); *B29C 47/30* (2013.01)
USPC ............ 523/223; 524/543; 425/382; 264/310

(58) Field of Classification Search
USPC ............ 264/310; 523/223; 524/543; 425/382
See application file for complete search history.

(56) References Cited

U.S. PATENT DOCUMENTS

| | | | | |
|---|---|---|---|---|
| 3,627,869 A | * | 12/1971 | Walton | 264/255 |
| 3,876,613 A | * | 4/1975 | Needham et al. | 524/307 |
| 4,533,696 A | * | 8/1985 | Schrijver et al. | 524/528 |
| 5,503,780 A | | 4/1996 | Payne | |
| 5,532,282 A | * | 7/1996 | Needham | 521/93 |
| 8,597,747 B2 | | 12/2013 | Spence et al. | |
| 8,721,951 B2 | | 5/2014 | Spence et al. | |
| 2014/0048544 A1 | | 2/2014 | Spence et al. | |

FOREIGN PATENT DOCUMENTS

| | | |
|---|---|---|
| CL | 2008000552 A1 | 8/2008 |
| CL | 2008000553 A1 | 8/2008 |
| JP | H01-2534330 A | 9/1989 |
| JP | 2002532279 A | 10/2002 |
| KR | 10-1994-0000228 A | 1/1994 |
| KR | 10-1994-0000228 | 7/1997 |
| KR | 10-2003--003788 A | 5/2003 |
| KR | 10-2003-0037388 | 5/2003 |
| KR | 10-0584872 | 5/2006 |
| KR | 10-0584872 B1 | 6/2006 |
| WO | 2008074006 A1 | 6/2008 |

OTHER PUBLICATIONS

Korean International Search Report for PCT Application No. PCT/US2008/074618 dated Apr. 14, 2009.
Office Action dated Aug. 23, 2013 for related Canadian Patent Application No. 2,696,614.
Office Action and Search Report dated Jul. 29, 2013 for related Chilean Patent Application No. 2008-002544.
Office Action and Search Report dated Mar. 13, 2013 for related Chinese Patent Application No. 200880114506.8.
Office action mailed Jun. 4, 2013 for related Japanese Patent Application No. 2010-523132.
Notice to File a Response dated Mar. 19, 2013 for related Korean Patent Application No. 10-2010-7006889.
IPO Search Report dated Jun. 26, 2013 for related Taiwanese Patent Application No. 097132952.
Office Action in CL Patent Application No. 2008-002544; mailed Mar. 15, 2014.
Office Action for JP Patent Application No. 2010-523132; mailed Jul. 1, 2014.

* cited by examiner

*Primary Examiner* — Hannah Pak
(74) *Attorney, Agent, or Firm* — Troutman Sanders LLP; Ryan A. Schneider; Benjamin C. Wiles

(57) ABSTRACT

The present invention relates to a method for enhancement of the minimal shear molding process utilizing pellets and/or micropellets produced through controlled extrusional and pelletization processes in combination with nonpowder melt flow rheology that incorporates reduced molding temperature and/or reduced cure time, reduced rotation axis ratios and/or reduced rotation rates. Molding can be uniaxial, biaxial, or multiaxial rotational or oscillatory or both. The molded items produced can be single or multiple layers and can be produced in one or more molding sequences using similar or different chemical compositions.

28 Claims, 49 Drawing Sheets

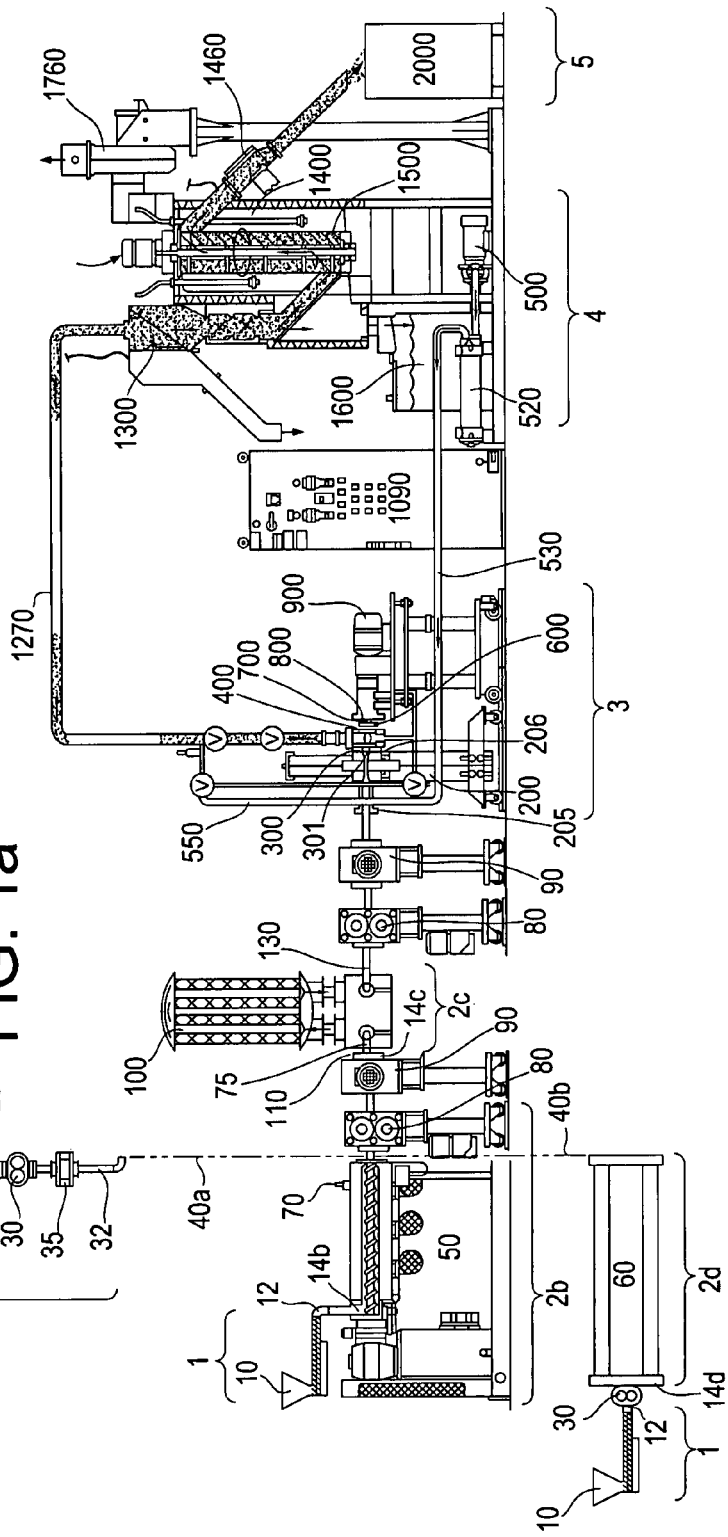
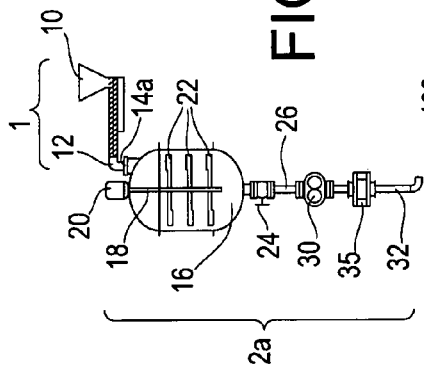
FIG. 1
FIG. 1a
FIG. 1b

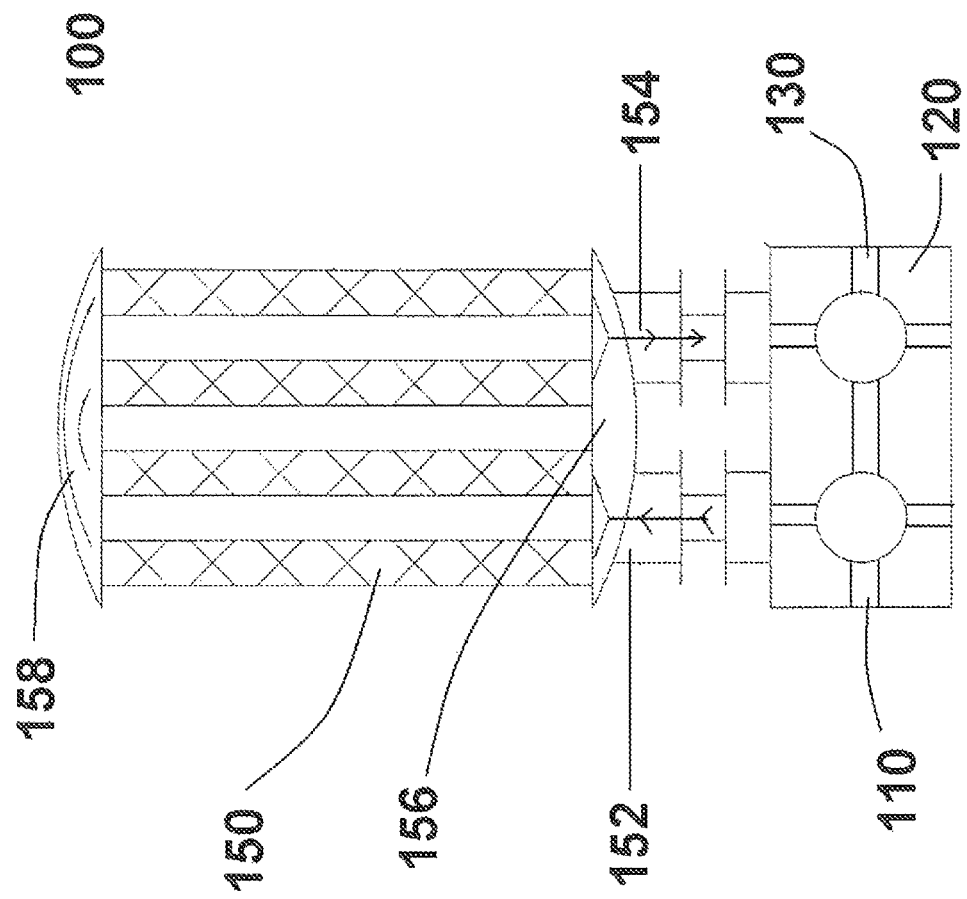

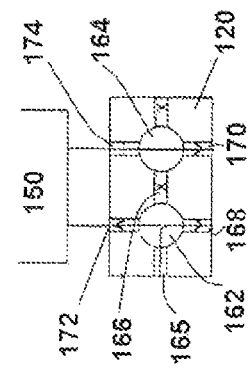
FIG. 4a
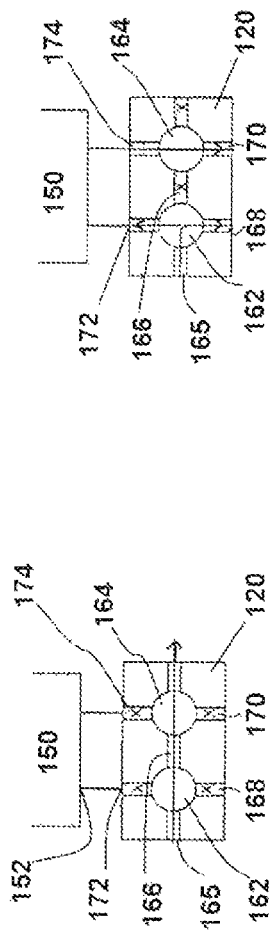
FIG. 4b
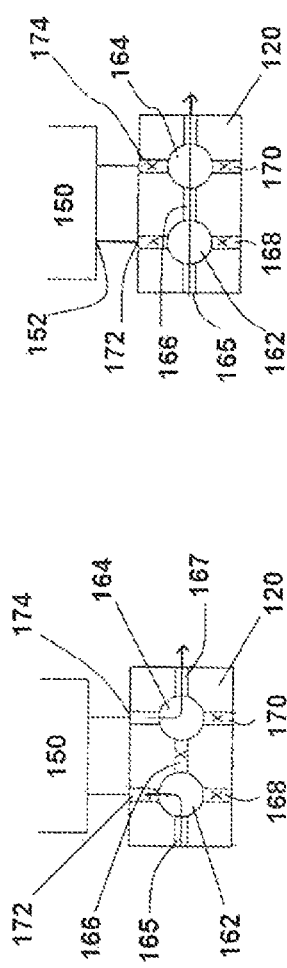
FIG. 4c
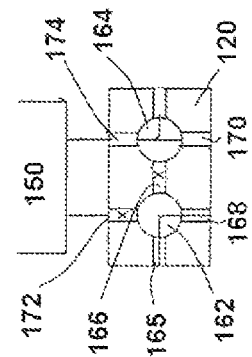
FIG. 4d
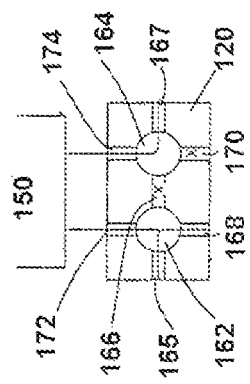
FIG. 4e
FIG. 4

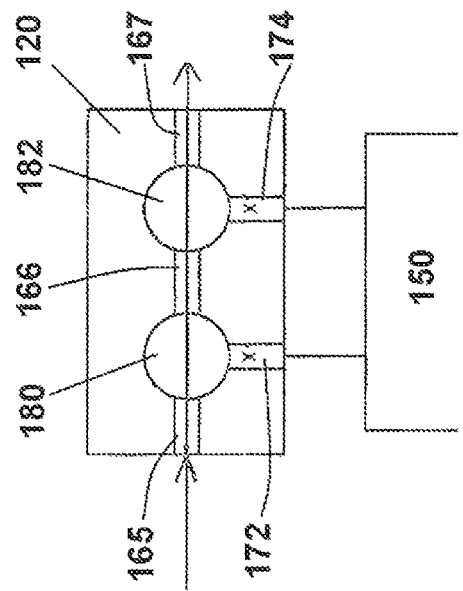
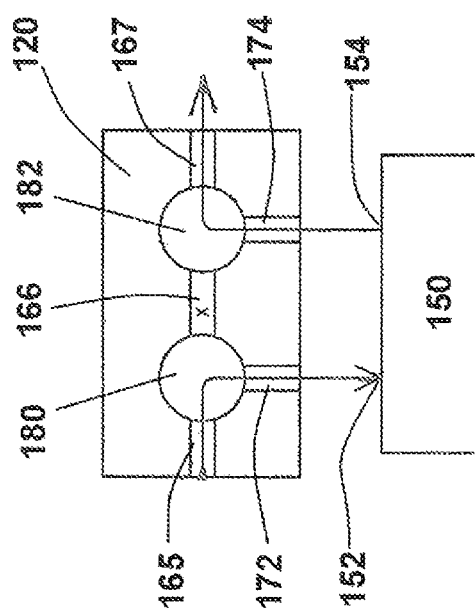
FIG. 5a
FIG. 5b
FIG. 5

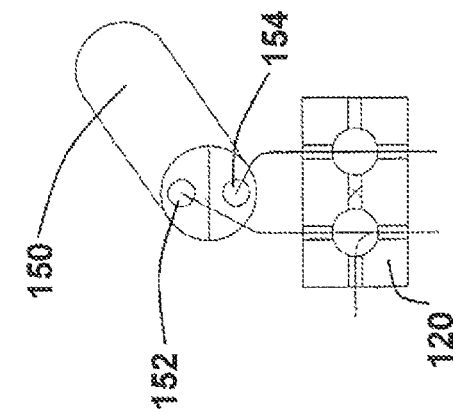
FIG. 6a
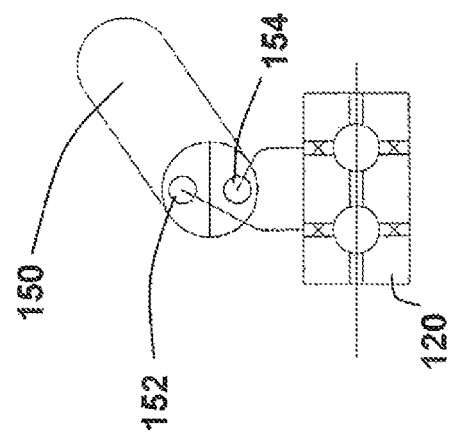
FIG. 6b
FIG. 6
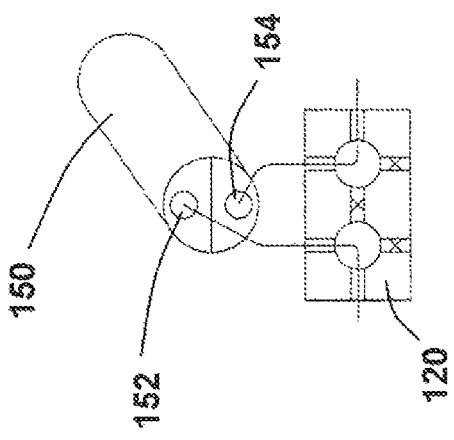
FIG. 6c

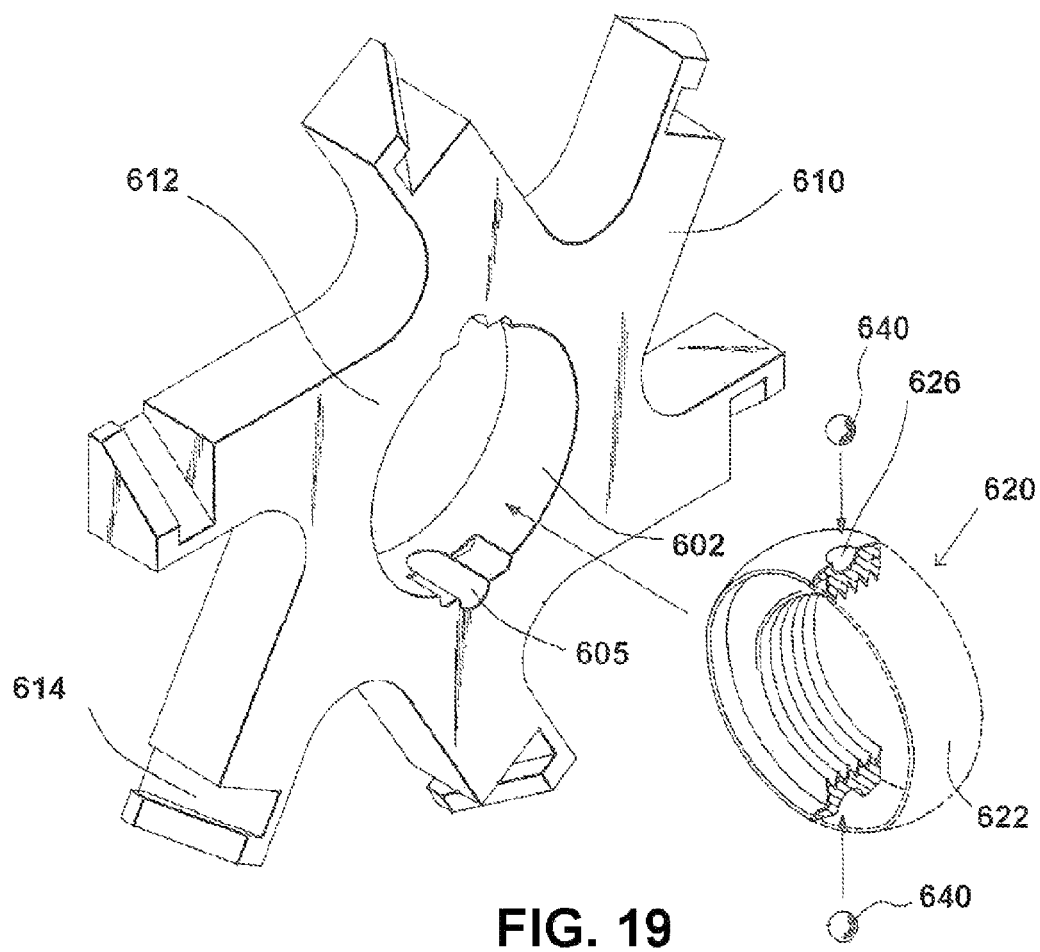
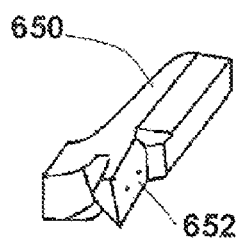
FIG. 20a
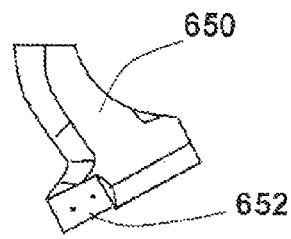
FIG. 20b
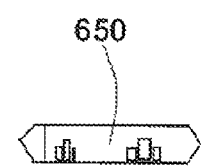
FIG. 20c

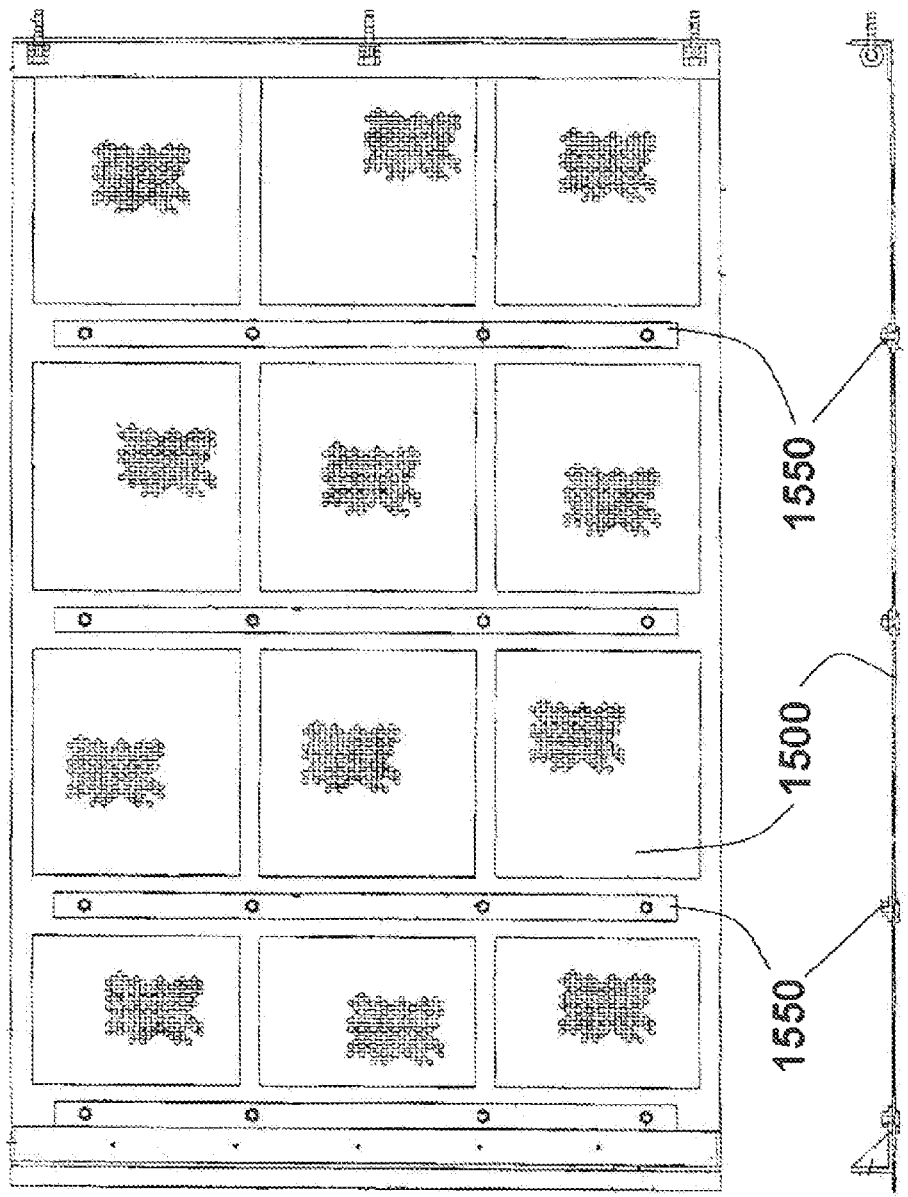

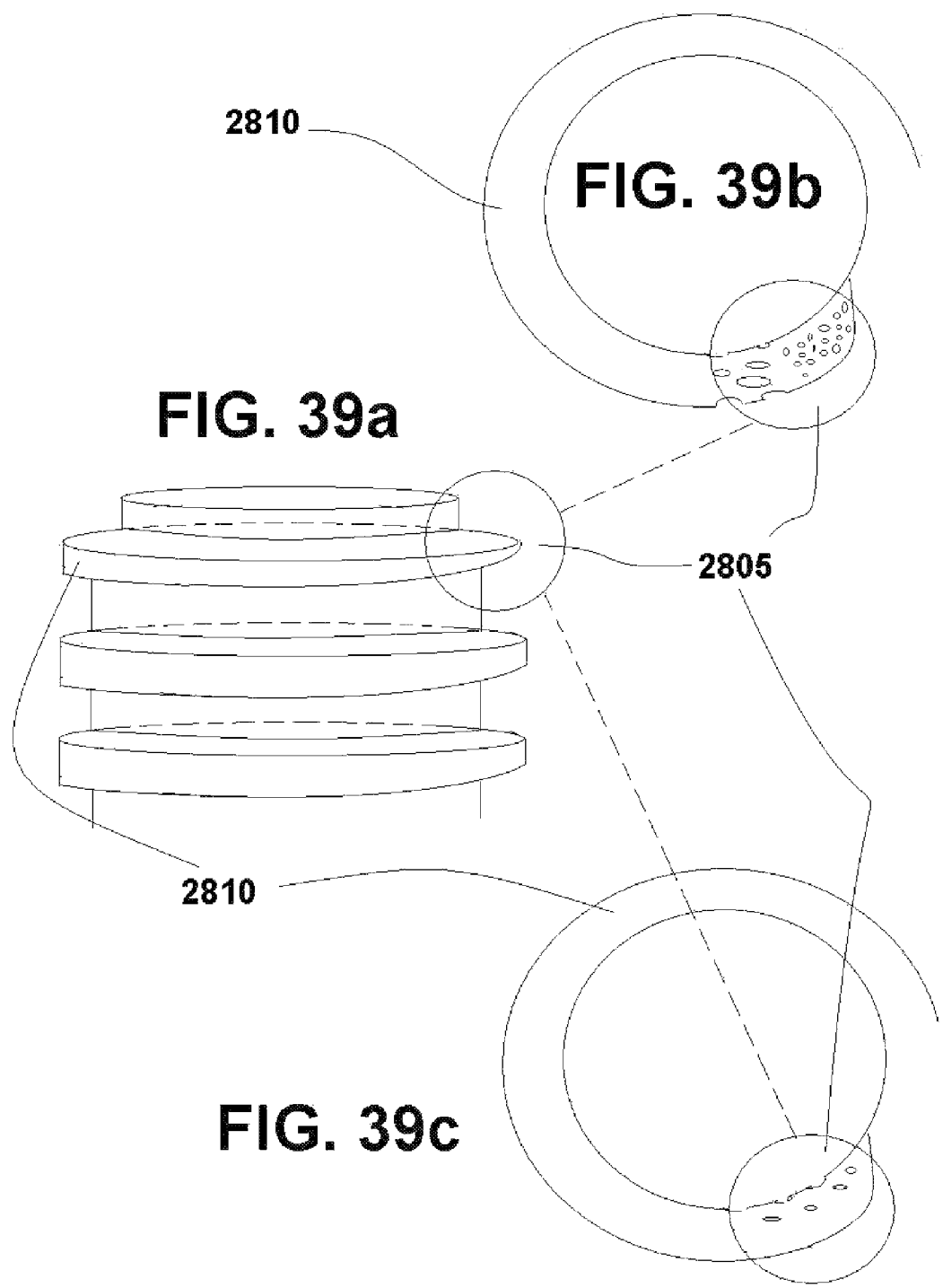

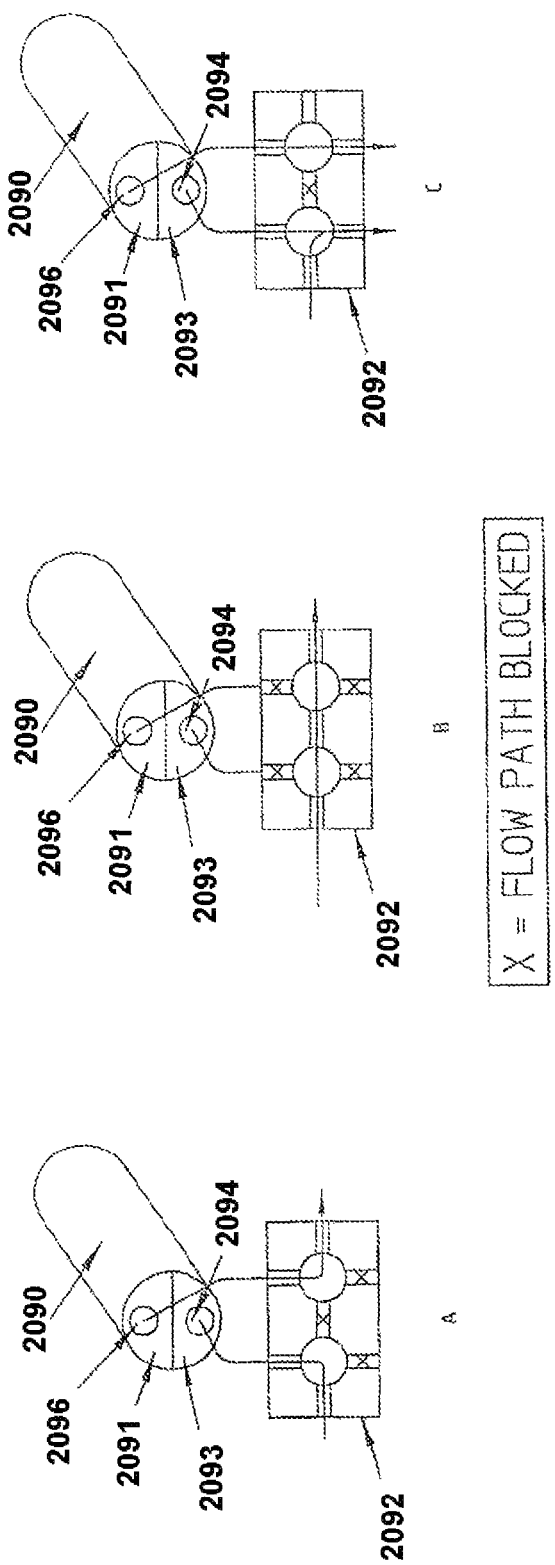

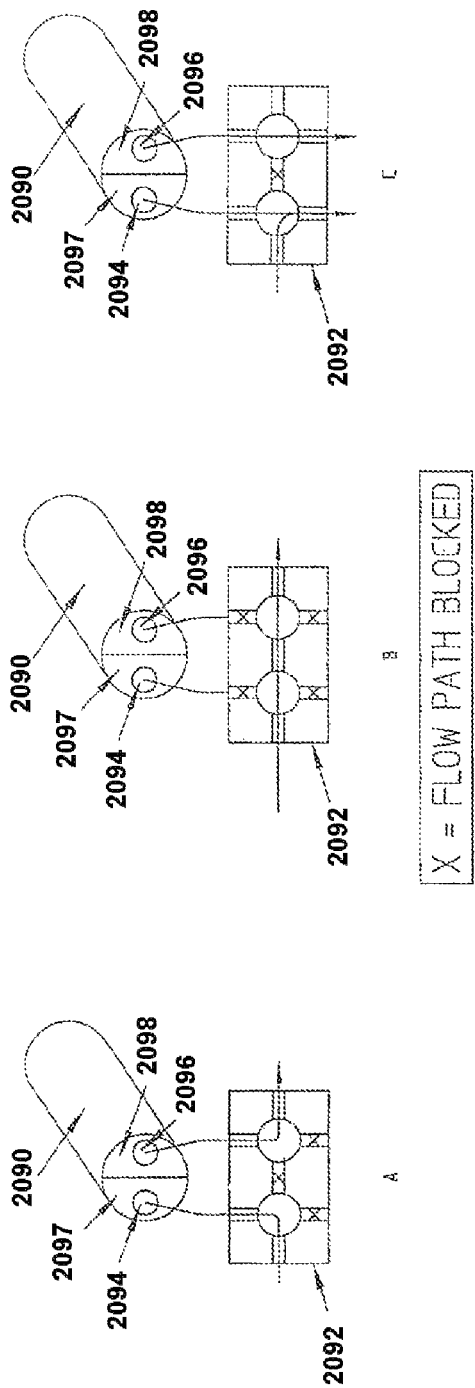

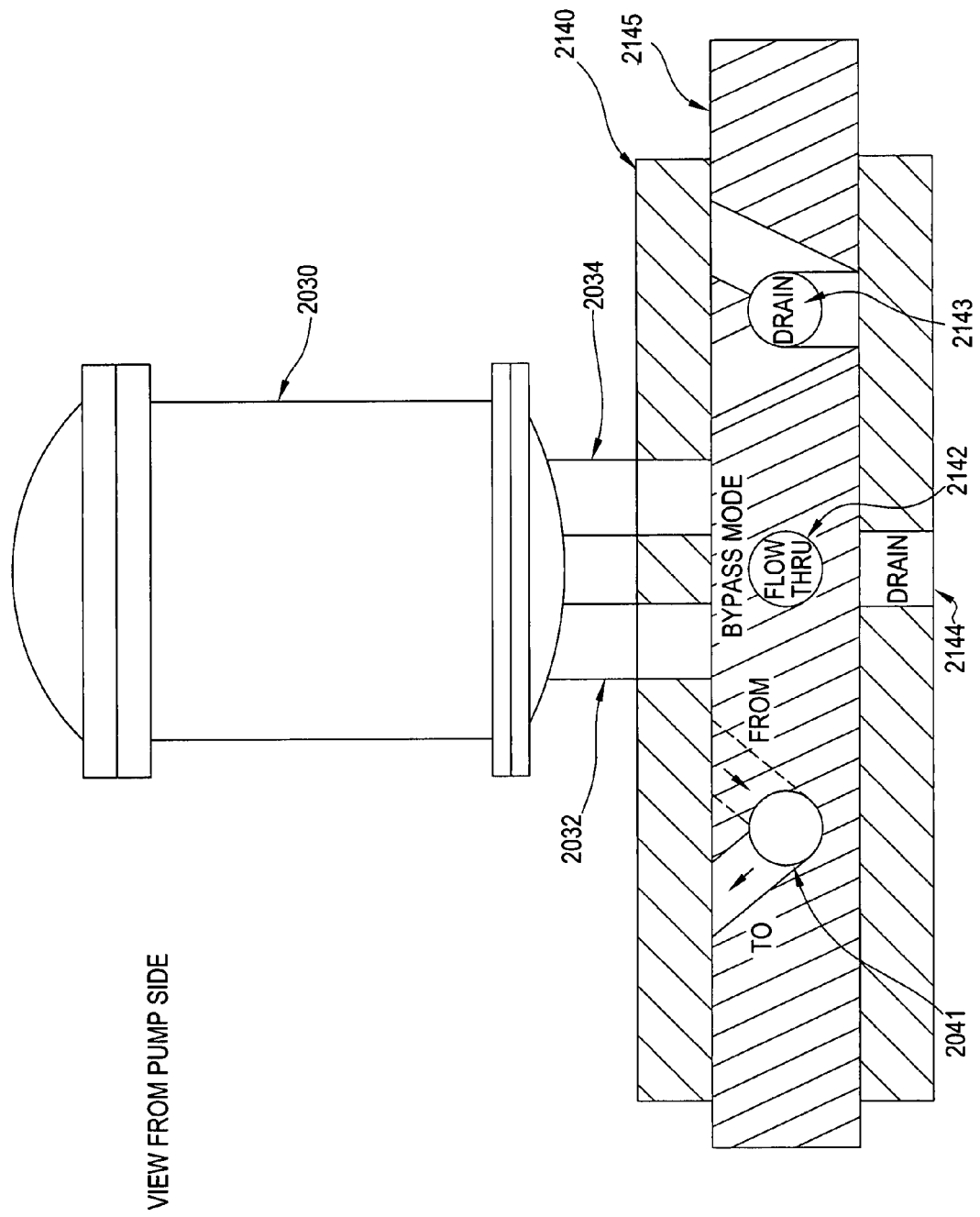

METHOD AND APPARATUS FOR ENHANCED MINIMAL SHEAR MOLDING UTILIZING EXTRUSIONAL, PELLETIZATION, AND MELT RHEOLOGICAL CONTROL OF PELLETS AND MICROPELLETS AND MOLDED OBJECTS MADE THEREFROM

BACKGROUND OF THE INVENTION

1. Field of the Invention

The present invention relates generally to a nonpowder process to extrude pellets, more particularly micropellets, to control the size and shape of the pellets as well as retain the chemical integrity of the pellets insuring they are as free as possible of undesirable degradation, premature oxidation, discoloration, premature reaction, expansion, or cross-linking, and to further insure they are of approximately uniform mixture or blend of composition for use in uniaxial, biaxial, and multiaxial minimal shear molding to facilitate enhancement of process temperature, rotation ratios, and rotation rates in view of conventional processes.

2. Description of the Prior Art

Individual processes and equipment for extrusion, pelletizing, drying, conveying, rotational molding, and rock-and-roll molding generally have been known and used in various applications. Separately, chemistries involved in this art have been known. The application of these processes and equipment to the possible chemistries and the extension to enhancement of the minimum shear processes of rotational and rock-and-roll molding has not been readily apparent from the prior art disclosures, and is a focus of the present invention.

Pelletization equipment and its use following extrusion processing has been introduced and/or utilized in applications by the assignee for many years as is exemplified by prior art disclosures including U.S. Pat. Nos. 4,123,207; 4,251,198; 4,500,271; 4,621,996; 4,728,176; 4,888,990; 5,059,103; 5,403,176; 5,624,688; 6,332,765; 6,551,087; 6,793,473; 6,824,371; 6,925,741; 7,033,152; 7,172,397; US Patent Application Publication Nos. 20050220920, 20060165834; German Patents and Applications including DE 32 43 332, DE 37 02 841, DE 87 01 490, DE 196 42 389, DE 196 51 354, DE 296 24 638; World Patent Application Publications WO2006/087179, WO2006/081140, WO2006/087179, and WO2007/064580; and European Patents including EP 1 218 156 and EP 1 582 327. These patents and applications are all owned by the assignee and are included herein by way of reference in their entirety.

Similarly, dryer equipment has been introduced and used in applications following extrusion and pelletization for many years by the assignee as demonstrated in, for example, U.S. Pat. Nos. 3,458,045; 4,218,323; 4,447,325; 4,565,015; 4,896,435; 5,265,347; 5,638,606; 6,138,375; 6,237,244; 6,739,457; 6,807,748; 7,024,794; 7,172,397; US Patent Application Publication No. 20060130353; World Patent Application Publication No. WO2006/069022; German Patents and Applications including DE 19 53 741, DE 28 19 443, DE 43 30 078, DE 93 20 744, DE 197 08 988; and European Patents including EP 1 033 545, EP 1 602 888, EP 1 647 788, EP 1 650 516. These patents and applications are all owned by the assignee and are included herein by way of reference in their entirety.

Minimal shear molding equipment including but not limited to rotation molding and rock-and-roll molding equipment and following from slush molding equipment are similarly disclosed in, for example, U.S. Pat. Nos. 2,629,131; 2,893,057; 3,134,140; 3,315,314; 3,350,745; 3,564,656; 3,676,037; 3,703,348; 3,788,792; 3,810,727; 3,822,980; 3,825,395; 3,841,821; 3,843,285; 3,914,105; 4,022,564; 4,247,279; 4,671,753; 4,705,468; 4,738,815; 4,956,133; 4,956,135; 5,022,838; 5,039,297; 5,188,845; 5,238,379; 5,705,200; 6,030,557; 6,296,792; 6,338,623; 6,511,619; 6,555,037; and 6,604,931; US Patent Application Publication No. 2006/0257518; Canadian Patent No. 2 025 267; Japanese Patent Application No. JP 2005028803; and World Patent Application Publication No. WO 1999/056930. These patents and applications are included herein exemplarily by way of reference and are not limited.

Various pulverulent materials have also been utilized for minimal shear molding including polyethylenes and other polyolefins, vinyl esters and other vinyl polymers, fluoropolymers, polyamides, polyesters, polycarbonates, acrylonitrile-butadiene-styrene (ABS) copolymers, and reactive polymers such as cross-linkable polyethylene (XLPE). Additive packages have been introduced to confer antioxidant stabilization, thermal stabilization, ultraviolet (UV) stabilization, pigmentation, flow modification, processing modification, plasticization, foaming, and cross-linking capabilities by way of example.

Le Roy Payne has introduced equipment and methodology through, for example, U.S. Pat. Nos. 4,671,753; 4,671,991; 4,749,533; 4,909,718; 4,956,133; 4,956,135; 5,011,636; 5,022,838; 5,173,221; 5,188,845; 5,238,379; 5,316,701; 5,503,780; 5,507,632; 5,705,200; 6,030,557; 6,296,792; 6,511,619; 6,555,037; Canadian Patent No. CA 2 025 267; and World Patent Application Publication No. WO 1999/056930 included herein by way of reference that demonstrate the use of pourable polymerizably reactive polyurethane or polyester rotational molding in one or more axes of rotation in optional combination with oscillatory or rock-and-roll processing to generate rotomolded parts. The use of microspheres as additives to at least one of the polymerizable liquid ingredients is demonstrated in U.S. Pat. No. 6,555,037 but is silent on the use of pellets or micropellets as described in the current invention.

Early references for rotational molding composition include use of pellets that were typically more cylindrical and often were ground to provide powders. U.S. Pat. No. 3,514,508 discloses the use of preferably 20 mesh to 50 mesh particles of polyethylene, polypropylene, and polyvinyl chloride in that oven temperatures of 350° F. to 950° F. (approximately 177° C. to 510° C.) are suggested with an inert gas such as nitrogen or carbon dioxide present inside the mold to confer a degree of positive pressure. Larger size particles to two (2) millimeters (mm) are disclosed. An acrylonitrile-butadiene-styrene (ABS) resin containing additives was prepared in sizes ranging from a minus 10 mesh to plus 100 mesh for rotational casting as disclosed in U.S. Pat. No. 3,935,143. Masterblends are disclosed in U.S. Pat. No. 4,508,859 wherein the resin particles and additives are mixed below the softening temperature and this blend upon transfer to an intensive mixer softens the granules sufficiently without fluxing to allow the additive to be absorbed into or onto the granule. Some rounding of the resin granules is anticipated and U.S. Pat. No. 4,508,859 describes use of a 30 or 35 mesh screen to remove unacceptably large granules. U.S. Pat. No. 4,624,818 discloses nylon granules ranging in size from 12 to 35 mesh containing abrasive resistant components preferably ranging in size from 24 mesh to 500 mesh. Similarly, U.S. Pat. No. 4,970,045 discloses the formation of pellets or powder of polyamides and ionomeric copolymers for rotational molding. Controlled pelletization to achieve reproducible particle size distributions, uniform blends, and/or optimized molded article quality or performance was not disclosed.

As described in U.S. Pat. No. 5,525,274, microspheres are prepared wherein polyurethane is extruded and flaked and then mixed with other additives including plasticizers the combination of that is then re-extruded through orifices ranging from 0.007 inches (") to 0.040" (approximately 0.178 mm to 1.02 mm). Similarly, polyurethane, polypropylene, polyethylene, polystyrene or polyvinyl chloride is blended with additives including plasticizer in that the resin comprises 50% to 55% of the mixture with extrusion to generate particles dimensionally equivalent as described above. An objective of the U.S. Pat. No. 5,525,274 appears to be to lock the plasticizer into the resin matrix to obtain a cast part of uniform thickness and free of "backside irregularities". A 50,000 to 150,000 molecular weight range for polyvinyl chloride (PVC) is disclosed as well as that lower molecular weight resins reduce the process temperature and decrease the cycle time.

U.S. Pat. No. 5,525,284 is a divisional patent of U.S. Pat. No. 5,525,274 wherein the highly plasticized microspheres are rotationally cast using a predetermined charge size equal to or greater than the weight of the part being molded or are slush-molded to form thin plastic shells.

U.S. Pat. No. 5,654,102 is a divisional patent of U.S. Pat. Nos. 5,525,274 and 5,525,284 wherein the composition of the microspheres containing plasticizer and limited to 50% to 55% resin are disclosed to be polyurethane, polypropylene, polyethylene, polystyrene, polyvinyl chloride, or epoxies or alloys thereof.

U.S. Pat. Nos. 5,998,030 and 6,410,141 are patents that are continuations-in-part to U.S. Pat. Nos. 5,525,274; 5,525,284; and 5,564,102 and extend the molecular weight range from 2,000 to 150,000. Plasticizer remains a component, although optional, and the resin level in an example therein is within the 50% to 55% range as heretofore described. These patents require that pigment be present and at a level less than 5% by weight.

A pelletizer die for extrusion of micropellets is described in U.S. Pat. No. 5,597,586 that requires a multiplicity of die holes arranged in groups concentrically about the face of the die in that at least one of the groups is composed of die holes of uniform diameter but different than the other groups or in that subgroups within the groups of die holes are uniform in diameter but different than the other subgroups of that group. It has been found that excessive pressure generation and freeze-off effectively blocking at least some of the die holes in practice and this has proven problematic for attempts at implementation.

U.S. Pat. No. 4,238,537 discloses the use of a mixture of pellets and powder both composed of various ethylene vinyl acetate copolymers for rotational molding. The specification discloses that the pellets are typically ⅛ inch by ⅛ inch (approximately 3.2 mm by 3.2 mm) and the powder is ground between 20 mesh and 50 mesh. The disclosed blend is from 50% to 80% pellets and inversely from 50% to 20% powder. Molding is generally done between 500° F. and 625° F. (approximately 260° C. to 329° C.). Complete coalescence of pellet and powder is not requisite according to U.S. Pat. No. 4,238,537 wherein it is disclosed that the pellets retain their particle characteristics at least in part.

European Patent No. EP 0 755 761 and U.S. Pat. No. 5,585,419 disclose the use of micropellets, 0.028 inch to 0.051 inch (approximately 0.7 mm to 1.3 mm) in diameter, in combination with powder, 0.012 inch to 0.035 inch (approximately 0.3 mm to 0.9 mm) and irregularly shaped, of similar composition for use in rotational molding. Similarly U.S. Pat. No. 5,886,068 discloses use of two different micropellet sizes of similar composition wherein the micropellets have a diameter from 0.024 inch to 0.039 inch (approximately 0.6 mm to 1.0 mm) in combination with the larger size ranging from 0.028 inch to 0.051 inch (approximately 0.7 mm to 1.3 mm). Materials disclosed include polyvinyl chloride, polyethylene, polypropylene and Surlyn. Oven temperatures of 600° F. to 800° F. (approximately 316° C. to 427° C.) are maintained wherein the melting temperature is listed at 400° F. to 550° F. (approximately 204° C. to 288° C.). Rotation ratios of 3.75:1 or multiple equivalents are disclosed and large pellet sizes are discouraged as they are disclosed to require longer time to melt and thus fuse after the powder or smaller micropellets have already begun to lay down on the surface of the mold. U.S. Pat. No. 5,886,068 is silent regarding an attempt at separation of layers or use of different materials.

Similarly, U.S. Pat. Nos. 6,433,086 and 6,682,685 describe a rotational molding process using a combination of polyethylene pellets and ground polyolefin powder of the same composition wherein the powder is from 20% to 30% or 20% to 50%, respectively, of the weight of the blend. A single layer is formed from this resin blend that, following U.S. Pat. No. 6,682,685, can include reinforcing fibers to improve structural properties. U.S. Pat. No. 6,833,410 discloses fibers including organic, inorganic, and mineral reinforcing fibers utilized at a loading level of 10% to 80% by weight of a comparable resin pellet to resin powder blend wherein the resin composition is not disclosed.

U.S. Pat. No. 3,368,013 discloses sintering only the edges of various shaped pellets to make multi-vented hollow articles. Similarly, pellets of less than ⅛ inch (approximately 3.2 mm) are sintered according to U.S. Pat. No. 6,030,558 to make porous plastics. The size of the porosity is controlled by the pellet size and sintering is done at temperatures sufficient to only fuse the outside surfaces of the pellets. Note is made of the very narrow particle distribution size range that is particularly beneficial in an application such as selective filtration. For low density polyethylene temperatures are cycled from ambient to 320° F. (approximately 160° C.) and then cooled over a five (5) minute period where particle sizes are 0.031 inch (approximately 0.8 mm). For particle sizes larger than this, cycling as above is followed with heating from two (2) to four (4) minutes at 320° F. (approximately 160° C.) prior to cooling.

WO 2000/035646 demonstrates the use of polyolefin pellets ranging from two carbon to ten carbon monomers, particularly ethylene and propylene, in that the distribution of the particle sizes should meet the criterion of a maximum value of one (1) for a ratio of the difference of the size distribution of an average 0.035 inch (approximately 0.9 mm) particle size and that of an average 0.004 inch (approximately 0.1 mm) particle compared to that of an average 0.020 inch (approximately 0.5 mm) particle size distribution and should contain a water content less than 0.1% by weight according to claim 1. An apparatus requiring at least one additive to be combined with the polyolefin in a mixer, an extruder and pelletizer, a dewatering centrifuge and a fluidized bed drier is described. Rotational molding of the claimed material is also disclosed. WO 2000/035646 describes the residual water content as being no more than 1% by weight. Us Patent Application Publication No. 2005/0228118 is a divisional patent of U.S. Pat. No. 6,894,109 that is itself a divisional patent of U.S. Pat. No. 6,573,314 and only claims minimal or no presence of pinholes in a rotationally molded article. U.S. Pat. No. 6,894, 109 reduces this water content to a value less than 0.1% as disclosed in the herein cited WO 2000/035646.

U.S. Pat. No. 6,632,525 discloses the manufacture and use of a plastic particle with a diameter ranging from 0.007 inch to 0.040 inch (approximately 0.18 mm to 1.0 mm) that has a protruding ring on the outer surface of that particle. The ring can be continuous or non-continuous and is produced in an additional heating step following extrusion, pelletization, and cooling of the original pellet sans ring.

Multilayer molded articles have been described in the literature as well. U.S. Pat. No. 3,542,912 discloses the use of a mixture of granules 35 mesh or finer in that the components to form individual layers differ in melting point by at least 10° F. (approximately 5° C.). The individual components are described as immiscible and rotation rates of 20 to 100 rotations per minute (rpm) are described. Oven temperatures are necessarily disclosed at a minimum 20° F. (approximately 11° C.) above the melting point of the highest melting component and typically are maintained at 550° F. (approximately 288° C.). Inner layers, and the higher melting layer, exemplarily include nylon, polycarbonate, acetal, polyphenylene oxide, polysulfones and polyester. The highest melting layer necessarily should also have a higher density than at least one of the other layers. The external, hence lower melting, layer for nylon is suggested to be composed of polyethylene, polypropylene, polyurethane, polystyrene, cellulose acetate, cellulose propionate, cellulose acetate butyrate, acrylonitrile-butadiene-styrene, polyphenylene oxide, polysulfone, styrene-butadiene or polyvinyl chloride. For polycarbonate inner layers only nylon is recommended. Acetal, polyester, or polysulfone inner layers complement polyethylene or polypropylene outer layers. Three layer structures composed of nylon-acetal-polyethylene or polypropylene or alternatively of polycarbonate-nylon-polyethylene or polypropylene.

Sequential formation of layers of similar composition is disclosed in U.S. Pat. No. 3,627,869 where particles ranging from 10 mesh to 400 mesh are deemed acceptable with 16 mesh (0.047" or approximately 1.2 mm) to 50 mesh (0.012" or approximately 0.3 mm) considered suitable for rotational molding. Rotation speeds of 10 to 20 rpms are disclosed with oven temperatures given as ranging from 500° F. to 700° F. (approximately 260° C. to 271° C.) or higher with 650° F. (approximately 343° C.) preferred. Polyolefin homopolymers or copolymers were cited in each layer. Similarly, U.S. Pat. No. 4,548,779 generates a first higher melting outer layer then cools the mold and introduces the material to form the inner layer. Preferentially the outer layer is polyamide and the inner layer is polyolefin.

Japan Patent Abstract Publication No. JP 03-000216 discloses a multi-step multi-layer article rotationally molded from powder at approximately 460° F. (approximately 238° C.) wherein each layer is separately charged into the mold. Japan Patent Abstract Publication No. JP 2006-095928 similarly discloses a two-step two-layer process wherein the second material, nylon, is introduced into the mold through a feed nozzle. U.S. Pat. No. 6,982,057 similarly discloses the two-step two-layer process wherein polyethylene, polypropylene or nylon is used as the first layer and the inner layer should be transparent. Oven temperatures of 375° F. to 650° F. (approximately 191° to 343° C.) are described exemplarily of that linear low-density polyethylene was molded at a rotation ratio of 8:2 and 540° F. (approximately 282° C.). The first layer is fashioned to be sufficiently thin to allow removal of an insulating member such that the second flowable component can be poured through the exposed gap. By way of example, the clear second layer now seals over the gap to form a sight line.

Multilayer articles utilizing foamable layers have been made using rotational molding as well. U.S. Pat. No. 3,419,455 discloses a decorative object made from a thermoplastic outer shell and a rigidifying inner can be a layer or can completely fill the inner chamber of the molded article. A skin of reactable resin is introduced into a mold containing a capsule of foaming agent and subjected to rotational molding according to U.S. Pat. No. 3,527,852. Once the skin layer has been formed the foaming agent is controllably released to generate a foamed core article. Similarly, U.S. Pat. No. 3,541,192 introduces a plastisol for formation of the skin layer and then introduces a second foamable or expandable plastisol for controlled generation of the foamed core. U.S. Pat. No. 3,914,361 generates an outer skin and inner foamed core utilizing a plastic powder and a larger expandable particulate simultaneously charged into the sealable mold. Heating from outside melts powder to form the crust and then expands larger particulates to generate the foamed interior.

U.S. Pat. No. 3,936,565 introduces a sandwich structure in that the first layer is charged into the mold and uniformly coated onto the mold surface. The first layer is preferably a cross-linkable polyethylene and the molding temperature is sufficiently controlled to prevent complete cross-linking. On completion of the melt laydown of layer one a second, preferably foamable, layer is charged into the mold and similarly layered without foaming. An optional third layer is also disclosed on the inner surface of layer two and the cross-linking and foaming operations are performed simultaneously to complete the molding process.

U.S. Pat. No. 5,532,282 discloses the simultaneous introduction of a small non-expandable powder, typically 20 to 50 mesh and a considerably larger expandable granule or pellet that is typically 0.040" to 0.15" (approximately 1.0 mm to 3.8 mm) in diameter and 0.040" to 0.125" (approximately 1.0 mm to 3.2 mm) in length and is specifically disclosed as not needing to be a sphere. Oven temperatures of 580° F. (approximately 304° C.) are cited exemplarily. It is postulated that the smaller particulate melts preferentially allowing the larger pellets to form a second layer and subsequently foam after the first layer is formed. Both a foamed layer and a foamed core are disclosed. The skin-forming layer can be cross-linkable as presented. U.S. Pat. Nos. 5,783,611, 5,830,392, 5,922,778, and 6,038,434 utilize similar methodologies in that improvements of surface properties are achieved by disclosure of carefully controlled chemical formulation and blending. This concept is further extended in U.S. Pat. No. 6,180,203 to include the use of reclaimed material in the larger, higher melting layer that forms the inner skin layer. This additionally provides optional reinforcement rods and a foamable layer between the inner and outer skin of the molded and expanded item.

A mixture of high zero-shear viscosity and low zero-shear viscosity polymeric materials and a third foamable core-forming component are disclosed in U.S. Pat. No. 5,928,584. The patent describes the high viscosity material as a wall-forming barrier that layers against the inner mold surface and forms a barrier to the foamable component preventing its contact with the mold wall. The low viscosity component, that is preferentially cross-linkable, serves as a binding element for the wall-forming layer and the inner foamable core-forming component.

Cross-linkable polyolefins and other reactive resins are well-known in rotational molding and include reactive residual components in the polymeric structure or incorporate "additive packages" that generate bonds, typically by free radicals or other covalent linkages, between portions of proximally located polymers. These additive packages typically include a cross-linking agent, a multifunctional material, and a facilitating agent to enhance the likelihood of cross-linking. Exemplary prior art discussion includes U.S. Pat. Nos. 3,876,613; 3,969,475; 4,029,729; 4,088,714; 4,267, 080; 4,414,340; 4,526,916; 4,587,318; 4,678,834; 4,808,364; 4,857,257; 4,900,792; 5,260,381; 5,367,025; 6,528,585; and 6,610,768. Additional examples include US Patent Application Publication Nos. 2005/02024338; 2005/0261430; and 2005/0261443.

Various products are made by rotational molding including toys, chemical storage tanks, water tanks, vehicular fuel tanks, and automotive parts. Decorative effects in polymers have been disclosed including marbling and nacreous effects of salt additives in U.S. Pat. No. 2,330,108 as well as granite-like effects from incorporation of a multiplicity of particulates of comparable or equal density to, isopycnic, and suspended in, typically a transparent or translucent matrix as demonstrated in U.S. Pat. No. 5,304,592.

It is the object of the present invention to provide a cost effective method to prepare reproducible pellets and micropellets by controlled extrusion and pelletization with appropriate drying of rotomolding and extrusional grade materials and rotomolding and extrusional formulations including additives such that minimal or no degradation or undesirable reaction of the components or pellets occurs and to use those pellets to form quality single or multiple layer molded articles utilizing minimal shear rotational and oscillatory processes, including slush-molding, capable of utilizing, in view of the conventional processes, lower processing temperature, reduced processing time, reduced rotation ratios and reduced rotation rates, reducing storage volumes, facilitating in-mold devolatilization, reduction of bridging, ease of transport, safety of operation, reduction of dust hazards, and lower shipment costs by increasing intermediate bulk density such that the nonpowder processes produce a product comparable or superior to the industry standard powder-based products in impact strength, permeability, reproducibility of production, intricacy and trueness of mold detail, uniformity of layer thickness, integrity of layers, bond strength between layers, interlayer uniformity, minimization of bubbles and pinholes and sinks or pockmarks, reduction or elimination of porosity, inner surface quality, structural integrity, gel formation, uniformity of pigmentation and decorative effects.

BRIEF SUMMARY OF THE INVENTION

Briefly described, in preferred form, the present invention is a nonpowder process to extrude micropellets, to control the size and shape of the micropellets as well as retain the chemical integrity of the micropellets. These controllably produced micropellets are used in accordance with the extant invention in minimal shear molding such as rotational or rock-and-roll processes, and they facilitate considerable savings in energy costs by reduction of the process temperature and/or process time as well as reduce the wear and tear on the equipment by allowing considerable reduction in rotation ratios and/or rotation rates of the one or more rotational support arms.

It has been found that transport of the micropellets is greatly simplified and shipping costs are tremendously reduced by virtue of the significantly increased bulk density of the micropellets as compared with the more standard bulk powders of the industry. The use of extruded micropellets extends the scope of usable materials by allowing the direct preparation of materials not traditionally marketed for minimal shear molding through uniform incorporation of antioxidant, ultraviolet, and other stabilizer packages including thermal stabilizers for improving the preparation lifetime in the mold as well as post-molding lifetime.

The micropellets are more reproducible in structure, being more spherical in geometry, and have a more controllable surface area that significantly impacts the rotational mechanisms by that the material is layered onto the surface of the mold in accordance with the present invention. This control allows facile extension of the one layer molding process to the multiple layer process in that the layers can be formed sequentially or in a single charge of material into the mold. Layering of the multi-component charge can be achieved by at least one of several mechanisms including, but not limited to, melt temperature, softening temperature, pellet size, pellet density, melt density, melt viscosity, melt flow, surface properties including wettability of melt for metal surface or underlayers, and differences of polarity or chemical composition.

The use of micropellets also in accord with the current invention enhances control of pigmentation to achieve uniformity of coloration or to effect marbling or other decorative effects. Use of the more spherical micropellets significantly improves the inside molded surface properties and allows greater control of bubble and pinhole removal and devolatilization of low-boiling components that can be by-products, processing aids, or excipients used in or generated by the extrusion, pelletization, melt formation, layering, reaction, and/or molding process or processes. The process as described herein does not negatively impact the quality of the item being molded as compared with the quality of the contemporary art of traditional powder molding processes.

Prior art has demonstrated the effectiveness of using powders in minimal shear molding to generate asundry articles from toys to pipe liners to automotive parts to boats to tanker tanks holding thousands of gallons and even to tanker liners. Limitations of the powder technology have also been documented exemplary of that include irregularity and nonreproducibility of particle size and shape, variation in particle size distribution, problematic flow dynamics, irregularities of melt and subsequent lack of uniformity in laydown during molding, problematic volumes in small or intricate molding in particular affected by bulk density constraints, undesirable bridging and inconsistency in laydown for intricate or constrictive mold designs, nonuniformity of wall thickness in molded article, instability of powder components during grinding leading to potential degradation or discoloration, as well as maintenance, operational, and safety concerns from potential dust, inhalation, fire, and explosion hazards.

Materials that can be used and/or formulated for minimal shear molding applications have traditionally been limited in variety and particular grades or formulations have often been unexpectedly removed from the market leading to challenges for the molder.

Pellets have also been initially introduced to the market as typically undesirably cylindrical in shape and often of sufficiently undesirably large size to pose limitations in their utility due in part to the challenges in melting and uniformity of laydown resulting in unacceptable or poor quality end-products. As pellet sizes decreased with increasingly sophisticated manufacturing equipment, their utility has been brought to the market following closely in processing typically with the original powder molding conditions thus necessitating significant plasticization, assuming the need for uniformity of distribution of components throughout the multiplicity of particles, requiring combination with powders or pellets of differing size, assuming the need for pellet sizes comparable to powders or even smaller, and/or utilizing excessive heating or aggressive rotation sequences. The result of that has often been poor molding quality, lack of uniform laydown and irregular mold surfaces, significant problems with pinholes or formation of sinks and pockmarks, nonuniformity of composition or pigmentation or wall thickness, limitation of material considerations restricting the scope of useful materials and thus of useful end-products, and even necessitating risky or unsafe production manipulations to achieve desirable effects of structural or barrier properties such as multiple layer formation.

What is needed then is a method of generating relatively consistent and reproducible pellets or micropellets that are easily conveyable and can readily be incorporated into minimal shear molding processes that optionally contain additives including various stabilizer packages for enhancement of the pelletization process or the molding process or the shelf-life of the end-product alone or in combination, reactive polymers or formulations for improvement of structural strength or barrier properties or impact strength or modification of flexural properties, pigments or ultraviolet absorbers, heat absorption or reflection components, and the like. With the pellets and micropellets thus generated, it is desirable to have a method for the molding process that is energetically attractive, reduces maintenance of the equipment through less aggressive molding techniques, improves the quality of the molding process and ultimately the molded part, eliminates the expense and inconsistency of grinding, and is more cost effective for transport and storage.

The present invention is a composition for minimal shear molding, a process of minimal shear molding, and an apparatus for minimal shear molding.

In a preferred embodiment, both the present composition and process operate within four parameters to provide a novel and non-obvious composition and process. In another preferred embodiment, an apparatus such that pelletization, transport, and drying of pellets/micropellets does not degrade, prematurely react, expand, prematurely cross-link, and otherwise alter the chemical composition of the pellets/micropellets for use in minimal shear molding.

In one preferred embodiment, the present invention is a composition for minimal shear molding of at least one layer, wherein the composition includes at least one of pellets, micropellets, and powders. The preferred composition comprises at least one chemical composition that can simultaneously form the at least one layer such that, for example, the following four parameters are met. Firstly, the composition for a single layer contains less than 20% of the minor component, and the size of the powder, if used, does not have to be smaller than the size of the pellet. Secondly, the pellets, micropellets, and powders used to form each layer in multiple layers are compositionally different such that each layer is compositionally different. Thirdly, combinations of one size pellet and one size micropellet are not used for a single layer. And last, a single layer is not formed from powder alone.

The present chemical compositions can include polymers, copolymers, additives, and combination thereof. Further, the polymers, copolymers, and additives can contain reactive functionalities, which can be cross-linkable. The reactive functionalities can be modified by chemical reaction, including expandable.

The polymers of the present invention can be polyolefins, polyamides, polyesters, polycarbonates, polyurethanes, polyethers, cellulosics and copolymers thereof.

The polyolefins of the present invention can be ultra-low density polyethylene, linear low density polyethylene, low density polyethylene, medium density polyethylene, high density polyethylene, polypropylene, alkyl and aryl substituted vinylics, halogenated and polyhalogenated vinylics, polyvinyl esters, polyvinyl alcohol, and copolymers thereof.

The polymers, copolymers, and additives of the present invention can be amorphous, crystalline, and combination thereof.

The additives of the present invention can compositionally include rheology modifiers, cross-linking facilitating agents, antioxidant agents, ultraviolet stabilizers, thermal stabilizers, pigments, fillers, fibers, nucleating agents, expanding agents, tackifiers, detackifiers, pellet coatings, plasticizers, waxes, processing aids, and pelletizing aids. The additives can be single-component and multi-component formulations.

Pellets and micropellets of the present invention can include many geometric configurations, including spherical to lenticular in geometric configuration.

The pellets and micropellets of the present invention preferably can be controllably pelletized such that degradation, expansion, premature reaction, and premature cross-linking are minimized.

In another preferred embodiment of the present invention, the pellets and micropellets contain less than approximately 0.5% fines Pellets of a preferable chemical composition of the invention are preferably between approximately 0.7 mm and approximately 3.5 mm in cross-section, more preferably between approximately 0.7 mm and approximately 1.6 mm in cross-section, and most preferably between approximately 0.7 mm and approximately 1.0 mm in cross-section. Micropellets of the present invention are smaller than approximately 0.7 mm in cross-section The pellets and micropellets of the present invention preferably can be conveyed, transported, and stored without blocking together and without being obstructive to the conveyance and transport equipment.

Further, a composition of the present invention preferably contains one size pellet/micropellet of one chemical composition for each layer formed.

In another preferred embodiment, a method of minimal shear molding is providing comprising providing at least one of pellets, micropellets, and powders, and simultaneously forming at least one layer of a molded part with the at least one of pellets, micropellets, and powder. The preferred composition comprises at least one chemical composition that can simultaneously form the at least one layer such that, for example, the following four parameters are met. Firstly, the composition for a single layer contains less than 20% of the minor component, and the size of the powder, if used, does not have to be smaller than the size of the pellet. Secondly, the pellets, micropellets, and powders used to form each layer in multiple layers are compositionally different such that each layer is compositionally different. Thirdly, combinations of one size pellet and one size micropellet are not used for a single layer. And last, a single layer is not formed from powder alone.

The present method can be one wherein molded parts can be made that are not discolored and in which the inner surface is smooth without flow irregularities, such that the part has minimal to no surface imperfections including pinholes, bubbles, sinks, and pockmarks.

The present method can utilize molding temperatures at least 25° C. below molding temperatures of 35 mesh powder of comparable composition, even more preferably at least 50° C. below, more preferably at least 75° C. below, and most preferably at least 100° C. below molding temperatures of 35 mesh powder of comparable composition.

A method according to the present invention can provide molding ratios reduced from a range of 10:1 to 4:1 typical for 35 mesh powders of comparable composition to a range from 5:1 to 3:1.

The present method can provide molding rotation rates reduced from a range of 6 rpm to 20 rpm typical for 35 mesh powders of comparable composition to a range of 1.75 rpm to 6 rpm.

The present method provides molding process times that are reduced at least 10% over those for 35 mesh powders of comparable composition, more preferably, reduced at least 15%. The molding process times preferably are reduced by a combination of lower process temperatures, shorter cooling times, and more efficient transfer of heat to approximately uniform pellet surface area than to the irregular surface area typical of 35 mesh ground powders.

The present method can be one in which minimal shear molding occurs rotationally in at least one axis, uniaxially; or in at least two axes, biaxially; or in more than two axes, multiaxially.

The present minimal shear molding can occur rotationally and be continuous and circular in at least one axis. Alternatively, the minimal shear molding can occur rotationally and be arcuate and oscillatory in at least one axis. Further, the minimal shear molding can occur rotationally and be continuous and circular in combination with arcuate and oscillatory in at least two axes. Additional, the minimal shear molding can occur rotationally and continuously in at least two axes.

The rotation rates in different axes need not be equivalent.

The present minimal shear molding can include rotation in an enclosed oven, rotation over open flame, and rotation in a jacketed mold. Different zones can be differently heated and heating can be achieved using at least one method including infrared radiation, electricity, gas, oil, and steam.

The partial layers can be formed using arcuate and oscillatory motion.

The layers can be formed by sequential addition of components.

The interface between layers can be smooth, distinct, uniform, and contain few to no bubbles.

The present method can provide the sequential addition of components done manually by controlled release, and more preferably, wherein the sequential addition of components is done thermally by controlled release.

The present method preferably limits the separation of layers on cooling and storage. Further, the process can include the addition of an adhesive layer molded between layers to prevent the separation of layers on cooling and storage.

All components for all layers can be simultaneously charged into the mold to form layers without sequential addition of components.

The separation in layers can involve conditions including at least one of differential melt viscosity, melt density, pellet size, pellet density, softening temperature, melting temperature, polarity, component immiscibility, surface dynamics, and surface wetting, and combinations thereof.

Successful separation of layering can be achieved by variance of at least one parameter including rotation rate, rotation ratio, composition, molding process temperature, molding process time, and combinations thereof.

Adhesion of two layers formed can be achieved by admixture at the interface between those two layers.

The present method can utilize a mold of many suitable materials, including metal and ceramic, which is compatible with the composition being molded.

The mold can be vented or unvented, and the addition of material to the mold can be achieved through the vent, an orifice and combinations thereof.

The higher bulk density of pellets and micropellets of the present invention can allow single charges of the material into a mold which commonly involve multiple charges for 35 mesh powders of comparable composition.

The reactive materials of the present process can be satisfactorily molded to effect the reaction.

The method can provide the cross-linking of the molded part.

Further, expansion of a foaming agent can be achieved.

The present method can utilize a range of compositions, the choice of which can include pellet geometries, compositions, and dimensions. The choice of composition can include pellet geometries, compositions, and dimensions purely for decorative purposes. Further, the choice of materials can include materials which do not melt to provide decorative inclusions. The choice of materials and molding conditions can allow variation of surface patterning and color for decorative effects.

The choice of materials and molding conditions can include use of oversize pellets, low melt index pellets, and fractional melt pellets used singly and in combination that confer decorative and functional three-dimensional molded parts.

In another preferred embodiment of the present invention, an apparatus is provided, and comprises a highly regulated mixing stage capable of both heating and cooling with optional pressurization and filtration to achieve extrusion through a multi-orifice die of approximately uniform diameter holes such that pelletization, transport, and drying of the pellets does not degrade, prematurely react, expand, prematurely cross-link, and otherwise alter the chemical composition of the polymers and copolymers for use in minimal shear molding.

The die of the apparatus through which the chemical composition is extruded can comprise a multiplicity of approximately uniform diameter holes concentrically positioned circumferentially and singularly about the face of the die.

The die of the apparatus through which the chemical composition is extruded can comprise a multiplicity of approximately uniform diameter holes concentrically positioned circumferentially in a multiplicity of groups of pods about the face of the die.

It is therefore an object of the present invention to provide a method to produce pellets and micropellets that are readily conveyable, economically transported and stored, and the composition of that includes polymers or resins, stabilizers, pigments, reactive or expandable components or component packages, cross-linking modifiers, rheology modifiers, processing agents, plasticizers, surface modifiers, and additives alone or in combination such that the pellets and micropellets produced are of reproducible size, geometry, and composition that are readily moldable using minimal shear processes in one or more layers utilizing reduced molding temperature, reduced molding times, reduced axial or multiaxial rotation rates and ratios alone or in combination such that the molded article is structurally sound meeting the requisite criteria including acceptable appearance, uniform surface quality, impact strength, flexural qualities, gel formation or the lack thereof, barrier properties, and wall uniformity alone or in any combination.

BRIEF DESCRIPTION OF THE DRAWINGS

FIG. 1 is a schematic illustration of a preferred embodiment of the present invention including a feeding section, a mixing section, pelletization, dewatering and drying, and a post-processing section.

FIG. 1a is a schematic illustration of a mixing vessel, medium pressure pump, and coarse screen changer.

FIG. 1b is a schematic illustration of a feeder, gear pump, and static mixer assembly.

FIG. 3 is a schematic illustration of a vertically configured static mixer with attached bypass diverter valve.

FIG. 4 is a schematic illustration of flow, purge, and drain positions for the bypass diverter valve in FIG. 3.

FIG. 4a illustrates the operational flow positions of valving in the bypass diverter valve with the static mixer vertically inclined.

FIG. 4b illustrates a purge or bypass operation in the bypass diverter valve that bypasses the static mixer.

FIG. 4c illustrates a purge or drain position in the bypass diverter valve that allows both sides of the vertically inclined static mixer to purge or drain without introducing material downstream.

FIG. 4d illustrates a drain position in the bypass diverter valve that allows drainage of the upstream portion of the static mixer to drain out of the system with the downstream portion of the static mixer draining through the attached polymer diverter valve.

FIG. 4e illustrates a purge position that blocks the static mixer and all downstream equipment allowing independent purge of the upstream equipment.

FIG. 5 is a schematic illustration of flow and purge positions for the bypass diverter valve and to that is attached the static mixer in pendulous orientation.

FIG. 5a illustrates the operational flow positions of valving in the bypass diverter valve with the static mixer pendulously attached.

FIG. 5b illustrates a purge operation in the bypass diverter valve that bypasses the static mixer.

FIG. 6 is a schematic illustration of flow and purge positions for the bypass diverter valve and to that is horizontally attached the static mixer.

FIG. 6a illustrates the operational flow positions of valving in the bypass diverter valve with the static mixer horizontally attached.

FIG. 6b illustrates a purge or bypass operation in the bypass diverter valve that bypasses the static mixer.

FIG. 6c illustrates a drain position in the bypass diverter valve that allows both sides of the horizontally positioned static mixer to drain without introducing material downstream.

FIG. 19 is a schematic illustration of a comparative flexible cutter hub with exploded view of flexible hub component.

FIG. 20a is a schematic view of a portion of a streamline cutter hub.

FIG. 20b is a schematic view of the streamline cutter hub rotated in perspective relative to FIG. 20a.

FIG. 20c is a cross-sectional view of the streamline cutter hub in FIG. 20a.

FIG. 29 illustrates a dryer screen with deflector bars.

FIG. 30 is a cross-sectional illustration of the screen with deflector bars in FIG. 29.

FIG. 38b is a cross-sectional illustration of the molded part in FIG. 38a.

FIG. 39a is a schematic illustration of the molded threads on a tank.

FIG. 39b is a top view of the threaded tank in FIG. 39a illustrating molding imperfections characteristic of powder.

FIG. 39c is a top view of the threaded tank in FIG. 39a illustrating reduced molding imperfections characteristic of micropellets.

FIG. 43 is a schematic drawing illustrating a melt cooler mounted horizontally with respect to the diverter valve in accordance with another embodiment of the present invention in that the melt cooler inlet line enters a bottom portion of the cooler.

FIG. 44 is a schematic drawing illustrating the melt cooler mounted horizontally with respect to the diverter valve in accordance with another embodiment of the present invention in that the melt cooler inlet line and the melt cooler outlet line are oriented in a side-by-side configuration.

FIGS. 52A, 52B, and 52C are schematic drawings illustrating a melt cooler and diverter valve in accordance with another embodiment of the present invention.

DETAILED DESCRIPTION OF THE INVENTION

Figure 2:
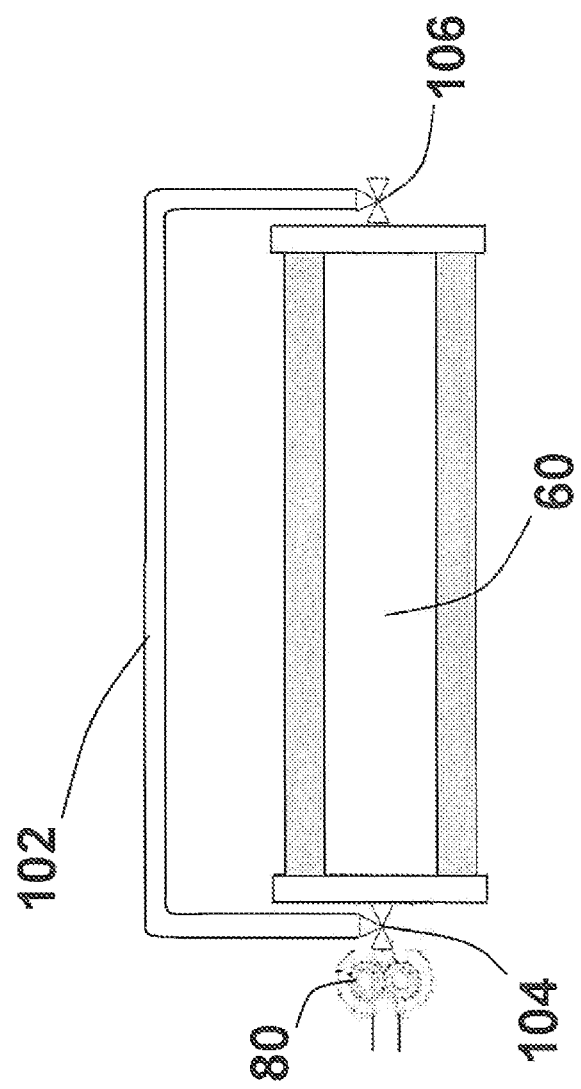
FIG. 2 is a schematic illustration of a comparative static mixer with gear pump and bypass pipe connected by three-way valves.

Although preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

Minimal shear molding is known and as used herein includes rotation of the mold about a single axis as exemplified in lining pipes, or biaxially that that can include two perpendicular arms rotating independently through 360° or one arm rotating through 360° while the second arm swings back and forth in a predefined arc such that the motion can be described as oscillatory or rock-and-roll or can be oscillatory rotation by both arms independent of each other, and alternatively can be multiaxial in that each independent rotation can be oscillatory or can circumscribe 360°. Biaxial rotation is a common process of that the manufacture of storage tanks or tanker liners is exemplary. Canoes and boats serve similarly as examples of common applications of the rock-and-roll methods.

Conventionally powders have proven the workhorse of the rotational molding industry wherein references suggest the use of sizes ranging from minus 10 mesh to 200 mesh and preferably 20 mesh to 50 mesh (approximately 0.033 inches to 0.012 inches or 0.84 mm to 0.30 mm respectively) and more preferably on 35 mesh or 0.020 inches (approximately 0.5 mm). Depending on the material, powder traditionally has been ground or cryogenically ground either of that adds considerable expense to the overall processing cost.

Grinding is well documented as introducing considerable work energy often manifested as heat into the material that potentially can lead to degradation, decomposition, and/or discoloration of the powder produced. The particle size distribution of the powders thus generated is typically of a broad range from very small to quite large and agglomeration or adherence of these particles is not uncommon leading to loss of material or recycling for additional grinding steps. This wide size distribution can further require sizing processes to remove material larger and/or smaller than the requisite processing range. The grinding process is quite variable in and of itself over time as blades or other grinding apparatus wear down or abrade with usage. Throughput volume is restricted to the capabilities of the grinding apparatus potentially requiring multiple units with escalation of maintenance costs and shut down of operations. The grinding process potentially generates tremendous amounts of fine particulates, or fines, which should be controlled to prevent unsafe levels of dust leading to inhalation and slip hazards, fire or explosion hazards, and other liability and safety concerns for both the workers and the facility. The various types of grinding equipment utilized are well understood by those skilled in the art.

The conventional powder produced can be of a variety of shapes exemplarily from spherical to oval, egg-shaped to square or rectangular, platelike or flake, needle-like or acicular, or can be highly irregular with the possibility of easily fracturable points and protrusions. As a consequence of the powder geometry, flow into the mold and because of the rotation of the mold can vary from a continuous mode, or alternatively to a slip mode wherein the powder remains in place until such elevation of the mold or other outside force causes it to slide along the pathway either smoothly or periodically, or subsequently to a cascade or avalanche flow in that a large portion of the powder gives way simultaneously much like an avalanche of snow. This is likened to pouring from a bin of sugar as opposed to pouring from a bin of extremely fine flour, conceptually. As the mold warms and the powder begins to soften, tack occurs in the material allowing at least a portion of the powder to stick to the mold surface further altering or obstructing these flow mechanisms potentially resulting in surface irregularities in the molded part. Ultimately, the heat applied to the mold melts the powder that coats the surface of the mold that continues to rotate and is then resolidified to produce the molded article.

Pellets, or more appropriately, strand pellets, can be prepared by extrusion of a strand of molten material that has typically been cut after cooling to generate cylindrical particles. These strand pellets often are prone to irregular fractures during or following the cutting process and can be subjected to abrasive wear during transport. Rotational molding grades of material commonly were and are marketed as powders as detailed above or pellets of this nature. These pellets can be of any length and diameter depending on the manufacturing process and sizes of ⅛ inch (approximately 3.2 mm) in length and width are not uncommon. Pellets as described above similarly suffer, as do the powders, from irregular particle size and distribution, poor particulate flow and uneven melting, and poor reproducibility of the molded article, and consequently are seldom used directly in rotational molding.

Powders and/or pellets as previously described used for rotational molding are commonly available and not limited to linear low density polyethylene, low density polyethylene, medium density polyethylene, high density polyethylene, cross-linkable polyethylene, polypropylene, polyester, polyamide, polycarbonate, acrylonitrile-butadiene-styrene (ABS), polystyrene, ethylene-vinyl acetate (EVA), ethylene-chlorotrifluoroethylene copolymer (ECTFE), polyvinyl chloride, and polyvinylidene difluoride (PVDF).

Pellets can also be generated in reactors in that polymerization is commonly done as a dispersion that generates small globules of molten material in the dispersive media that on cooling solidify to form somewhat spherical pellets of a particular size distribution that can subsequently be sized to appropriate ranges for the process and application being considered.

Pellets prepared by the heretofore described or similar processes are included in the extant invention by way of reference and are preferably prepared by extrusion of a polymer melt formulation through an underwater pelletizer with subsequent drying as shown in FIG. 1. The apparatus includes a feeding or filling section 1 that provides material into a mixing, melting and/or blending section or sections 2 fittingly attached to a pelletizing section 3 that preferentially utilizes otherwise expedited fluid transport of the pellets to a dewatering and drying device 4 after that the material is conveyed to packaging, storage and/or post-processing manipulations 5.

In feeding section 1 material or component materials are fed into the mixing section 2 manually as a solid or liquid, or preferably liquids can be pumped or metered, not shown, into the mixing apparatus and solids can be added via a feed screw 10 as indicated in FIGS. 1, 1a, and/or 1b, or by other appropriate device. Feeding can be accomplished gravimetrically or volumetrically and preferably is controlled through mechanical and/or electronic feed-back mechanisms as are readily known to those skilled in the art. One or more similar or different feeding mechanisms can be required by the process and can be placed at the same or different entry points in the mixing section 2 as indicated by mixing inlet 14a, 14b, 14c, or 14d. The feeding components can be ambient in temperature, heated, or cooled and can be at atmospheric conditions or pressurized, purged with air or an inert medium such as but not limited to argon or nitrogen preferentially, or can be subjected to a vacuum or partial vacuum to expedite flow into the mixing section 2 preferentially near the exit port of the feeding device exemplary of that is the feed screw outlet 12.

The mixing section 2 of the present invention includes dynamic 2a, extrusional 2b, and/or static 2c mixing components that can be used individually or as a plurality of one, two, or more of these component types interconnectedly attached in series, in tandem, and/or in parallel.

The feed screw outlet 12 of feeding section 1, FIG. 1a, is attached to the dynamic mixing section 2a at one or more inlets exemplified by inlet 14a for the thermally controlled mixing vessel 16. The vessel chamber can be atmospheric or purged with air or inert gas, argon or preferably nitrogen. Components can be added continuously or portionwise with warming to temperature as required by the process. Mixing is achieved by rotation of the rotor 18 controlled by motor 20. Attached to rotor 18 are mixing blades 22 exemplary of that can be propeller or boat style, ploughshare style, delta or sigma style in single, double, or multiple configurations, and helical or helical dispersion blades. Alternatively, the mixer can be a kneader, Buss kneader, or Farrell internal mixer or it can be a ribbon blender, Banbury-type blender, horizontal mixer, vertical mixer, planetary mixer or equivalent device known to those skilled in the art.

On reaching the appropriate pour point valve 24 is opened and the fluid or molten material passes into and through pipe 26 and is drawn into booster pump 30. The booster pump 30 can be, for example, a centrifugal pump or a positive displacement reciprocating or rotary pump. Preferably the booster pump 30 is rotary and can be a peristaltic, vane, screw, lobe, progressive cavity, or more preferably, a gear pump. The gear pump can be high precision or preferably is open clearance and generates an intermediate pressure, typically up to 500 psi and preferably less than 150 psi. The pump pressure is sufficient to force the melt through coarse filter 35 that can be a candle filter, basket filter, or screen changer, and is more preferably a basket filter of 20 mesh or coarser. The coarse filter 35 removes larger particles, agglomerates, or granular material from the melt as it flows to and through pipe 32. The dotted line 40a indicates the connection to melt pump 80.

Alternatively the feeding section 1 in FIG. 1 is connectedly attached via feed screw outlet 12 to the mixing section 2, and more specifically extrusional mixing section 2b, at one or more inlets as exemplified by inlet 14b to an extruder 50 that optionally can be but is not limited to a single screw, twin screw, multiple screw or ring extruder, or a ram extruder and is preferably a single screw, and more preferably is a twin screw extruder. The sections or zones of the screw should feed, mix, and convey the material simultaneously providing sufficient energy, thermal and mechanical, to melt, mix, and uniformly disperse and distribute the material or materials for the pelletization to follow. The extruder 50, preferably the twin screw extruder, optionally can be purged with air or an inert gas, of that nitrogen or argon are preferential but not limiting, and additionally can have one or more vent ports some or all of that can be fitted with one or more vacuum attachments or other exhaust mechanism or mechanisms as is understood by those skilled in the art. Vent ports or appropriate exhaust mechanisms facilitate removal of gases, unwanted volatiles such as residual monomer or byproducts, and/or impurities. Venting should be used with caution and positionally placed such that any volatile components essential to the formulation are not lost or compromised after introduction to the mixing process. The configuration of the screw should be satisfactory to achieve an appropriate level of feeding, mixing dispersively and/or distributively, melting, blending, and throughput rate determined by the formulation and processing requirements. The extruder 50 is attachedly connected to the melt pump 80 as shown in FIG. 1 at the locus similarly identified by the dotted line 40*a* for dynamic mixing section 2*a* illustrated in FIG. 1*a*.

Analogously feeding section 1 can be connected via feed screw outlet 12 to inlet 14*c* in the static mixing section 2*c* in FIG. 1 and/or to inlet 14*d* in the static mixing section 2*d* in FIG. 1*b*. Process operations can require use of a booster pump 30 and/or a melt pump 80 to facilitate transfer and pressurization of the material flow into the static mixer 60. Static mixer 60 is connected to melt pump 80 positionally as indicated by dotted line 40*b*.

Mixing sections can be used alone or in combination where dynamic, extrusional, and/or static mixing as described herein are connected in series and/or in parallel. Exemplary of this is dynamic mixing section 2*a* attached directly to static mixing section 2*d* at inlet 14*d* or extrusional mixing section 2*b* attached directly to static mixing section 2*d* at inlet 14*d* or alternatively to static mixing section 2*c* at inlet 14*c*, bypass static mixer 100 as detailed below. Extrusional mixing section 2*b* alternatively can be attached to another extrusional mixing section in series and/or in parallel of similar or different design type or configuration. Temperatures and process parameters can be the same or different in the various mixing sections and mixing units can be attached in combinations greater than two serially or otherwise.

Ingredients, liquid or solid, can be added utilizing the feeding section (or sections) 1 herein described connected at one or more locations including but not limited to inlets 14*a*, 14*b*, 14*c*, or 14*d*. For dynamic mixing, components are added at inlet 14*a* or preferably for any volatiles at inlet position 75 proximal to inlet 14*c*. Where dynamic mixing is attached serially to static mixing (not shown in FIG. 1), addition of the any volatiles is preferably performed at the inlet of the static mixer as is exemplified by a modification of inlet 14*d* for static mixer 60 (FIG. 1*b*) as is understood by one skilled in the art. For extrusional mixing, components are added at inlet 14*b*, and for any volatiles, preferably at an inlet positionally near the end of the extruder 50 as indicated by inlet position 70 or alternatively at inlet position 75 proximal to inlet 14*c*. For extrusion mixing serially attached to static mixing prior to gear pump 80 (not shown in FIG. 1), addition of components can be accomplished at the inlet of the static mixer as is exemplified by a modification of inlet 14*d* for static mixer 60 (FIG. 1*b*) as previously described for serial dynamic and static mixing. For static mixing, introduction of components can be done at inlet 14*d* in FIG. 1*b* or for any volatiles at inlet position 75 proximal to inlet 14*c* in FIG. 1.

Various levels of mixing and shear are achieved by the differing styles of mixing processes. Static mixing typically has the least shear and relies more on thermal energy. Dynamic mixing depends to a large degree on blade design and mixer design. Extrusional mixing varies with type of screw, number of screws, and the screw profile and is quite capable of significant generation of shear energy. Therefore, energy is introduced into the mixing process in terms of both shear or mechanical energy and thermal energy. Heating, and/or cooling, of the units can be achieved electrically, by steam, or by circulation of thermally controlled liquids such as oil or water. Mixing continues until a formulation reaches an appropriate temperature or other criterion of consistency or viscosity as determined or known specifically for the process by those appropriately skilled in the art.

On exit from the mixing stage 2*a*, 2*b*, 2*c*, or 2*d*, or any combination thereof, the molten or fluidized material optionally passes to and through a melt pump 80 that generates additional pressure on the melt, preferably at least approximately 10 bar and more preferably approximately 30 to approximately 250 bar or more. Pressures required are dependent on the material being processed and are significantly affected by the pelletization process 3 that follows mixing as well as on the throughput rate or flow rate of the process. Melt pump 80 can be a centrifugal or positive displacement reciprocating or rotary pump, and preferably is a rotary pump that can be a peristaltic, vane, screw, lobe, progressive cavity, or gear pump, and more preferably is a gear pump. Seals should be compatible with the material being processed, chemically and mechanically, the details of that are well understood by those skilled in the art.

The pressurized melt passes through a filter 90 that is preferably a basket filter or screen changer, and is more preferably a screen changer of approximately 200 mesh or coarser, and even more preferably a multilayer screen changer of two or more screens of differing mesh, most preferably a series of filters exemplary of that is 20 mesh, 40 mesh, and 80 mesh. The screen changer can be manual, plate, slide plate, rotary plate, single or dual bolt, and can be continuous or discontinuous.

The use of melt pump 80 and/or filter 90 is included herein and their use is strongly and optionally dependent on the containment of any volatile ingredients in the formulation. Pressures can be sufficient from extrusional mixing 2*b* to forego use of melt pump 80 whereas use of static and/or dynamic mixing, 2*a* or 2*d*, can require facilitation of pressurization to insure progress through and egress of the formulation from the apparatus. The filter 90 provides a safety mechanism, where employed, to insure oversize particles, lumps, amorphous masses, or agglomerates are not propagated to the bypass static mixer 100 or pelletization process 3. Alternatively, introduction of any volatile components can be performed at inlet position 75 proximal to inlet 14*c* in FIG. 1 as previously delineated. Where additional pressurization and/or screening are a requisite process component, introduction via inlet position 75 proximal to inlet 14*c* is the preferred approach.

Static mixer 60 in FIG. 1*b* can be used to heat the mixture being formed to generate a uniform molten mass or can be used effectively as a melt cooler to reduce the temperature of the molten mass. When static mixers are used in series, each unit can be used to heat and further mix the formulation wherein the temperatures, design, geometries and configurations, physical size, and process conditions can be the same or different. A static mixer in the series can be heating the mixture to achieve better dispersive and distributive mixing whereas a second static mixer can actually be cooling the mixture to facilitate further processing. A static mixer 60 or melt cooler is a heat exchanger of the coil type, scrape wall, shell and tube design, or U-style tube design or other comparable style and preferably is a shell and tube design that includes static mixing blades of appropriate configuration within the individual tubes to further mix the material and bring more of the material in intimate contact with the wall of the tube outside of that is a flow preferably of, but not limited to, oil or water to provide warming or cooling as appropriate.

The temperature and flow rate of the circulating medium is carefully regulated by a control unit, not shown. The important criterion for selection of conditions in static mixing or melt cooling is to do a maximum amount of work to effect mixing with a minimum pressure drop while maintaining the pressure required for proper admixture. Pressures generated by the extruder 50 and/or the melt pump 80, where present, should be sufficient to maintain flow of the molten or fluid mass through the filter 90, where applicable, into and through the bypass static mixer 100, and into and through the pelletization section 3. Alternatively, an optional melt pump 80 can be positionally attached to outlet 130 and inlet 205 to maintain or increase pressure into and through the pelletization section 3.

The optional bypass static mixer 100 in FIG. 1 has a distinct advantage over prior art where a static mixer 60 would have to physically be removed from the melt flow pathway for maintenance or cleaning, and is not always necessary in a particular process. To simplify this challenge, a "spool" or straight large bore pipe that can or can not have coolant connection was inserted into the pathway to allow flow effectively bypassing the unnecessary static mixer. Alternatively a bypass line 102 can be inserted into the flow path as shown in FIG. 2 with a diverter valve 104 used to switch flow from the static mixer 60 into the bypass line 102. Similarly a second diverter valve 106 was required to reconnect the bypass flow back into the mainstream at or near the outlet of static mixer 60.

The outlet of optional filter 90 is attachedly connected to the bypass static mixer 100 in FIG. 1 via inlet 110 of bypass diverter valve 120 detailed in FIG. 3. Inlet 110 directs melt flow into the static mixing component 150 of the bypass static mixer 100 through static mixer inlet 152. The melt flow passes through static mixing component 150 and exits through static mixer outlet 154 into the outlet 130 of the bypass diverter valve 120. A two-pass or double pass heat exchanger is illustrated in FIG. 3 wherein the base 156 of the static mixing component 150 is attachedly connected as described through inlet 152 and outlet 154 to the bypass diverter valve 120. The top 158 of the static mixing component 150 is distal from the bypass diverter valve 120.

FIG. 4 illustrates five modes of operation of the bypass diverter valve 120 in conjunction with the static mixing component 150 as detailed in accordance with FIG. 3. An "X" in a valve line of the bypass diverter valve 120 indicates that the valve line is closed. FIG. 4a illustrates operation of the bypass diverter valve in conjunction with the static mixing component 150 in vertical orientation as detailed above. More specifically, bypass valve line 166 between valve components 162 and 164 is closed, as well as valve drain lines 168 and 170. As such, liquid or molten material or extrudate entering bypass diverter valve 120 through valve entry line 165 is directed by valve component 162 to static mixing component 150 through valve static mixer entry line 172. Thermally modified material exiting the static mixing component 150 via static mixer exit line 174 is directed by valve component 164 out of bypass diverter valve 120 through valve outlet line 167 toward the pelletization section 3.

FIG. 4b illustrates the bypass mode for bypass diverter valve 120. As such, bypass valve line 166 is open, valve drain lines 168 and 170 remain closed, and valve static mixer entry line 172, connecting to inlet 152 of static mixing component 150, and static mixer exit line 174 are also both closed. As such, liquid or molten material or extrudate flows directly from valve entry line 165 through the bypass diverter valve 120, thus bypassing the static mixing component 150.

FIG. 4c illustrates a first drain mode in that the bypass valve line 166 is closed, valve drain lines 168 and 170 are open, as is valve static mixer entry line 172 and static mixer exit line 174, so that the molten or liquid formulation in the static mixing component 150 can drain away. Similarly, valve entry line 165 and valve outlet line 167 are open so that liquid or molten formulation or extrudate upstream and/or downstream, respectively, from the bypass diverter valve 120 can also drain out through valve drain lines 168 and 170, respectively.

In an alternate drain mode shown in FIG. 4d, the bypass valve line 166 is closed. Liquid or molten material in the static mixing component 150 proximal to valve drain line 168 as well as material upstream of the bypass diverter valve 120 drain through valve entry line 165 and exit via valve drain line 168. Material, molten or liquid, in the static mixing component 150 proximal to the static mixer exit line 174 drain through that line past valve component 164, out valve outlet line 167, and then pass through diverter valve 200 (from FIG. 1). FIG. 4e illustrates a purge position that redirects flow from valve entry line 165 directly to valve outlet line 168 effectively removing the static mixing component and all downstream processing.

FIG. 5 illustrates an alternate arrangement of the static mixing component 150 and the bypass diverter valve 120 in accordance with the present invention. In this embodiment, the static mixing component 150 is vertically suspended below the bypass diverter valve 120 and the inlet 152 to, and exit 154 from, the static mixing component 150 are both mounted at the top of the static mixing component 150 and the base of the bypass diverter valve 120. In FIG. 5a, the liquid or molten or extruded material enters valve component 180 through valve inlet line 165. With bypass line 166 closed and valve static mixer inlet line 172 open, valve component 180 directs the flow into the static mixing component 150. During steady state process conditions, material exiting the static mixing component 150 at outlet 154 enters the bypass diverter valve 120 through static mixer outlet line 174, and flow is directed by valve component 182 out through valve outlet line 167.

In the bypass mode, illustrated in FIG. 5b, the valve static mixer inlet line 172 and static mixer outlet line 174 are both closed, while the bypass line 166 is opened allowing the material to bypass the static mixing component 150 directly to valve outlet line 167.

FIG. 6 illustrates a third orientation of the static mixing component 150 with respect to the bypass diverter valve 120 in accordance with the instant invention. More specifically, static mixing component 150 is positioned horizontally relative to bypass diverter valve 120. As shown, both the inlet 152 and outlet 154 are positioned at the end of the static mixing component 150 adjacent to the bypass diverter valve 120. The normal operating mode by that the melt, liquid, or extrudate is directed by the bypass diverter valve 120 is illustrated in FIG. 6a. The bypass mode follows as FIG. 6b illustrates, and the drain mode is shown in FIG. 6c. In each operation, bypass diverting valve 120 operates in the same manner as described previously for valve components 162 and 164 and, therefore, will not be repeated here. The orientation of the static mixer 100 and bypass diverter valve 120 as herein described can be pendulous, horizontal, or vertically disposed or can be positionally inclined at many angles inclusive between the aforementioned positions.

The preferred design of the bypass diverter valve 120 in accordance with the present invention is of a single-body housing capable of being heated by jacket using steam or other heat transfer fluid or by electric heater cartridges. It has a plurality of inlet and outlet bores and connections as shown in FIGS. 3, 4, 5, and 6. The valve components 162 and 164 as well as valve components 180 and 182 are preferably in the form of movable bolts, valve components 162 and 180 being upstream of the static mixing component 150 and valve components 164 and 182 are downstream similarly. The bolts contain but are not limited to 2 bores exemplary of that are valve components 164, 180 and 182, or 3 bores of that valve component 162 is an example or more bores. The respective bores can be straight-through, form a 90° turn or in the shape of a "tee or T", and are specifically placed along the length of the bolt. Each of these bores is positionally placed by means of a fluid-controlled cylinder or equivalent device, and will adjustably maintain good alignment with the proper inlets and/or outlets of the bypass diverter valve 120, based on the desired position required by the operator running the process, as will be understood by those skilled in the art. The positioning of the fluid powered cylinders, and thus the bolts' position, can be controlled by manually operating a fluid flow valve or by automatic control such as by PLC, or both.

FIG. 43 illustrates another embodiment specifically of the melt cooler in that the orientation of the melt cooler with respect to the diverter valve is the same as is shown in FIG. 6 and identified as static mixing component 150. More specifically, melt cooler 2090 is shown positioned horizontally with respect to the diverter valve generally designated by reference numeral 2092. As shown, both the inlet 2094 and outlet 2096 are positioned at the end of the melt cooler 2090 adjacent the diverter valve 2092. In this embodiment, the inlet 2094 is positioned in the bottom portion 2093 of melt cooler 2090 and the outlet 2096 is positioned in the top portion 2091 of melt cooler 2090. The normal operating mode by that the hot melt polymer is directed by the diverter valve 2092 through the melt cooler 2090 is shown in the left-hand illustration of FIG. 43 marked "A". The bypass mode is shown in the center illustration of FIG. 43, marked "B", and the drain mode is shown in the right-hand illustration, marked "C". In each mode of operation, the diverter valve 2092 operates in the same manner as described above and, therefore, the description of the operation is not repeated here.

FIG. 44 illustrates another embodiment of the invention in that the orientation of the melt cooler with respect to the diverter valve is the same as is shown in FIG. 6. More specifically, melt cooler 2090 is shown positioned horizontally with respect to the diverter valve generally designated by reference numeral 2092. As shown, both the inlet 2094 and outlet 2096 are positioned at the end of the melt cooler 2090 adjacent the diverter valve 2092. In this embodiment, the inlet 2094 and the outlet 2096 are located in opposing portions 2097 and 2098 of the melt cooler in a side-by-side configuration. The normal operating mode by that the hot melt polymer is directed by the diverter valve 2092 through the melt cooler 2090 is shown in the left-hand illustration of FIG. 44, marked "A". The bypass mode is shown in the center illustration of FIG. 44, marked "B", and the drain mode is shown in the right-hand illustration, marked "C". In each mode of operation, the diverter valve 2092 operates in the same manner as described above and, therefore, the description of the operation is not repeated here.

Figure 45:
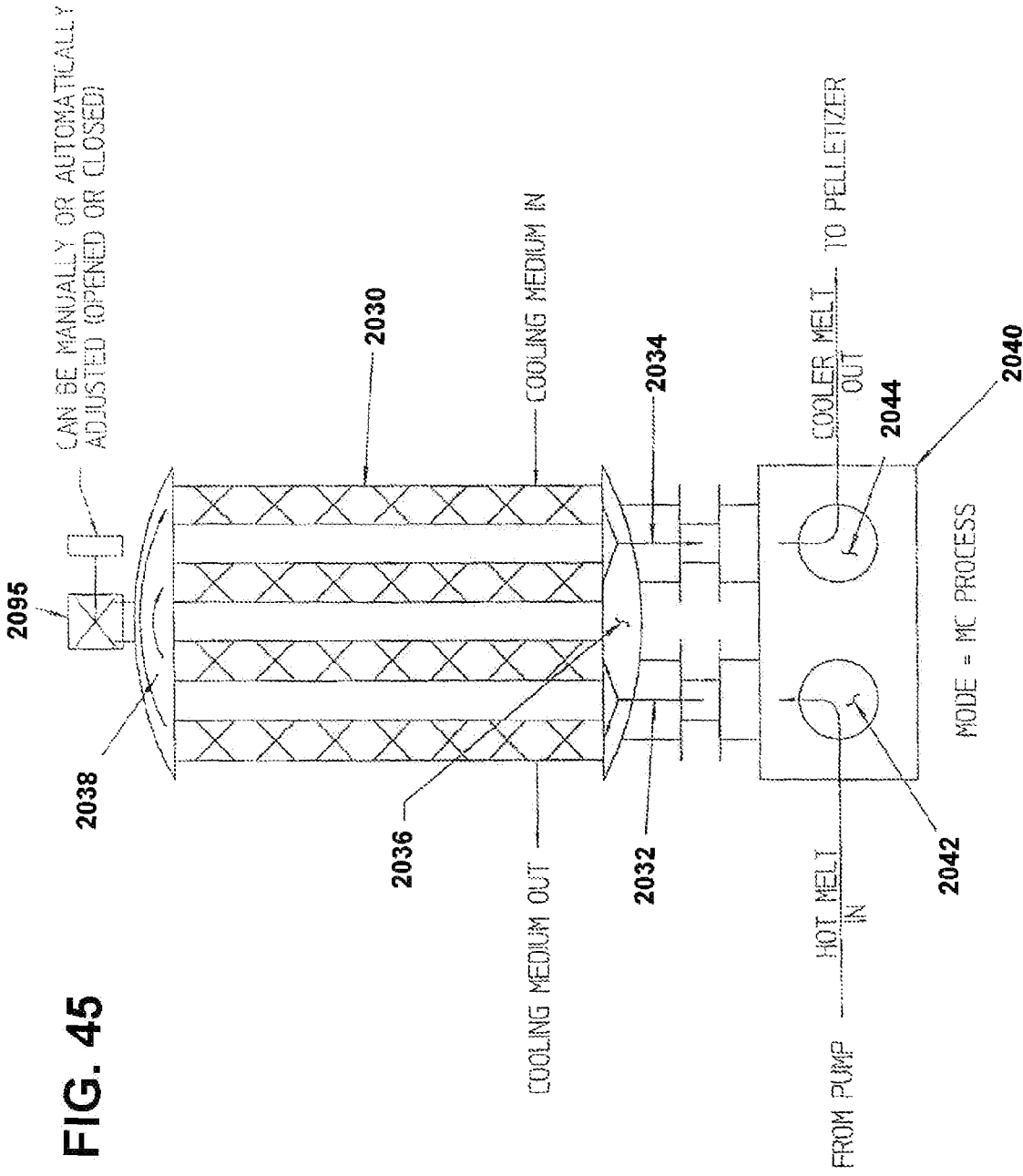
FIG. 45 is a schematic drawing illustrating the melt cooler shown in FIG. 3 with a top-mounted vent.
Figure 46:
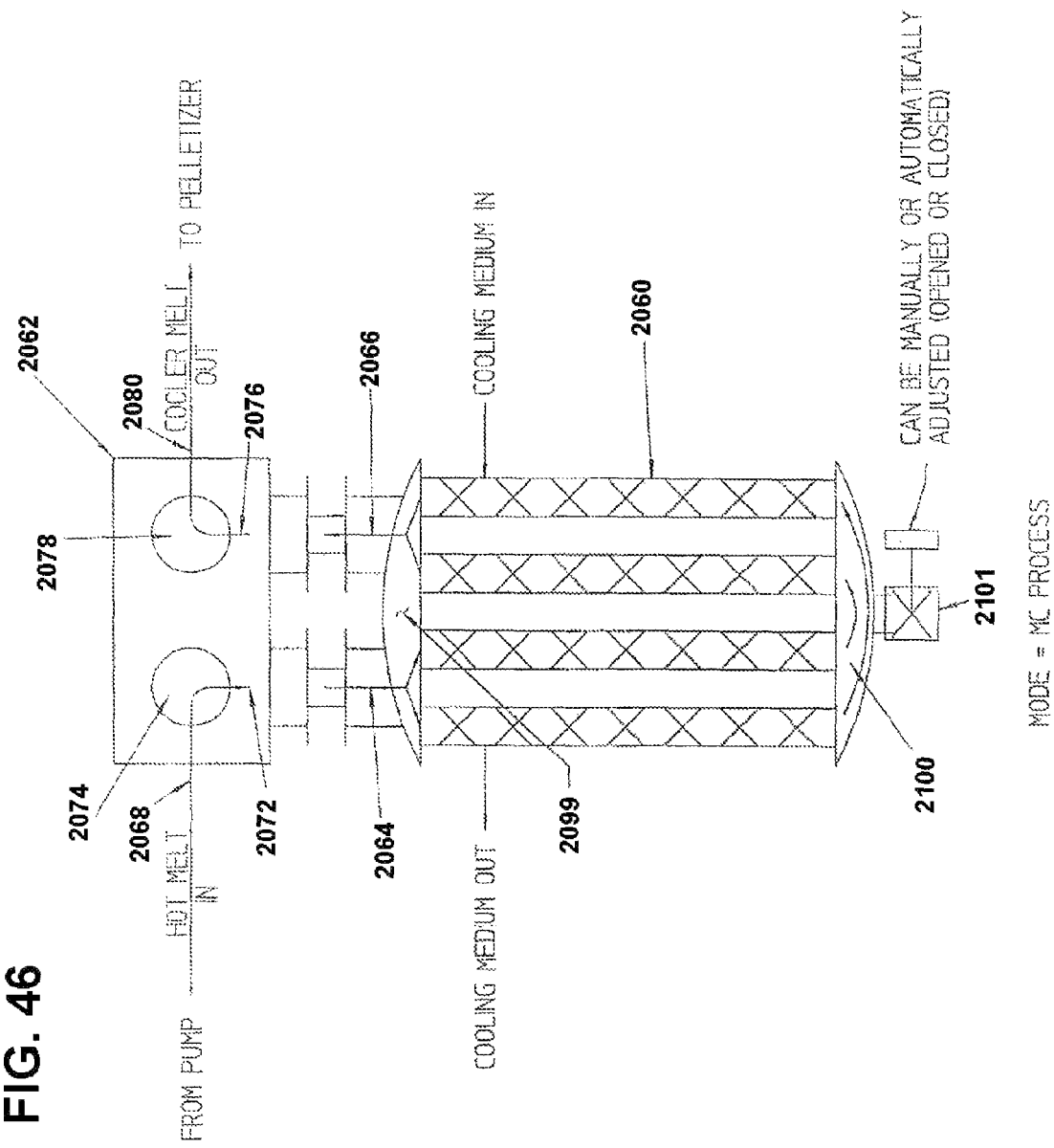
FIG. 46 is a schematic drawing illustrating the melt cooler with a bottom-mounted vent and drain.

As shown in FIGS. 45 and 46, respectively, melt cooler 2030 and melt cooler 2060 can be configured to vent compressible fluids and to drain the polymeric melt and other fluids. FIG. 46 illustrates a vent 2095 located on the top 2038 of melt cooler 2030. FIG. 46 illustrates a vent and drain 2101 located on the bottom 2100 of melt cooler 2060.

Figure 47:
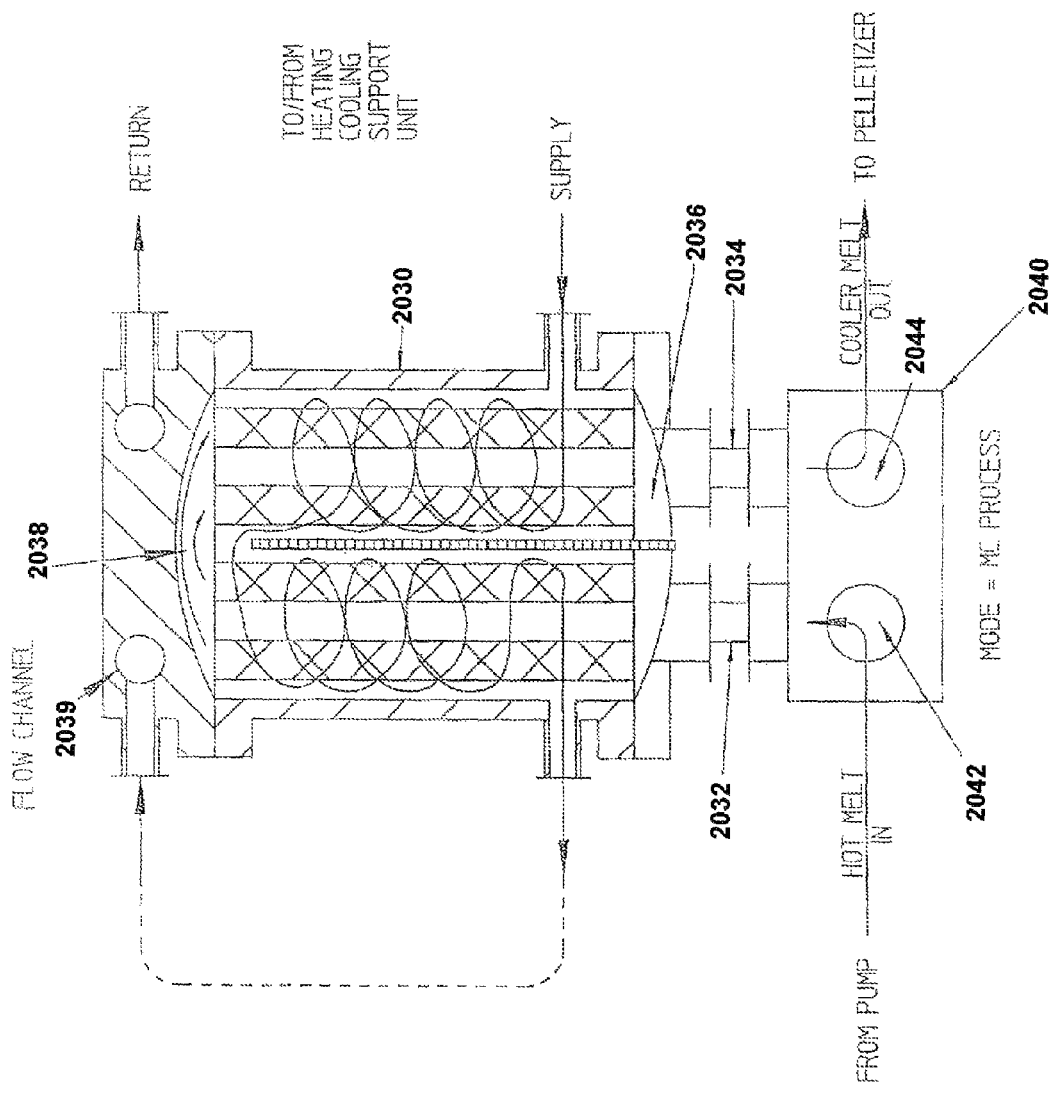
FIG. 47 is schematic drawing illustrating the melt cooler shown in FIG. 3 with a top head heated/cooled by a thermal transfer fluid.
Figure 48:
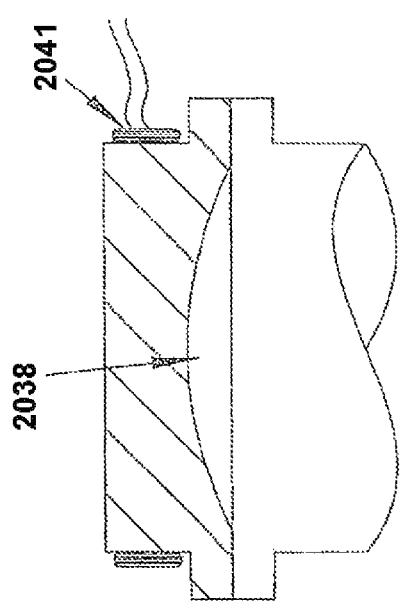
FIG. 48 is schematic drawing illustrating a portion of the melt cooler shown in FIG. 3 with a top head temperature controlled electrically.

To provide for the desired melt flow regimes in the top 2038 of melt cooler 2030, the top 2038 can be heated. For example, as illustrated in FIG. 47, the top 2038 can be heated or cooled by a thermal transfer fluid that passes through flow channel 2039. In another possible heating configuration as illustrated in FIG. 48, the top 2038 can be heated electrically, such as for example, by an electric heater 2041. Controlling the temperature of the top 2038 ensures that the melt does not cool below a predetermined temperature as it turns through top 2038 from a first process side of the melt cooler to a second process side of the melt cooler.

Figure 49:
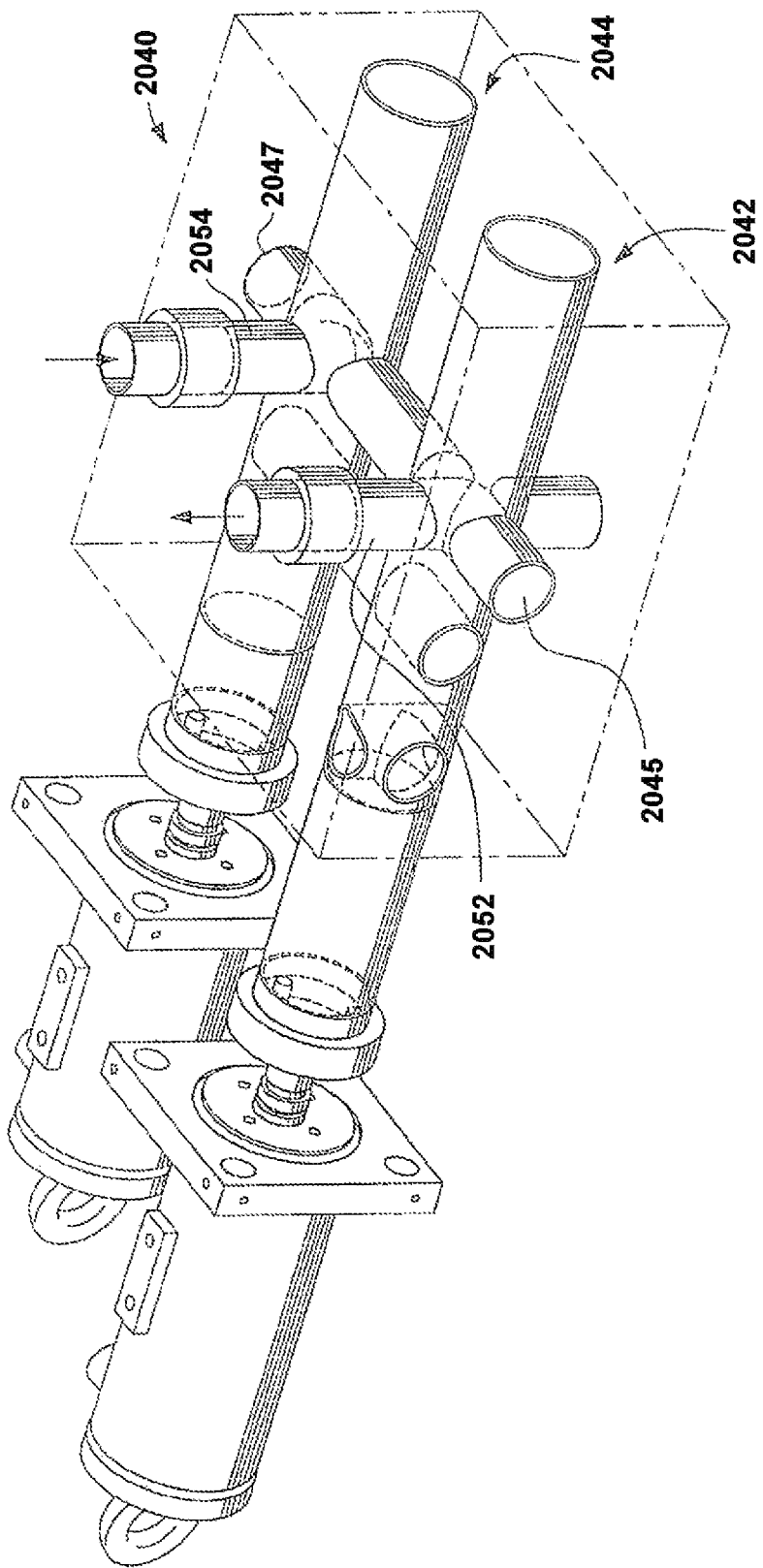
FIG. 49 is a perspective view drawing illustrating the diverter valve in accordance with the present invention in a cooling mode of operation.
Figure 50:
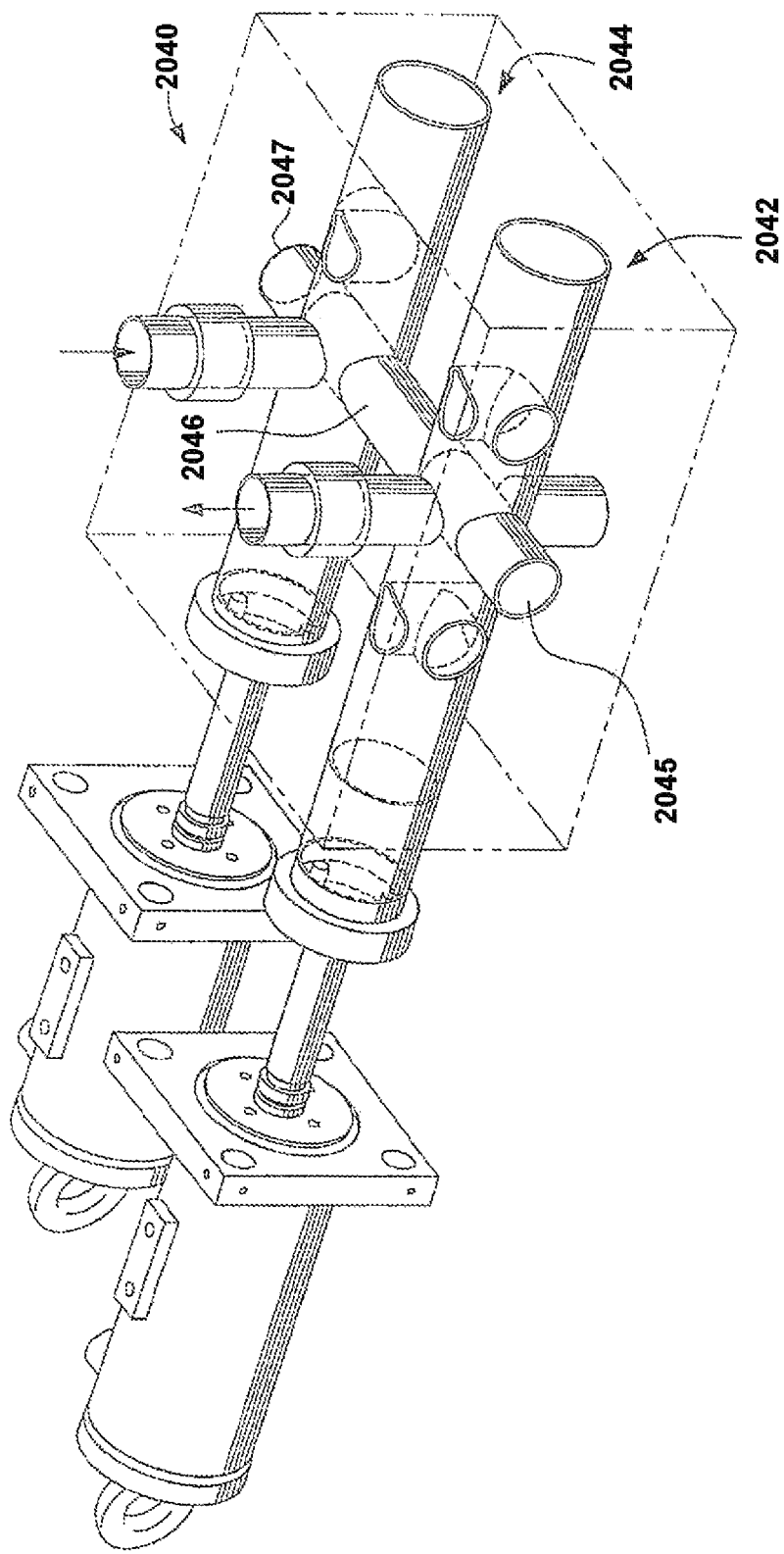
FIG. 50 is perspective view drawing illustrating the diverter valve shown in a bypass mode of operation.
Figure 51:
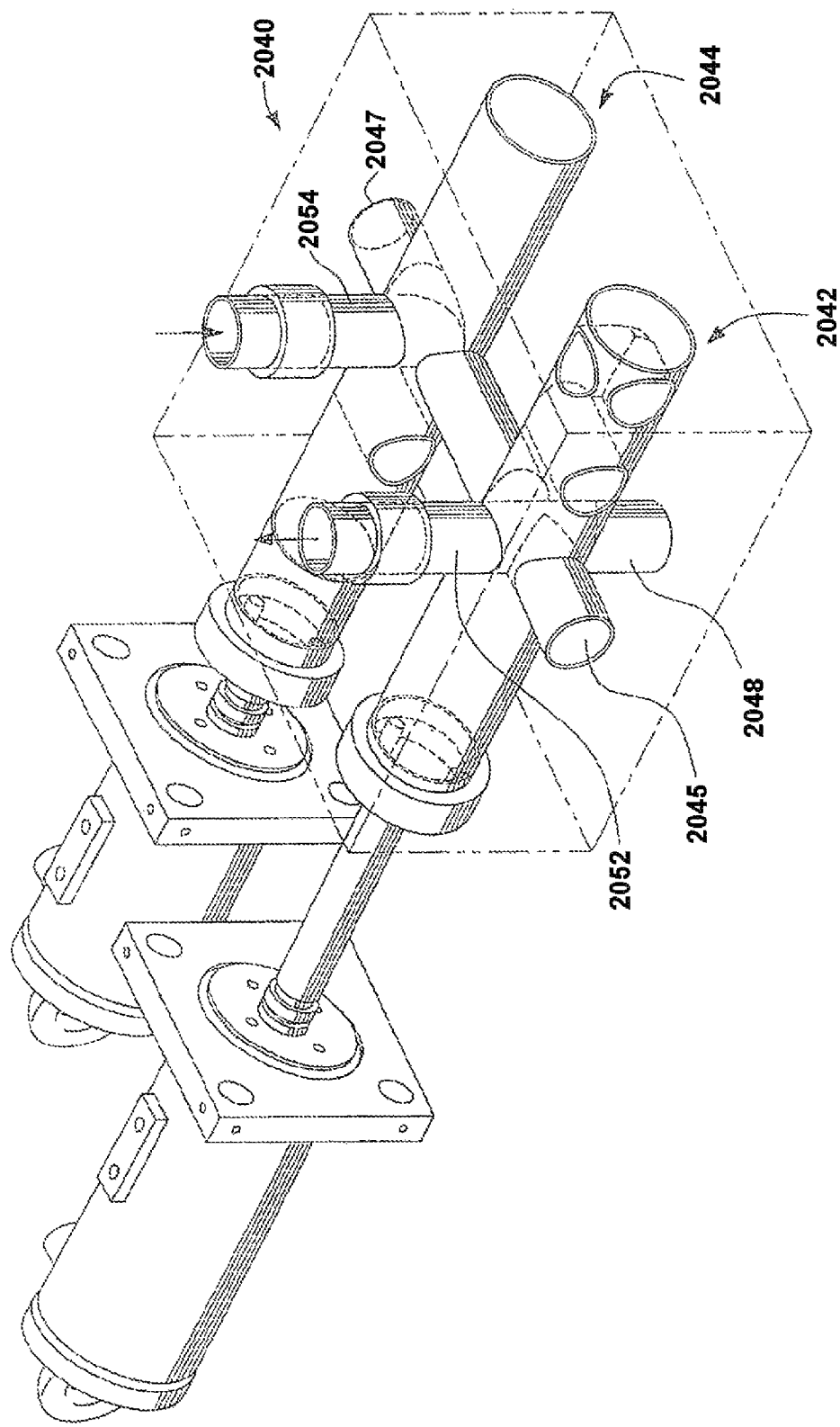
FIG. 51 is perspective view drawing illustrating the diverter valve shown in a drain mode of operation.

As indicated above, FIGS. 49, 50, and 51 provide detailed views of the diverter valve 2040 in, respectively, the cooling mode, the bypass mode, and the drain mode of operation. The diverter valve 2040 has a body housing capable of being heated by jacket using steam or other thermal transfer fluid or by electric heater cartridges. In a preferred embodiment, the first movable valve component 2042 is a hydraulically actuable bolt having three sets of flow channels therein, and the second movable valve component 2044 is a hydraulically actuable bolt having two sets of flow channels therein. In other possible embodiments of the diverter valve 2040, the bolts can include two or three sets of flow channels, either as a straight-through flow channel or as a 90° turn flow channel or as a tee-flow channel, specifically placed along the bolt length. Each of these flow channels is moved into a required position by a fluid controlled cylinder, and aligns with the corresponding required inlets and/or outlets of the diverter valve, based on the desired position required by the operator running the process, as will be understood by those skilled in the valve art. The positioning of the fluid powered cylinders, and thus the bolt position, can be controlled by manually operating a fluid flow valve or by automatic control such as by a PLC, or by both.

Figure 52A:
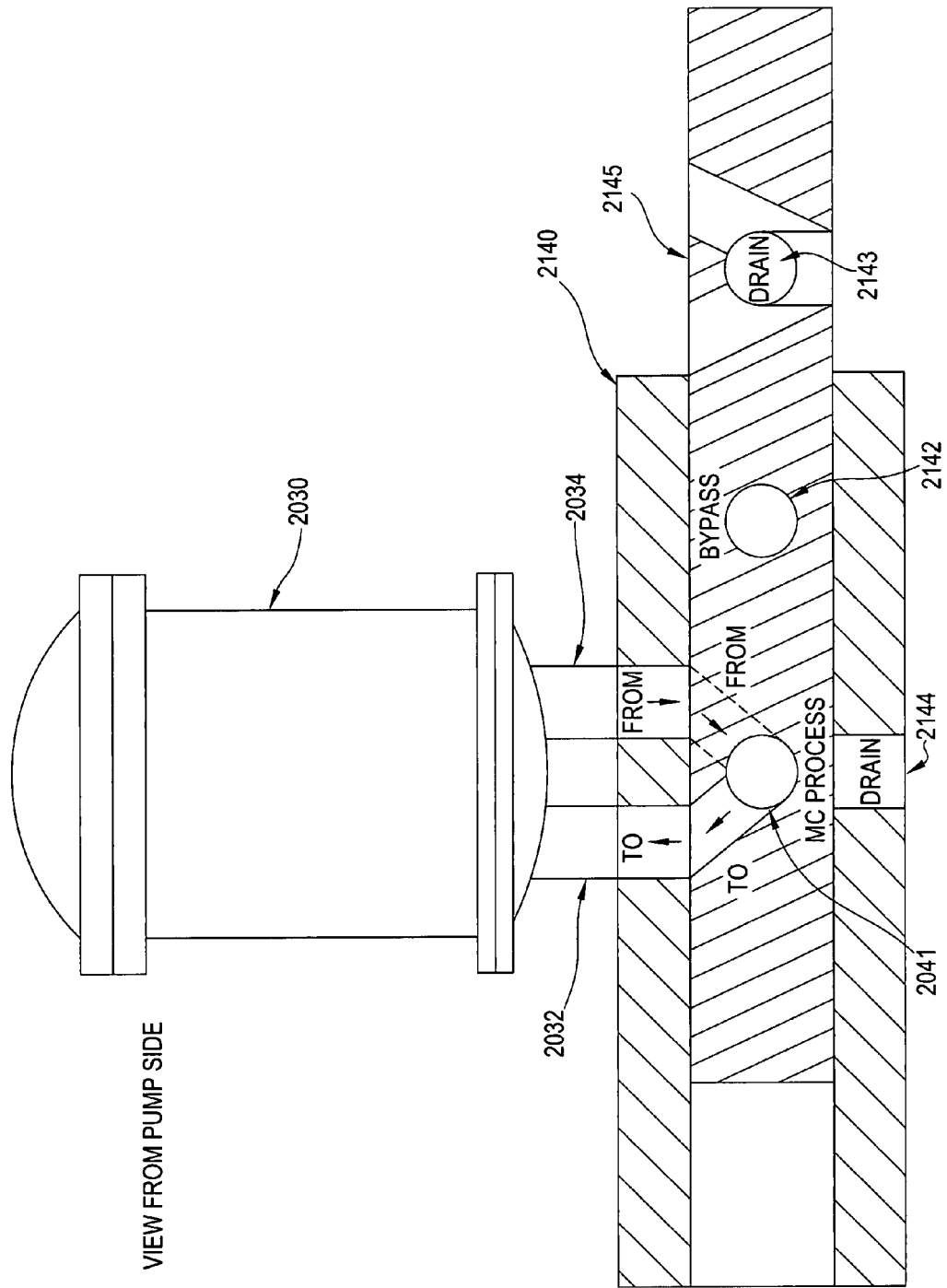
Figure 52C:
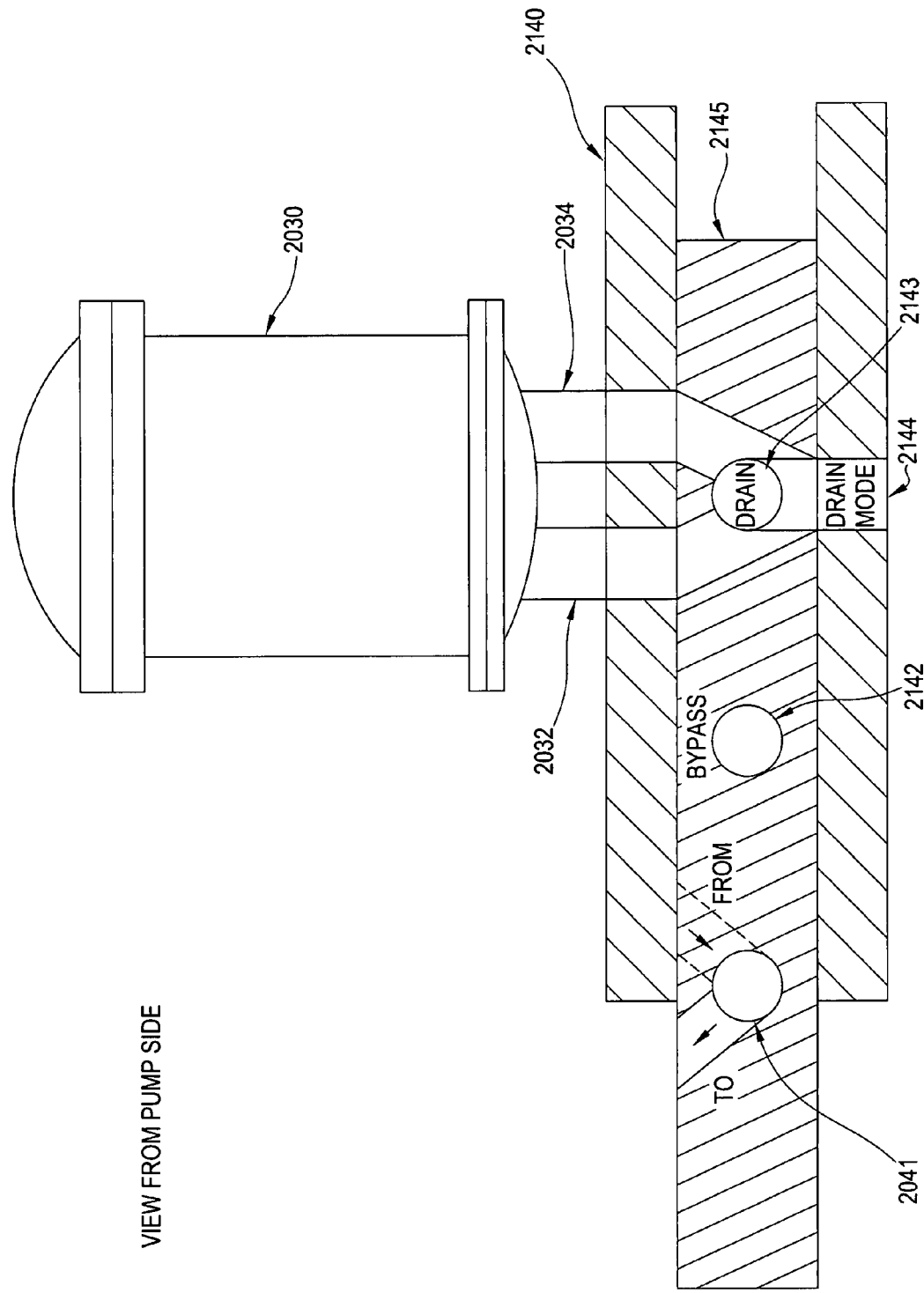

According to another embodiment of the inventions, the melt cooler 2030 is oriented perpendicular to the melt flow path through a diverter valve 2140. As illustrated in FIGS. 52A, 52B, and 52C, the diverter valve 2140 has a single movable valve component 2145. Movable valve component 2145 is a hydraulically actuable bolt having three sets of flow channels therein, including a cooling flow channel 2141, a bypass flow channel 2145, and a drain flow channel 2143. The single bolt embodiment of the diverter valve provides a relatively short melt flow path and an economical valve construction.

Where employed, the bypass static mixer 100 provides a heretofore unachievable level of control of the volatile ingredients over prior art devices. Use of the bypass static mixer 100 as a replacement of the static mixer 60 is well within the scope of the invention. The gains to be realized are in the greatly facilitated purging capacity of the bypass diverter valve. Orientation of valve component 162 allows upstream flow to be diverted prior to entry into the static mixing component 150 as illustrated in FIG. 4e where inlet line 165 and drain line 168 are the only open pathways as well as the bypass variations as herein described. Should the additional modification of the process liquid, melt, or extrudate not be necessary for a particular application, the bypass pathway is of minimal distance wherein temperature and pressurization can be maintained. Purging processes or purging materials can be passed through the components with sufficient facility without risk of unwanted loss of any volatiles, and/or with reduced likelihood of hazardous flammability issues, and without significant inhibition of process flow. Minimization of downtime is readily achievable through elimination of component removal for routine maintenance or repair.

Figure 7:
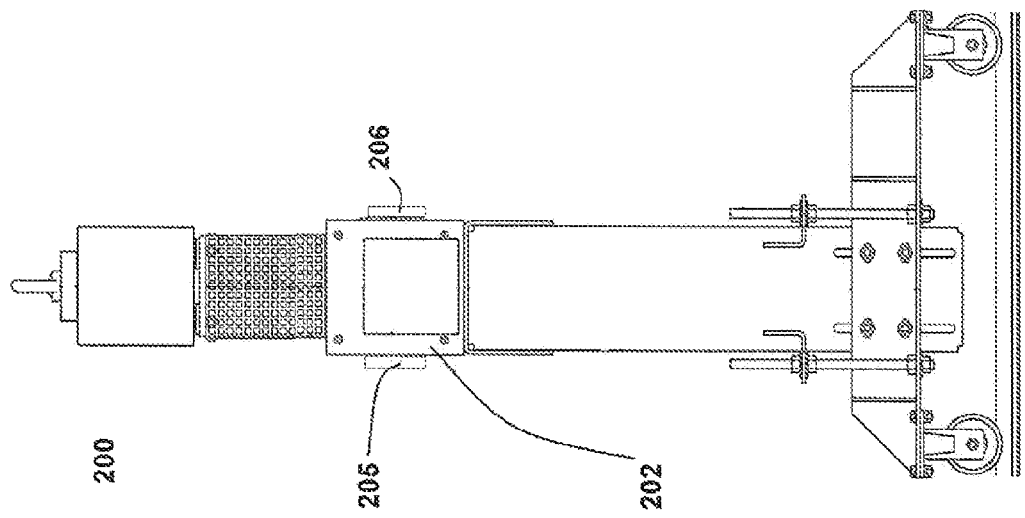
FIG. 7 is a schematic illustration of a polymer diverter valve.

The component or components of the mixing section 2 are attachedly connected to the diverter valve 200, as indicated in FIG. 1 where the outlet 130 of the bypass static mixer 100 is attached to inlet 205. FIG. 7 illustrates inlet 205 and outlet 206 attached to housing 202 of diverter valve 200. The movable diverter bolt, not illustrated, can be actuated electromechanically, hydraulically, pneumatically or any combination thereof.

Referring again to FIG. 1, diverter valve 200 is attached at outlet 206 to the pelletization section 3 at inlet 301 of the die 320, the details of that are illustrated in FIGS. 8, 9, 10, and 11.

Figure 8:
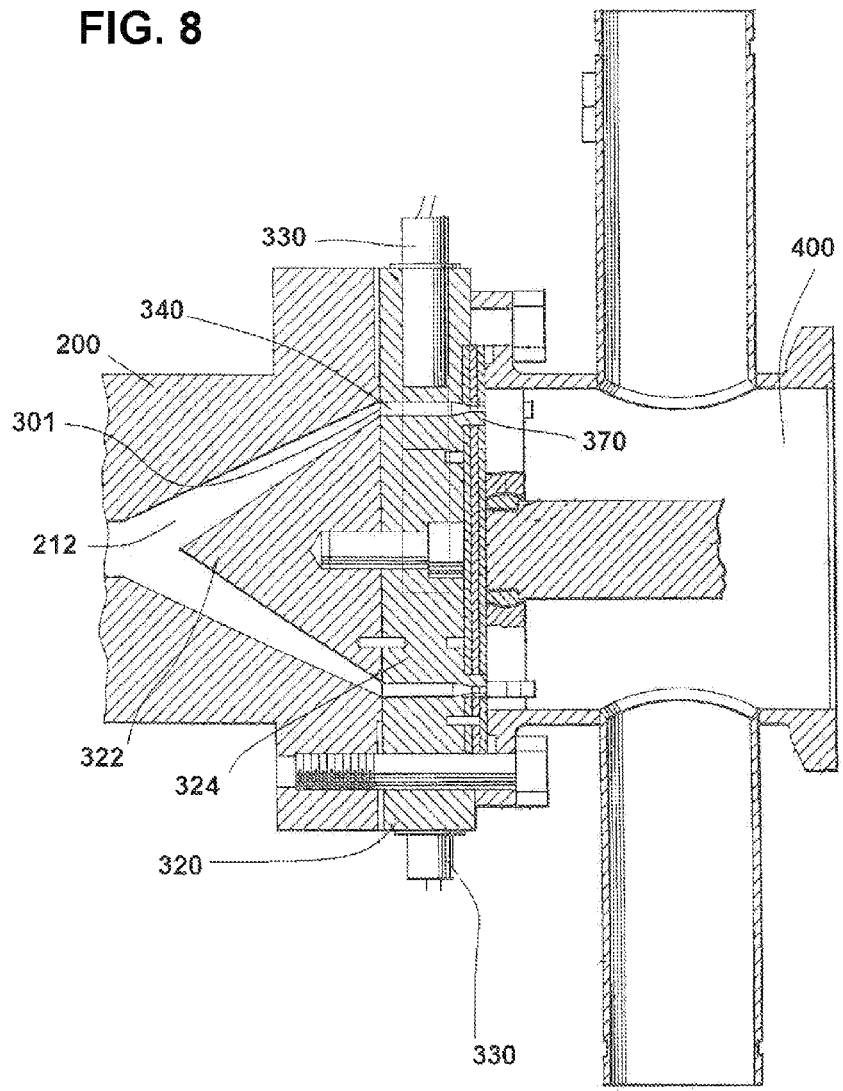
FIG. 8 is a schematic illustration of a one-piece die plate with heating elements in three configurations.

The die 320 in FIG. 8 is a single-body style including a nose cone 322 attached to die body 324 into that are fitted heating elements 330 and through that are bored multiple die holes 340 that vary in number and orientation pattern and can be approximately 3.5 mm in diameter or smaller, preferably are approximately 1.5 mm or smaller, more preferably are approximately 1.0 mm or smaller, and most preferably are approximately 0.5 mm or smaller. The die holes 340 can be many combinations of design including but not limited to increasing or decreasing taper or cylindrical or many combinations thereof and segments can vary in length as necessitated by the process and materials. Preferably the die holes are placed singularly or collectively in groups or pods in one or more concentric rings as determined by the diameter of the outlet 206 of the diverter valve 200 to that it is fittedly attached.

Figure 9A:
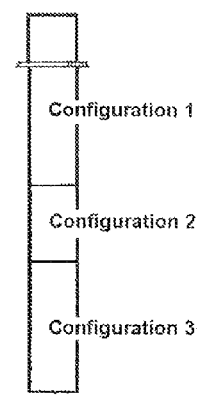
FIG. 9a illustrates the three configurations of the heating element extracted from the die plate.
Figure 9B:
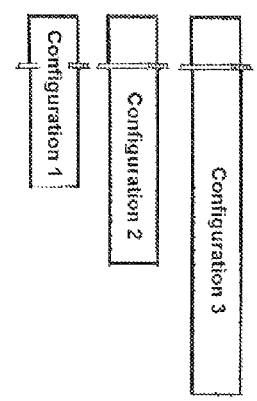
FIG. 9b illustrates the three configurations of the heating element positionally placed individually in side view.

Heating elements 330 can be a cartridge or more preferably a coil type element and can be of sufficient length inside the die body 324 to remain outside the circumference of the die holes as illustrated in FIG. 8 and detailed in FIGS. 9a and 9b as configuration 1 or can extend into and near the center of the die body without passing the center in length, configuration 2 in FIGS. 9a and 9b, or can extend past the center in length but not of sufficient length to contact the ring of die holes diametrically opposed, configuration 3. Positioning of the die holes will obviously vary as would be readily recognized by one skilled in the art to accommodate the appropriate configuration of the heating elements 330 and one or more lengths or designs of heating elements are optionally included within the scope of the present invention.

Figure 10:
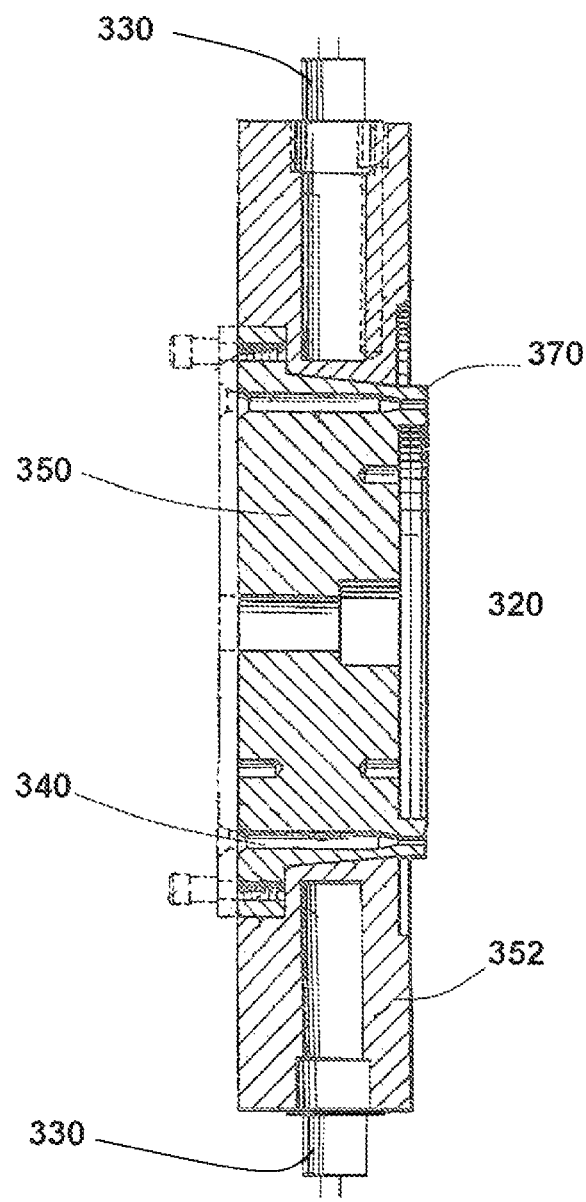
FIG. 10 is a schematic illustration of a removable-center die.

A preferred design of die 320 is illustrated in FIG. 10 in that the die body is of a removable center or insert configuration. The heating elements 330 are of a cartridge or, more preferably, a coil configuration and are inserted into the outer die body component 352 whereby they are constrained in length to suitably fit within the confines of the outer die body component 352. The die holes 340 are contained within removable insert 350 and are variable in design, dimension, and placement as detailed in the foregoing discussion. The removable insert 350 is fixedly attached to outer die body component 352 by ordinary mechanisms.

Figure 11:
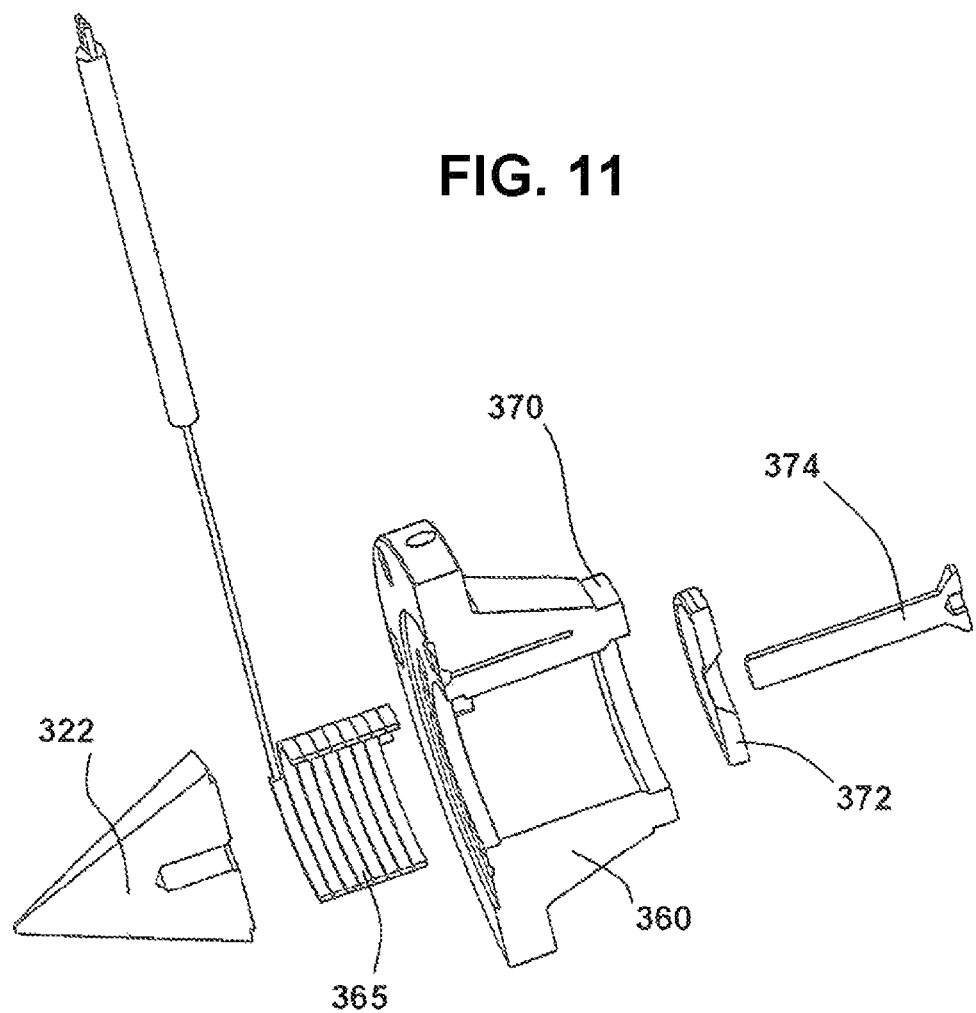
FIG. 11 is an expanded view illustration of the components of a removable center-heated die.

FIG. 11 shows an alternative design of die 320 in that the die body is of a removable center or insert configuration with multiple heating zones for enhanced heating efficiency and more facile thermal transfer to the molten or liquid materials as they pass through the die holes 340. The outer die body component, not shown, is comparable to that described for FIG. 10. The heated removable insert 360 of the alternative design has an open center to that is fitted a heating element 365, preferably a coiled heating element, that can be thermally controlled in common with other heating elements in the outer die body component or more preferably, is autonomously regulated thermally thus allowing multizone heating capacity within the die 320.

The die 320 in all configurations (FIGS. 8, 9, 10, and 11) can contain an appropriate hardface 370 fixedly attached for a cutting surface as illustrated in FIG. 11 that is preferably an abrasion resistant, wear resistant, and where required, is a corrosion resistant material and through that pass the die holes 340 for extrusion of the molten, liquid extrudate. Tungsten carbide, titanium carbide, ceramics or mixtures thereof, are common materials for hardface applications as is understood by those skilled in the art and are cited by way of example alone or in combination without intent to be limiting or otherwise restrictive within the scope of the present invention.

Surface treatments, surface finishing, polishing, or hard surfacing of die 320 are also within the scope of the present invention to provide additional protection to the die body exemplary of that is nickel phosphide, chrome plating, nitriding, or comparable treatment, physical or chemical, without intent of limitation or restriction on the extant invention. Prior art has demonstrated the use of different die hole sizes in at least one group where several groups of die holes are present or in that a particular group of die holes is of at least two different sizes. This has not found to be necessary or practical and often found to lead to freeze off or wrapping of the polymer around the face of the die. The instant invention does not reflect the need for simultaneous extrusion of different pellet sizes.

The bolting mechanism for the nose cone 322 is illustrated in FIG. 11 by way of example without limitation. A cover plate 372 is positionally attached by bolt 374 to the face of the die body 320 or removable insert 350 or heated removable insert 360, FIGS. 8, 10, and 11 respectively, that can be less than or at least equal to the height dimension of the hardface 370. Alternatively, gasket material or other materials for sealing of the cover plate 372 can be used as required.

Figure 12:
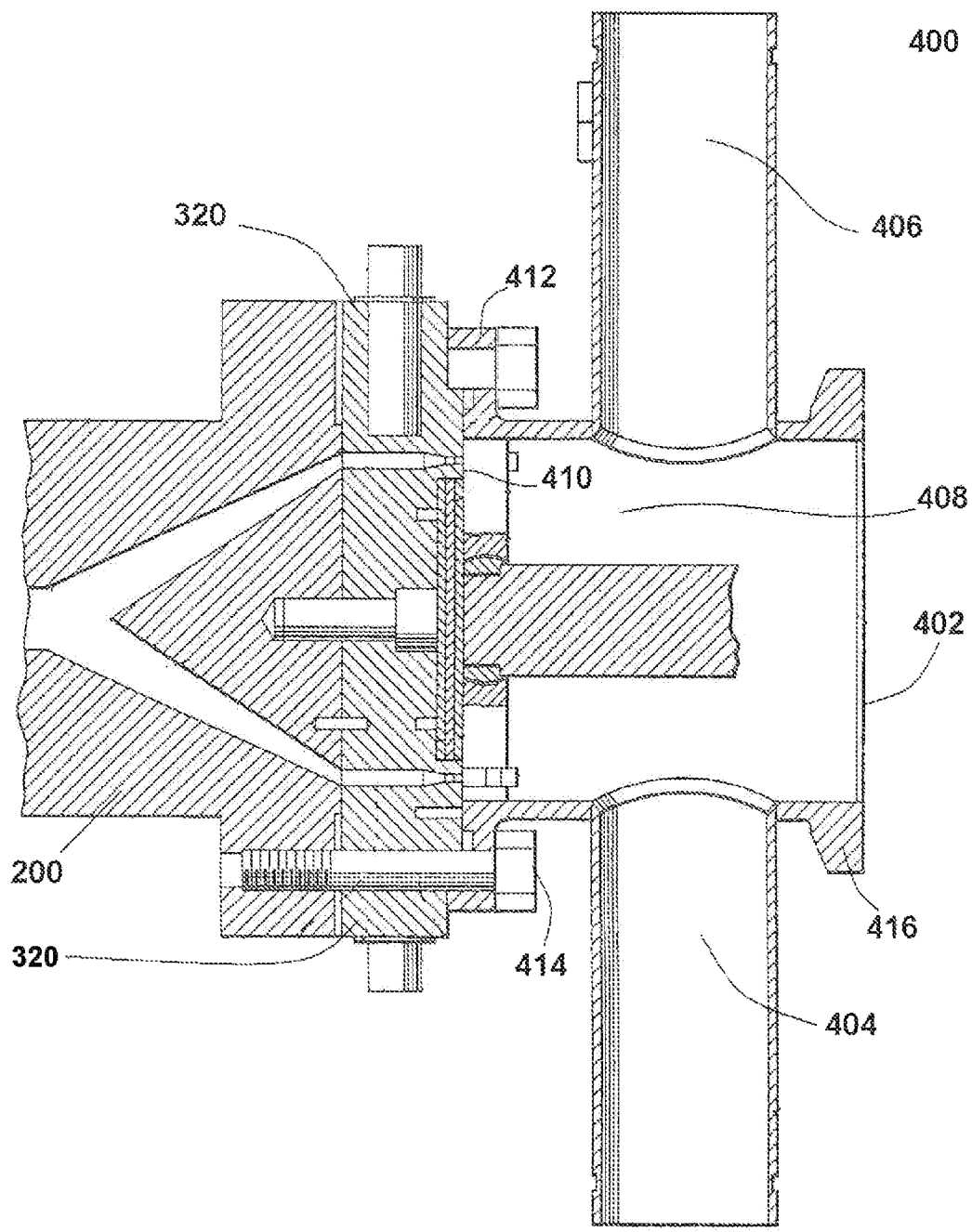
FIG. 12 is a schematic illustration of a die body with transport fluid box or waterbox.

Referring once again to FIG. 1, the die 320 is fixedly attached to transport fluid box or waterbox 400 as detailed in FIGS. 12, 13, 14, and 15a,b,c. FIG. 12 illustrates a configuration of a one-piece transport fluid box or waterbox 400 that comprises a housing 402 to that is connected inlet pipe 404 and outlet pipe 406 of similar diameter and geometry and diametrically opposed positionally and interconnectedly attached to a rectangular, square, or preferably cylindrical or other geometrically open cutting chamber 408 surrounding and of sufficient diameter to completely encompass the die face 410 (representationally equivalent to the surface of hardface 370 in FIGS. 8, 10, and 11). Housing 402 has mounting flange 412 through that a plurality of mounting bolts 414 pass to sealingly attach the transport fluid box or waterbox 400 and die 320 to diverter valve 200. Flange 416 on housing 402 allows attachment to the pelletizer 900 (see FIG. 1) as is detailed below. Components that are free to rotate within the cutting chamber 408 are described later in this disclosure.

Figure 13:
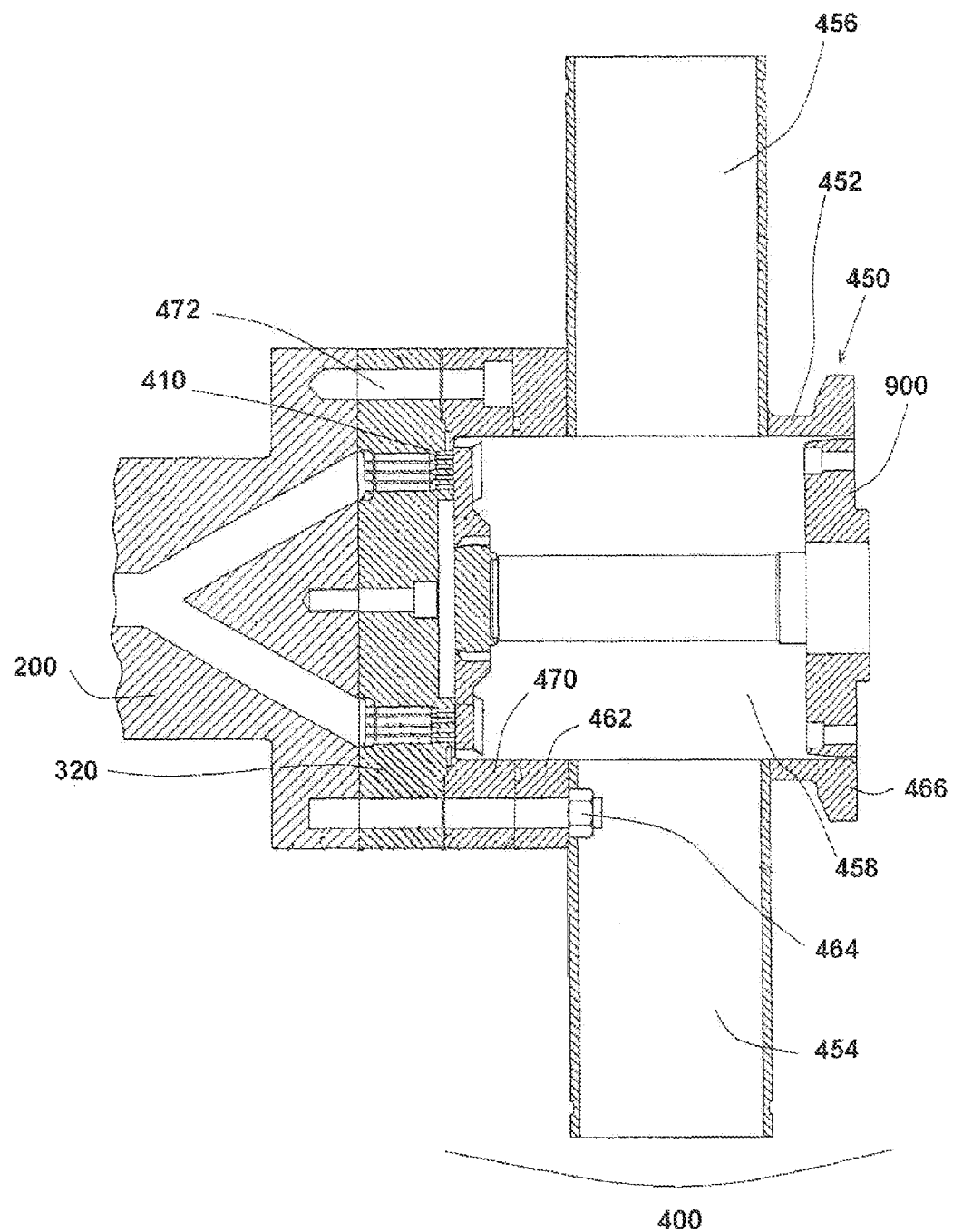
FIG. 13 is a schematic illustration of a die body and two-piece transport fluid box or waterbox.

Similarly, FIG. 13 illustrates a two-piece configuration of transport fluid box or waterbox 400 comprising a main body 450 with housing 452 to that is connected inlet pipe 454 and outlet pipe 456 of similar diameter and geometry and diametrically opposed positionally and interconnectedly attached to a rectangular, square, or preferably cylindrical or other geometrically open cutting chamber 458 surrounding and of sufficient diameter to completely encompass the die face 410 (representationally equivalent to the surface of hardface 370 in FIGS. 8, 10, and 11) comparably described above and as completely assembled as herein described. Housing 452 has mounting flange 462 through that a plurality of mounting bolts or studs 464 pass. Mounting flange 462 sealingly attaches to adapter ring 470 of comparable diameter, both inside and outside dimensions, through that pass a plurality of countersink bolts 472. Mounting bolts or studs 464 and countersink bolts 472 are preferably alternating positionally and sealingly attach the components of and thus the complete transport fluid box or waterbox 400 and die 320 to diverter valve 200. Flange 466 on housing 452 of the main body 450 allows attachment to the pelletizer 900 (see FIG. 1) as is detailed below. Components that are free to rotate within the cutting chamber 408 in FIG. 12 and/or cutting chamber 458 in FIG. 13 are described later in this disclosure. Separate attachment of the adapter ring 470 to and through the die 320 allows the main body 450 to be removed for cleaning or maintenance while leaving die body 320 sealingly attached to diverter valve 200.

Figure 14:
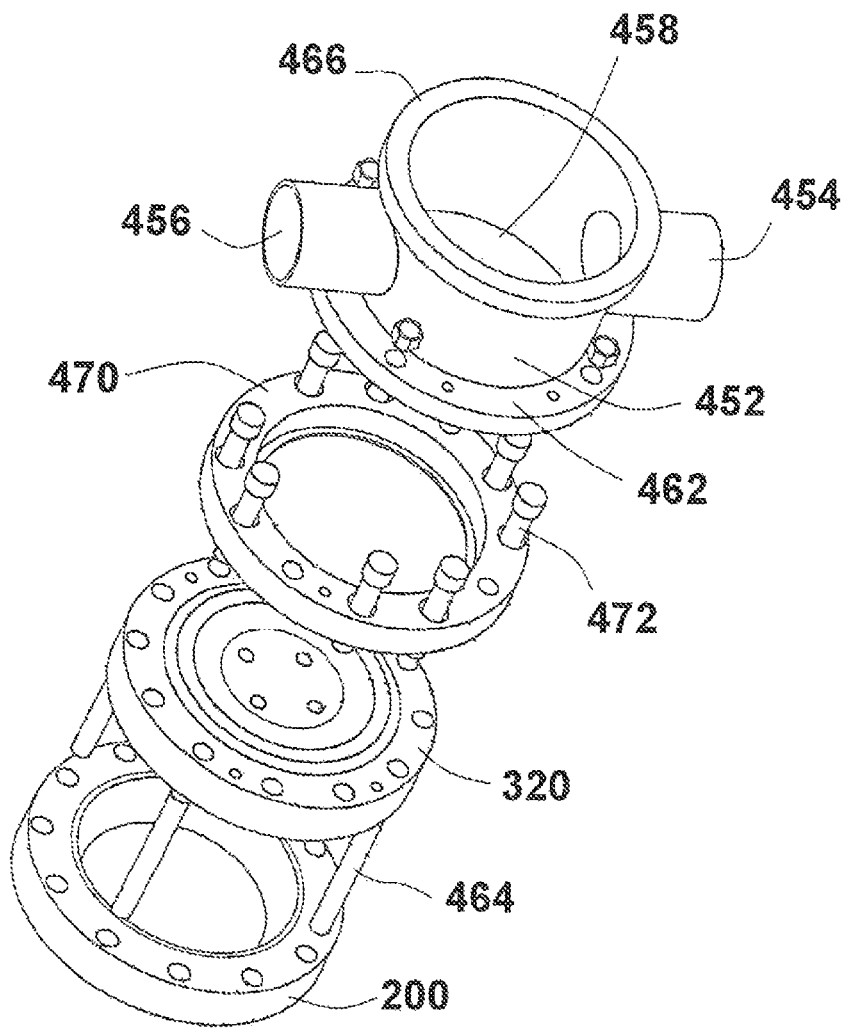
FIG. 14 is an expanded view illustration of a comparative two-piece waterbox or transport fluid box.
Figure 15C:
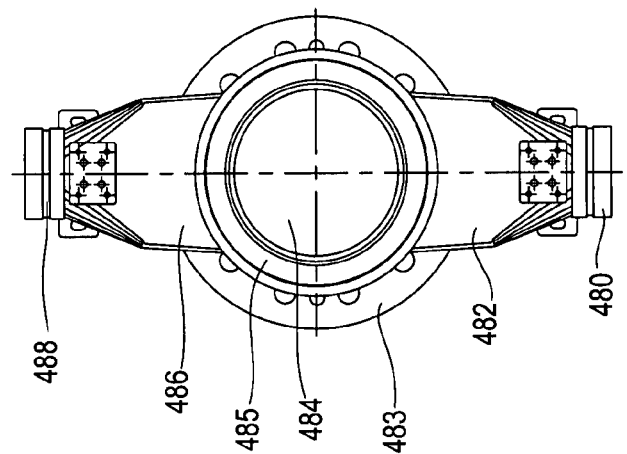
FIG. 15c is a schematic face-view illustration of the alternative waterbox or transport fluid box inlet and outlet design of FIG. 15b.
Figure 15B:
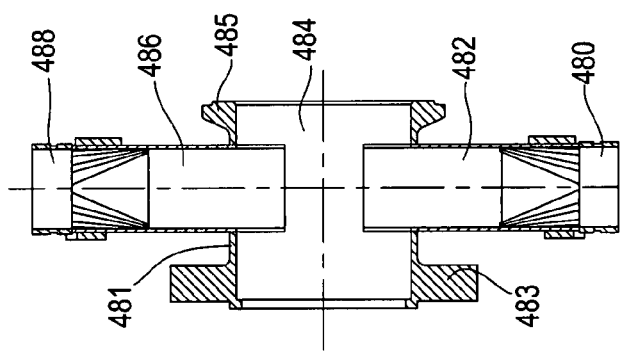
FIG. 15b is a cross-sectional illustration of an alternative waterbox or transport fluid box inlet and outlet design.
Figure 15A:
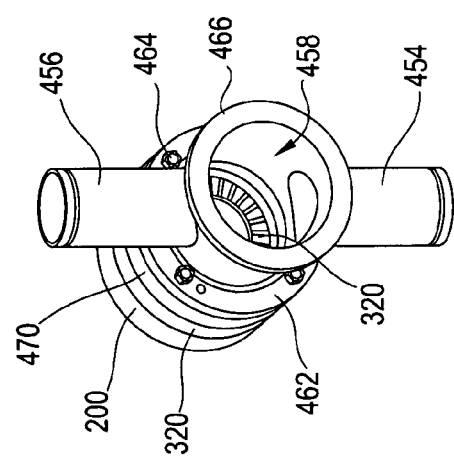
FIG. 15a is a schematic illustration of a complete assembly of a comparative two-piece waterbox or transport fluid box.

An exploded view of the two-piece configuration of transport fluid box or waterbox 400 is illustrated in FIG. 14 with a complete assembly illustrated in FIG. 15. All numbers retained to be consistent wherein similar parts have similar numbers in FIGS. 13, 14, and 15a.

FIGS. 15b and 15c illustrate an alternative design for the transport fluid box or waterbox inlet and outlet in that inlet 480 is fixedly attached to a rectangular or square inlet tube 482 that taperingly increases along its length as it approaches the housing 481 to that it is attachedly connected and within that is cutting chamber 484. Similarly attached to housing 481 and diametrically opposed to inlet tube 482 is rectangular or square outlet tube 486 that taperingly decreases along its length to outlet 488 to that it is fixedly attached. Flange 483 and flange 485 in FIGS. 15b and 15c compare in design and purpose to flanges 462 and 466 in FIG. 15a previously described.

FIGS. 15a, b, and c illustrate the preferred diametrically opposed inlets and outlets. Alternatively, the inlets, 454 and 480, and outlets, 456 and 488, can be located at an angle from approximately 20° to the preferred approximately 180° relative to and defined by the position of outlet to inlet and can be opposingly or staggeringly attached to housing 481 by way of example. Dimensions of the inlet and outlet can be the same or different and the inlet and outlet can be similar or different in design. Preferably the inlet and outlet so identified are of similar dimension and design, and are diametrically opposed.

Once again returning to the principle disclosure illustration in FIG. 1, pelletizer 900 is shown in the non-operational open position. Attached to the pelletizer is flow guide 800, and cutter hub 600 with cutter blades 700. Upon operation of the equipment, pelletizer 900 is moved into position such that it can be fixedly attached to flange 416 of the one-piece configuration of transport fluid box or waterbox 400 or flange 466 on the main body 450 of the two-piece configuration of transport fluid box or waterbox 400 as detailed in FIGS. 12 and 13, respectively. Attachment is most preferably made but not limited to quick disconnects but can be through many mechanisms. In the operating configuration, the cutter hub 600 and cutter blades 700 freely rotate within the cutting chamber 408 (FIG. 12) or 458 (FIG. 13). Details of all illustrated components are contained within the ensuing discussions.

Figure 16:
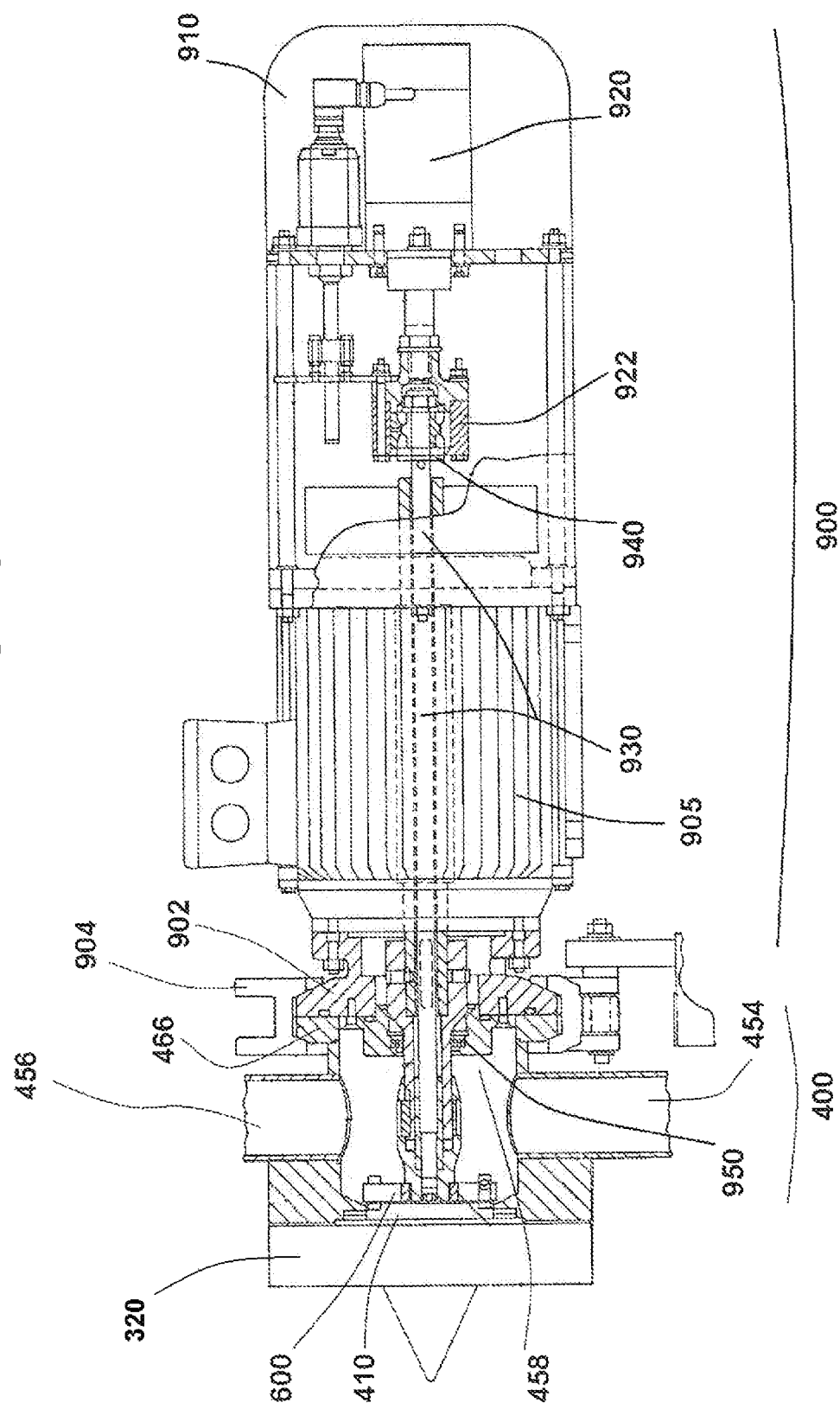
FIG. 16 is a schematic illustration of a pelletizer with attached waterbox or transport fluid box showing the die.

The pelletizer 900 of the instant invention is shown diagrammatically in FIG. 16 and can be adjustable positionally in terms of cutter hub 600 relationally to die face 410. FIG. 16 represents the pelletizer 900 in operational position wherein it is sealingly attached via pelletizer flange 902 to transport fluid box or waterbox flange 466 tightly held by removable quick disconnect clamp 904, for example. Positional adjustment of the pelletizer can be achieved manually, spring-loaded, hydraulically, pneumatically, or electromechanically, or can be achieved by combinations of these mechanisms acting cumulatively in one direction or opposingly in counter-direction of forces applied to insure appropriateness of position as necessitated to achieve even wear, increased longevity, avoidance of undue extrusion leading to melt wrap around the cutter hub or the die face 410, and consistency of the pelletized product. A preferred design is of the hydraulic-pneumatic mechanism detailed in FIG. 16 comprising a motor 905, housing 910, and containing hydraulic cylinder 920 engagedly attached to coupling 922. A rotor shaft 930 connects coupling 922 to the cutter hub 600 at the die face 410 and passes through thrust bearing 940 and sealing mechanism and preferably a mechanical sealing mechanism 950 in fluid contact with cutting chamber 458 of transport fluid box or waterbox 400. Inlet pipe 454 and outlet pipe 456 indicate flow direction of fluids, preferably water, into the cutting chamber 458, admixture of fluids and pellets in the cutting chamber 458, and subsequently, flow of the pellet slurry formed away from the cutter hub 600 as well as die face 410 and out of the cutting chamber 458.

Figure 17:
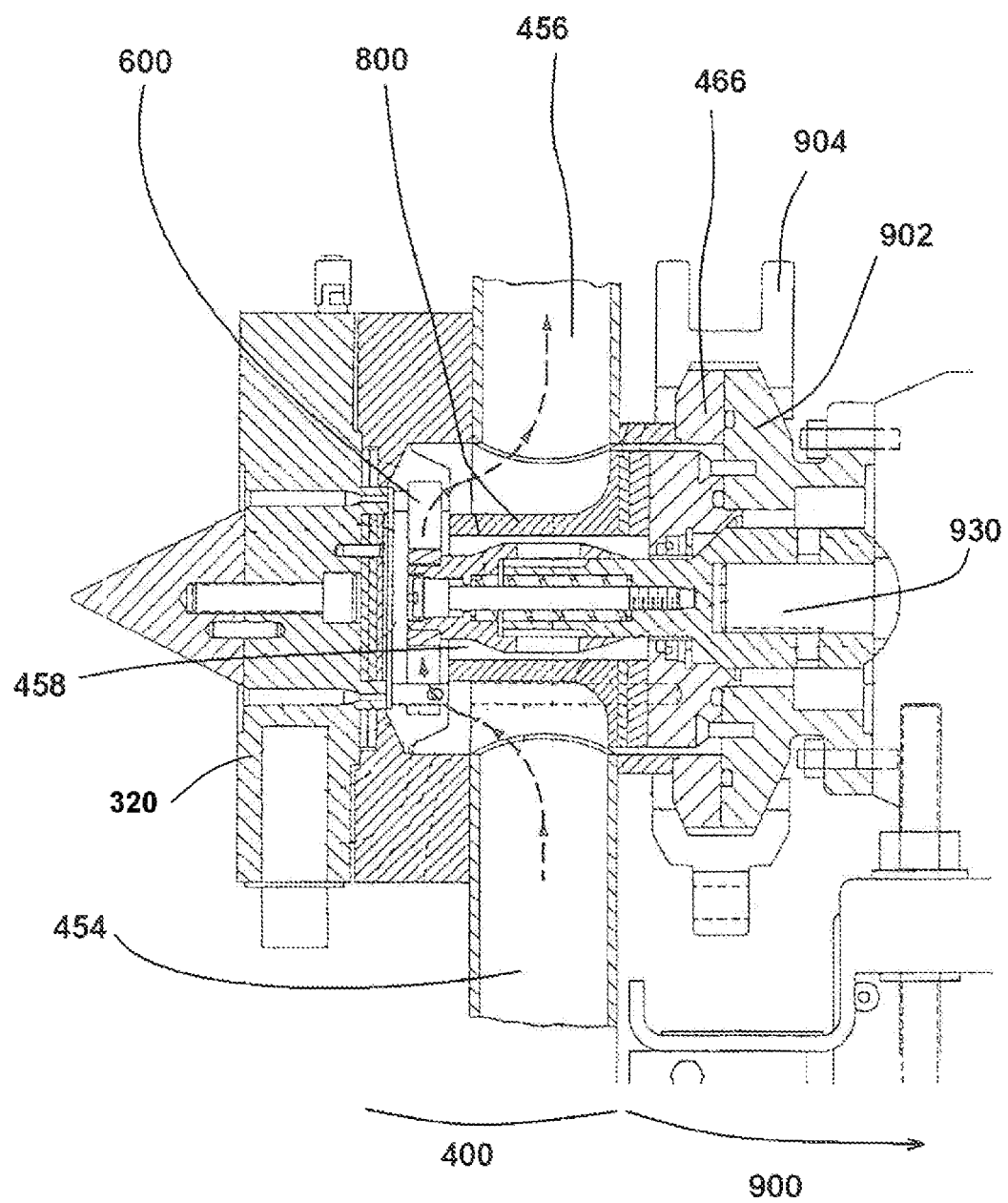
FIG. 17 is a schematic illustration of a die attached to a waterbox or transport fluid box containing a flow guide.
Figure 18A:
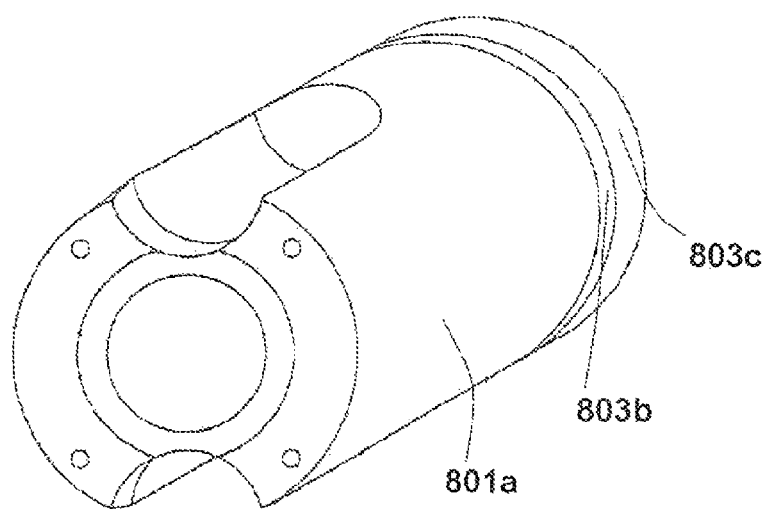
FIG. 18a is a schematic illustration of a comparative flow guide.
Figure 18B:
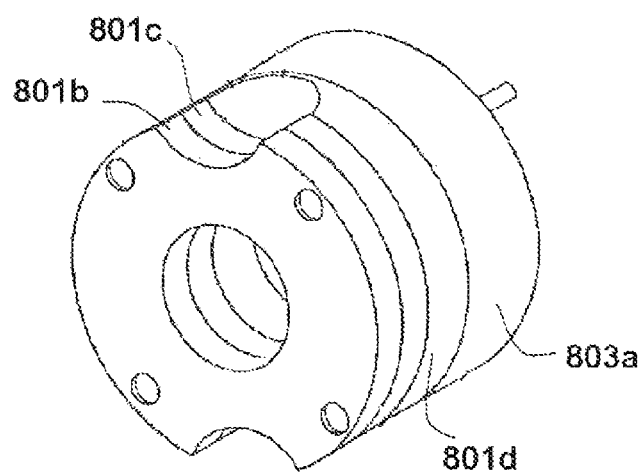
FIG. 18b is a schematic illustration of a second configuration of a comparative flow guide.

To increase fluid velocity through the cutting chamber 458, improve pellet quality, reduce freeze off, avoid wrapping of melt around die face 410, generate or increase head pressure, and improve pellet geometry, FIG. 17 illustrates a preferred configuration in that flow guide 800 is positioned in the cutting chamber 458 effectively reducing the fluid volume of that region. The die 320, transport fluid box or waterbox 400, and pelletizer 900, shown only partially, are positionally the same as in FIG. 16. The hollow shaft rotor preferably is attached to cutter hub 600 in cutting chamber 458 with appropriate inlet pipe 454 and outlet pipe 456 as previously described. The pelletizer 900 is sealingly and removably attached by transport fluid box or waterbox 400 through use of quick disconnect clamp 904 on pelletizer flange 902 and transport fluid box or waterbox flange 466 as before. FIGS. 18a and 18b show two possible different configurations for flow guide 800 in which sections can be of similar or different segmental length having consistent outside diameter that is less than the diameter of cutting chamber 458 and can be varied in accordance with the requisite diminution of volume desired in that cutting chamber 458. Flow guide spacer sections 803 can be approximately uniform circumferencially and diametrically as indicated singly by 803a, or plurally in 803b and 803c but can vary in segmental length and are not limited in plurality to two as shown. To direct and/or restrict flow, flow directing segments 801 singly in 801a or unlimited plurally in 801b, 801c, and 801d, for example, are modified by longitudinally extending grooves that are arcuate in transverse configuration with the deepest grooved section positioned proximal to the cutter hub 600. The preferred configuration of a series of segments is not intended to be limited as to number of segments and a single flow guide component of comparable geometry and functionality is well within the scope of the present invention.

Continuing with FIG. 16, cutter hub 600 is attached by screwing onto the threaded end of the rotor shaft 930 of pelletizer 900. The cutter hub 600 can be rigidly mounted to the rotor shaft 930 and can contain any number of cutter arms 610 in balanced proportion placed circumferentially about the cutter hub 600 as illustrated in FIG. 19. Alternatively and preferably, the cutter hub 600 is flexibly attached to rotor shaft 930 using an adapter 620 in that the adapter 620 is attachedly and threadedly connected to rotor shaft 930. Adapter 620 has a partial spherical outer surface 622 matching a similar partial spherical inner surface bore 602 in the cutter hub 600. Diametrically opposed and recessed into the partial spherical inner surface bore 602 are longitudinal recesses 605 that extend to the edge of the cutter hub 600 and into that fit ball 640. Similarly diametrical recesses 626 for ball 640 are located on adapter 620 positionally oriented such that longitudinal recess 605 and diametrical recess 626 align to interlockingly affix balls 640 once adapter is inserted orthogonally into position and rotated to a position parallel to cutter hub 600. This allows free oscillation of the cutter hub 600 about the diametrically positioned balls 640 on fixedly attached adapter 620 to rotor shaft 930 that permits rotational self-alignment of the cutter hub 600.

The cutter arms 610 and body of cutter hub 612 can be square or preferably rectangular in cross-section as shown in FIG. 19 or can be more streamlined to give an extended hexagonal cross-section as illustrated in FIG. 20*c*. FIGS. 20*a* and 20*b* shows segments of streamline cutter hub 650. Cutter blades (not shown) are fixedly attached by screw or similar mechanism at flattened angular groove 614, FIG. 19, or at flattened angular notch 652, FIG. 20*a* and *b*.

Figure 21:
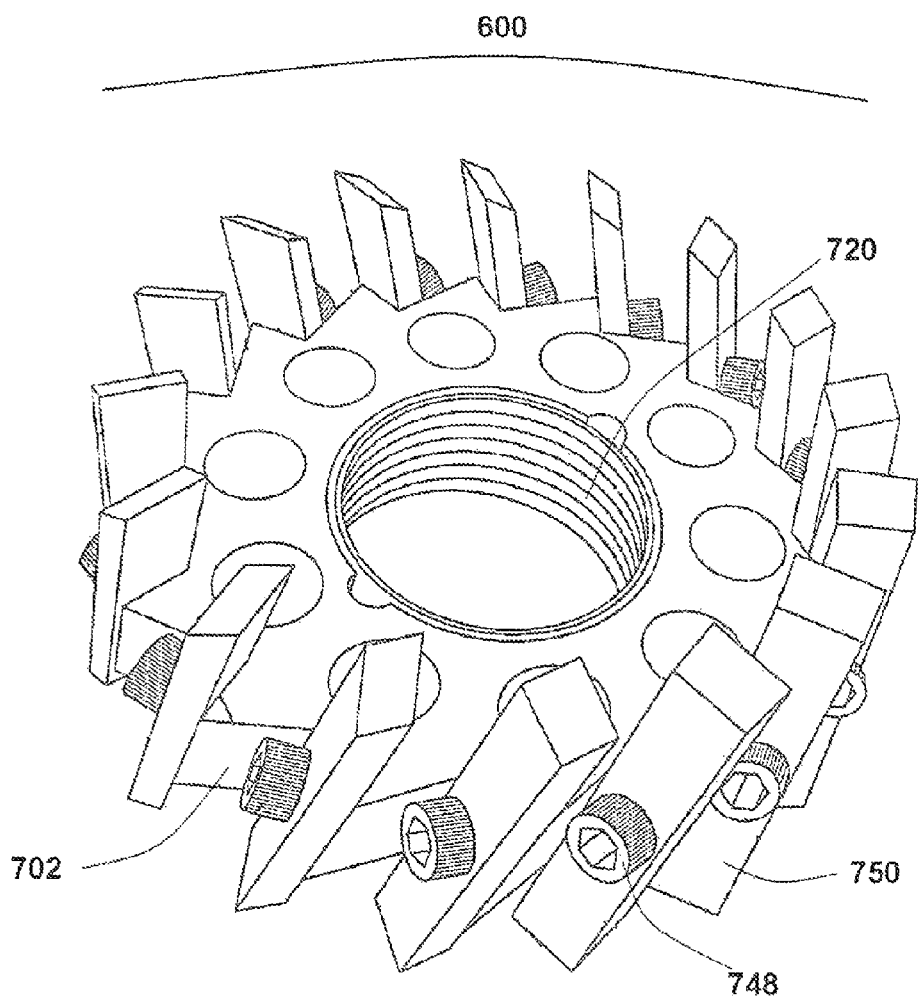
FIG. 21 is a schematic illustration of a steep angle cutter hub.
Figure 22A:
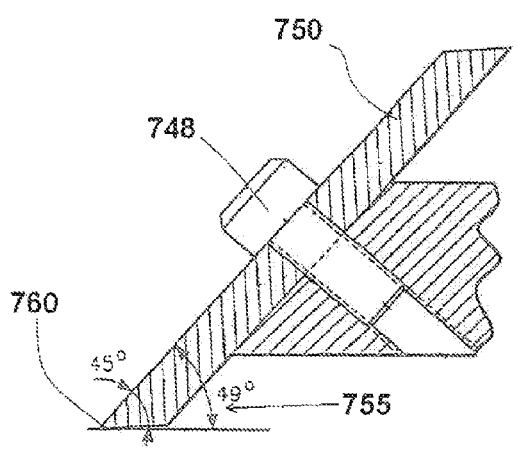
FIG. 22a is a schematic illustration of a comparative cutter hub with attached normal angle blade.
Figure 22B:
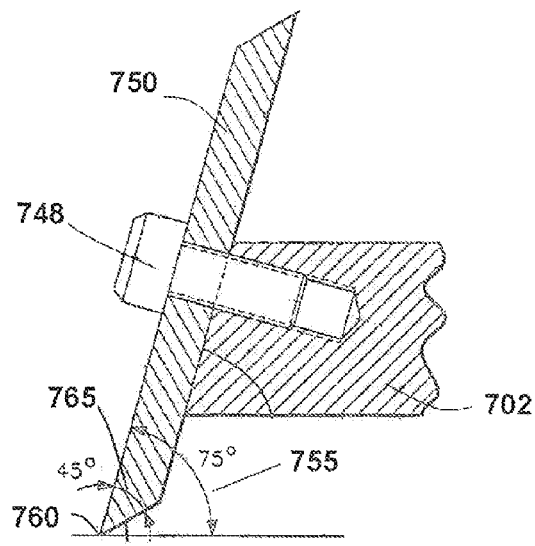
FIG. 22b is a schematic illustration of a steep angle cutter hub with attached blade.
Figure 22C:
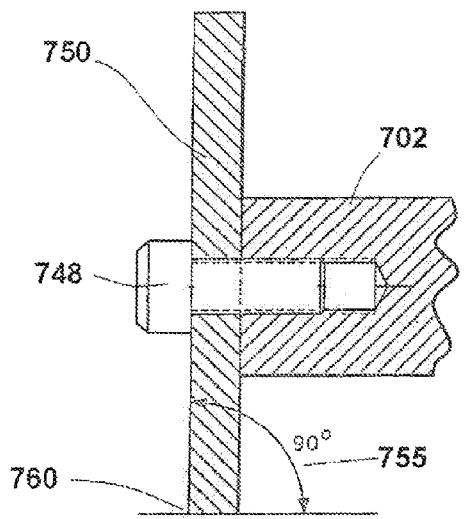
FIG. 22c is a schematic illustration of a comparative perpendicular angle cutter hub with attached non-tapered or square-cut blunted tip blade.
Figure 22D:
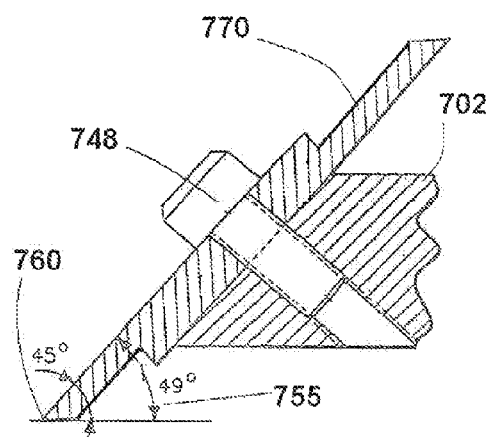
FIG. 22d is a schematic illustration of a cutter hub with attached reduced thickness blade at normal angle.

Alternatively, FIG. 21 illustrates the preferred steep-angle cutter hub 600, in that cutter arms 610 as shown in FIG. 19 are optionally replaced by cutter blade support 702 to that are attached cutter blade 750 preferably by screw 748 while other mechanisms are known to those skilled in the arts and are not limited as herein described. Adapter 720 allows self-aligning flexibility with threaded attachment to rotor shaft 930, FIG. 16, as detailed previously. Other cutter hub designs that are functionally equivalent are within the scope of the present invention as are known to those skilled in the art.

FIG. 22 illustrates various angularly inclined positions and shapes of the cutter blades 750 that are readily disclosed in the prior art. The blade angle 755 can vary from approximately 0° to approximately 110° or greater, FIGS. 22*a*, *b*, and *c*, relative to die hard face 370, FIG. 8, with a blade angle 755 of 60° to 79° preferred, FIG. 22*b*, and a blade angle of 75° more preferred. The blade cutting edge 760 can be square, beveled, or angled as has been demonstrated by prior art and is preferably at a blade cutting angle 765 of approximately 20° to approximately 50° and more preferred at approximately 45°. Alternatively, and most preferred, is a half-thickness blade 770 as illustrated in FIG. 22*d* that can be similarly attached, similarly angled, and with comparable blade cutting angles and preferences as described above. Additionally, blade designs, dimensionally and compositionally, can prove useful depending on other process parameters.

The cutter blade 750 compositionally includes but is not limited to tool steel, stainless steel, nickel and nickel alloys, metal-ceramic composites, ceramics, metal or metal carbide composites, carbides, vanadium hardened steel, suitably hardened plastic, or other comparably durable material and can be annealed, hardened, and/or surface treated as is well known to those skilled in the arts. Wear-resistance, corrosion resistance, durability, wear lifetime, chemical resistance, and abrasion resistance are some of the important concepts influencing the utility of a particular blade relative to the formulation being pelletized. Blade dimensions of length, width, and thickness as well as number of blades used relationally with cutter hub design are not limited within the scope of the present invention.

FIG. 1 illustrates the relative position of the bypass loop 550. Water or comparable fluid for use in the bypass loop 550 and pellet transportation is obtained from reservoir 1600 or other sources and is transported toward the transport fluid box or waterbox 400 through pump 500 that can be of a design and/or configuration to provide sufficient fluid flow into and through the optional heat exchanger 520 and transport pipe 530 to and into bypass loop 550. The heat exchanger 520 similarly can be of a design of suitable capacity to maintain the temperature of the water or other transport fluid at a temperature appropriately suitable to maintain the temperature of the pellets being formed such that pellet geometry, throughput, and pellet quality are satisfactory without tailing, and where wrap-around of molten plastic on the cutting face, agglomeration of pellets, cavitation, and/or accumulation of pellets in the transport fluid box or waterbox are avoided.

Temperatures and flow rates as well as composition of the transport fluid will vary with the material or formulation being processed. Transport fluid temperatures are maintained at least approximately 20° C. below the melting temperature of the polymer and preferably are maintained at a temperature of approximately 30° C. to approximately 100° C. below the melt temperature. Maintenance of the transport fluid temperature is more preferably maintained from approximately 0° C. to approximately 100° C., still more preferred from approximately 10° C. to approximately 90° C., and most preferably from approximately 60° C. to approximately 85° C.

Additionally processing aids, flow modifiers, surface modifiers, coatings, surface treatments including antistats and various additives known to those skilled in the arts can be accommodated in the transport fluid. Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the transport distance, vertical and horizontal, pressure level needed to suppress unwanted volatilization of components or premature expansion, pellet-transport fluid slurry flow through valving, coarse screening, and ancillary process and/or monitoring equipment. Pellet to transport fluid ratios should similarly be of varying proportions to be satisfactorily effective in eliminating or alleviating the above-mention complicating circumstances exemplary of that are pellet accumulation, flow blockage or obstruction, and agglomeration. Piping diameter and distances required are determined by the material throughput, thus the flow rate and pellet-transport fluid ratio, and time required to achieve an appropriate level of cooling and/or solidification of the pellets to avoid undesirable volatilization and/or premature expansion. Valving, gauges, or other processing and monitoring equipment should be of sufficient flow and pressure rating as well as of sufficient throughpass diameter to avoid undue blockage, obstruction or otherwise alter the process leading to additional and undesirable pressure generation or process occlusion. Transport fluid and additive composition should be compatible with the components of the pellet formulation and should not be readily absorbed into or adsorbed onto any of the components in that formulation. Excess transport fluid and/or additives should be readily removable from the pellets by such methods as rinsing, aspiration, evaporation, dewatering, solvent removal, filtration, or a similar technique understood by those skilled in the arts.

Figure 23:
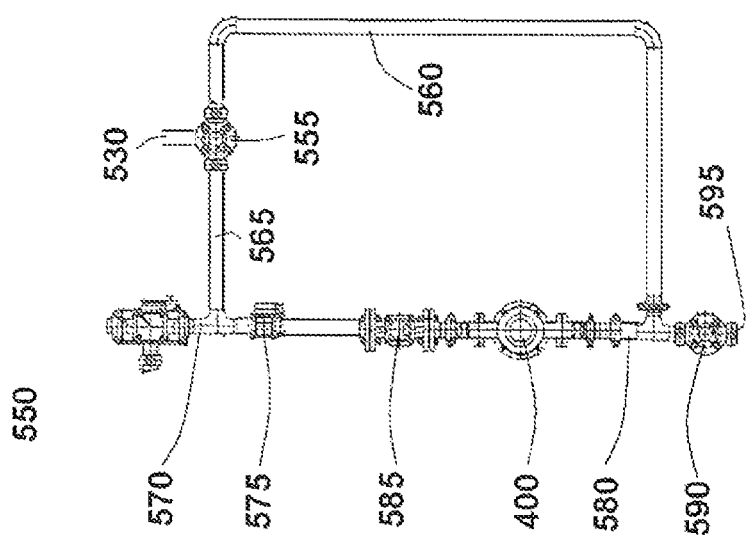
FIG. 23 is a schematic illustration of a comparative waterbox bypass.

The standard bypass loop 550, as illustrated in FIG. 23, allows the transport fluid, preferably water, from inlet pipe 530 to enter three-way valve 555 and be redirected into the bypass flow or toward the transport fluid box or waterbox 400. To bypass the transport fluid box or waterbox 400, the transport fluid is directed by three-way valve 555 into and through bypass pipe 565 into outlet pipe 570. To achieve this, blocking valve 575 is closed. Alternatively, to allow water to flow to and through the transport fluid box or waterbox 400 the three-way valve 555 is directed to allow flow into and through pipe 560 and into pipe 580 with blocking valve 575 open and with drain valve 590 closed. Water proceeds into and through transport fluid box or waterbox 400 and transports pellets into and through sight glass 585 through blocking valve 575 and into 570 for down-stream processing as described below. To drain the system and allow cleaning or maintenance of the transport fluid box or waterbox 400 or die hardface 370 or to replace any of the die 320 components, three-way valve 555 directs flow into and through pipe 565 and into pipe 570. With blocking valve 575 now closed and drain valve 590 open, the water remaining entrapped below 575, in components 585, 400, 560, and 580 drains out drain 595 for recycling or disposal.

Once the pellet is sufficiently solidified for processing, it is transported via pipe 1270 to and through an agglomerate catcher/dewatering unit 1300 and into the drying unit 1400, and downstream processes 2000, as illustrated in FIG. 1.

The dryer 1400 can be any apparatus for achieving a controlled level of moisture for materials that can be flake, globular, spherical, cylindrical, or other geometric shapes. It can be achieved but is not limited by filtration, centrifugal drying, forced or heated air convection or a fluidized bed and is preferred to be a centrifugal dryer, and is most preferred to be a self-cleaning centrifugal dryer 1400.

Figure 24:
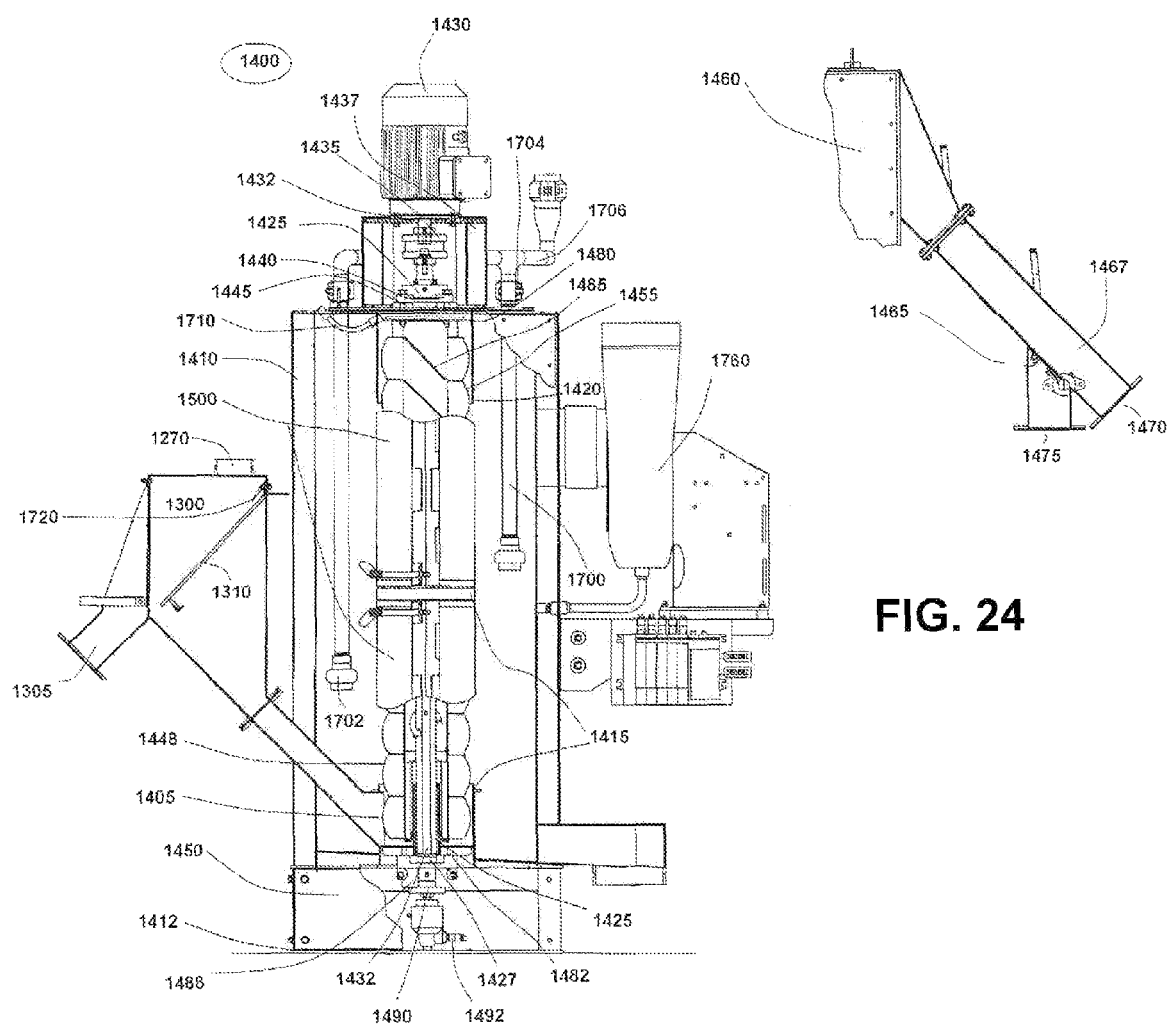
FIG. 24 is a schematic illustration of a comparative self-cleaning dryer.
Figure 25:
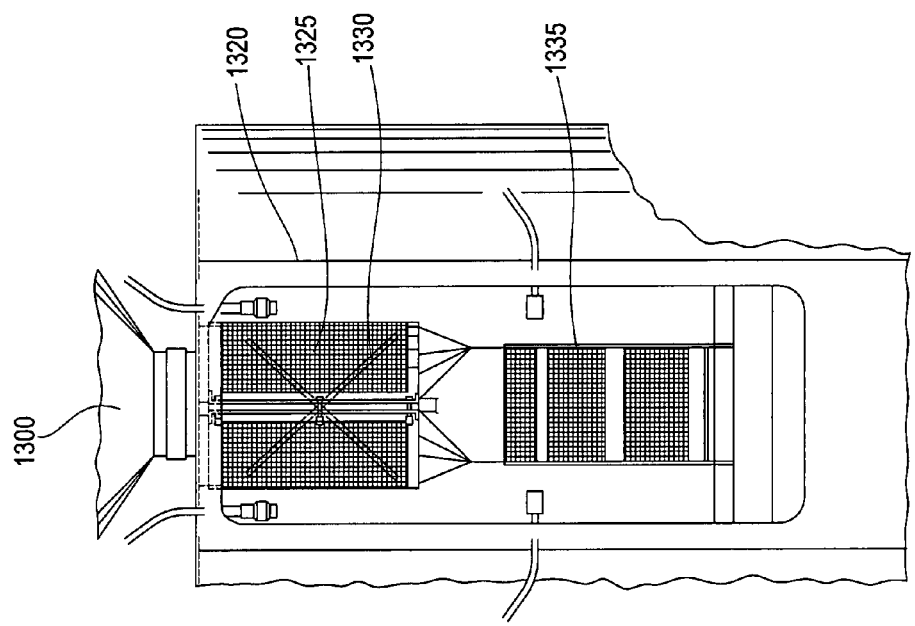
FIG. 25 is a schematic illustration of the dewatering portion of the self-cleaning dryer in FIG. 24.
Figure 27:
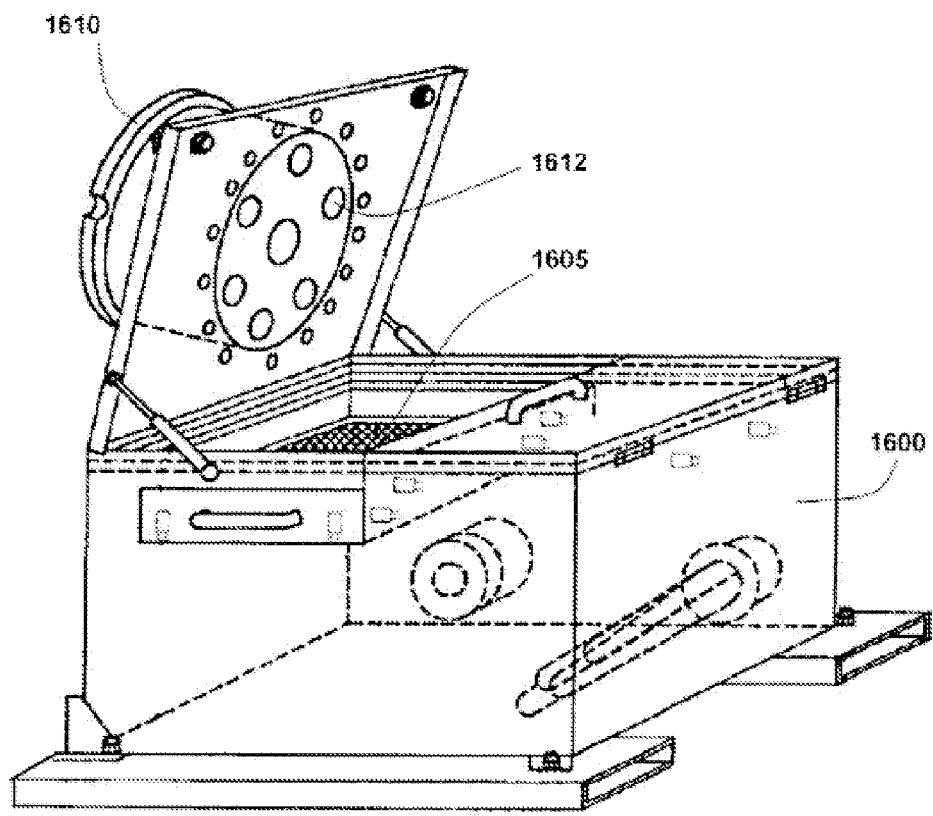
FIG. 27 is a schematic illustration of a reservoir.

Turning now to FIG. 24, the pipe 1270 discharges the pellets and fluid slurry or concentrated slurry into an agglomerate catcher 1300 that catches, removes and discharges pellet agglomerates through a discharge chute 1305. The agglomerate catcher 1300 includes an angled round bar grid, perforated plate or screen 1310 that permits passage of fluid and pellets but collects adhered, clumped, or otherwise agglomerated pellets and directs them toward the discharge chute 1305. The pellets and fluid slurry then optionally pass into a dewaterer 1320, FIG. 24 with additional detail in FIG. 25, that includes at least one vertical or horizontal dewatering foraminous membrane screen 1325 containing one or more baffles 1330 and/or an inclined foraminous membrane screen 1335 that enables fluid to pass downwardly into a fines removal screen 1605 and therethrough to the water reservoir 1600 (FIGS. 1 and 27). The pellets that still retain moisture on their surfaces are discharged from dewaterer 1320 into the lower end of the self-cleaning centrifugal dryer 1400 at a slurry inlet 1405, FIG. 24.

As illustrated in FIG. 24, the self-cleaning centrifugal pellet dryer 1400 includes but is not limited to a generally cylindrical housing 1410 having a vertically oriented generally cylindrical screen 1500 mounted on a cylindrical screen support 1415 at the base of the screen, and a cylindrical screen support 1420 at the top of the screen. The screen 1500 is thus positioned concentrically within the housing 1410 in radially spaced relation from the inside wall of the housing.

Figure 26:
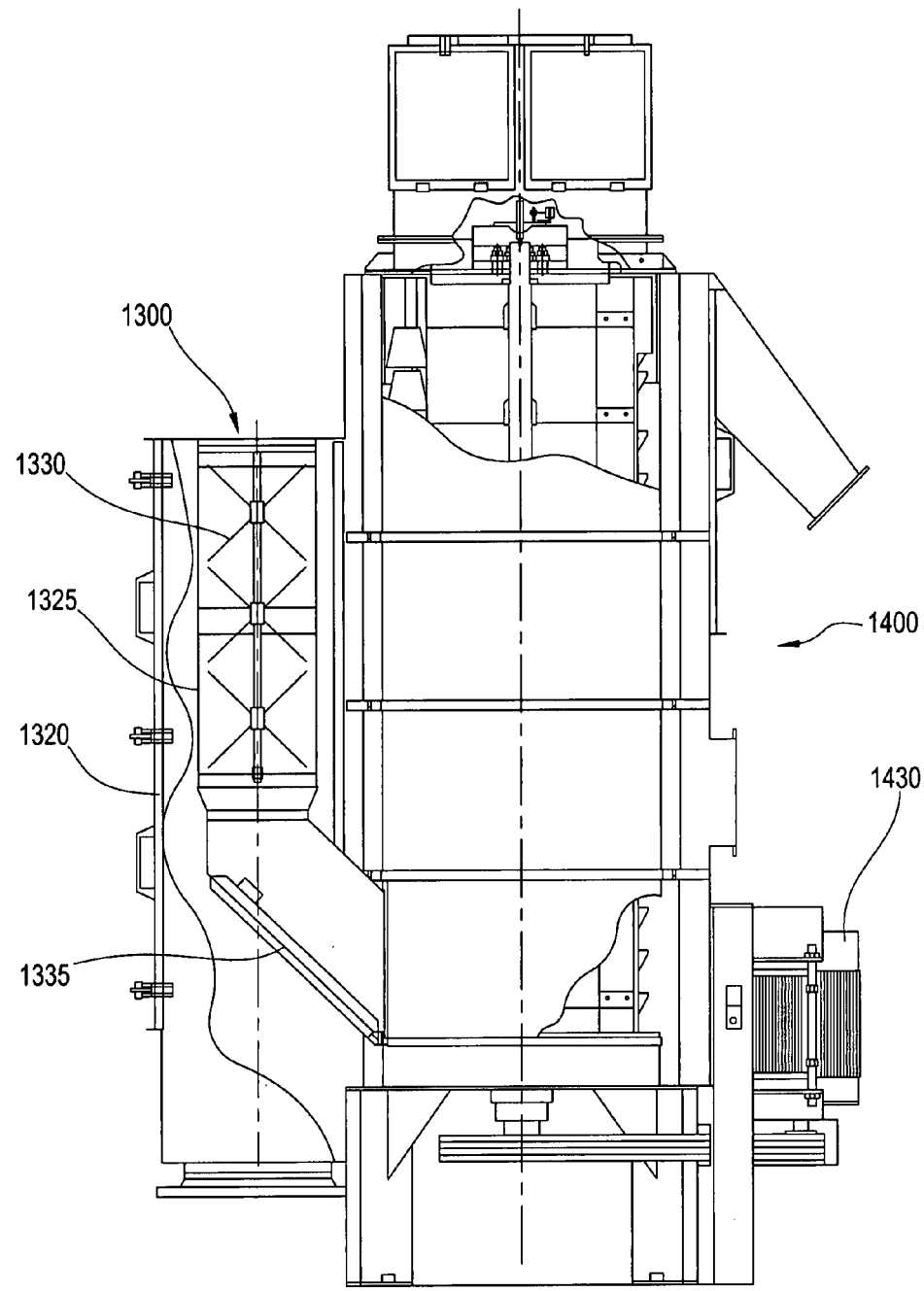
FIG. 26 is a schematic illustration of a second comparative dryer with attached dewatering section.

A vertical rotor 1425 is mounted for rotation within the screen 1500 and is rotatably driven by a motor 1430 that can be mounted at and/or connected to the base of the dryer (FIG. 26) or at the top of the dryer and is preferably mounted atop the upper end of the dryer, FIG. 24. The motor 1430 is connected to the rotor 1425 by a drive connection 1435 and through a bearing 1440 connected with the upper end of the housing. The connection 1445 and bearing 1440 support the rotor 1425 and guide the rotational movement of the upper end of the rotor. The slurry inlet 1405 is in communication with the lower end of the screen 1500 and rotor 1425 through the lower screen support section 1450 at connection 1448, and the upper end of the housing and rotor is in communication with a dried pellet discharge chute 1460 through a connection, not shown, in the upper screen support section 1455 at the upper end of the housing. A diverter plate 1465 in outlet 1467 can divert dried pellets out of exit 1470 or exit 1475.

The housing 1410 is of sectional construction connected at a flanged coupling, not shown, at a lower end portion of the dryer and a flanged coupling, not illustrated, at the upper end portion of the dryer. The uppermost flange coupling is connected to a top plate 1480 that supports bearing structure 1440 and drive connection 1435 that are enclosed by a housing or guard 1437. A coupling 1432 atop the housing 1437 supports the motor 1430 and maintains all of the components in assembled relation.

The lower end of the housing 1410 is connected to a bottom plate 1412 on top of a water tank or reservoir 1600 by a flange connection 1610 as illustrated in FIG. 27. Apertures 1612 communicate the lower end of the dryer housing with the reservoir 1600 for discharge of fluid from the housing 1410 into the reservoir 1600 as the surface moisture is removed from the pellets. This removal is achieved by action of the rotor that elevates the pellets and imparts centrifugal forces to the pellets so that impact against the interior of the screen 1500 will remove moisture from the pellets with such moisture passing through the screen and ultimately into the reservoir 1600 in a manner well known in the art.

The self-cleaning structure of the disclosed dryer includes a plurality of spray nozzle or spray head assembly 1700 supported between the interior of the housing 1410 and the exterior of the screen 1500 as illustrated in FIG. 24. The spray nozzle assembly 1700 is supported at the end of spray pipes 1702 extending upwardly through top plate 1480 at the upper end of the housing with the upper ends 1704 of the spray pipes 1702 being exposed. Hoses or lines 1706 feed high pressure fluid, preferably water at a flow rate of at least 40 gpm, and preferably about 60 gpm to about 80 gpm, and more preferably at 80 gpm or higher to the spray nozzles 1700. The hoses 1706 can optionally feed off a single manifold (not shown) mounted on the dryer 1400.

There are preferably at least three spray nozzle assemblies 1700 and related spray pipes 1702 and lines 1706. The spray nozzle assembly 1700 and pipes 1702 are oriented in circumferentially spaced relation peripherally of the screen 1500 and oriented in staggered vertical relation so that pressurized fluid discharged from the spray nozzles 1700 will contact and clean the screen 1500, inside and out, as well as the interior of the housing 1410. Thus, any collected pellets that can have accumulated or lodged in hang-up points or areas between the outside surface of the screen 1500 and inside wall of the housing 1410 are flushed through apertures 1612 into the reservoir 1600, FIG. 27. Similarly, leftover pellets inside the screen 1500 and outside the rotor 1425 are flushed out of the dryer and will not contaminate or become mixed with pellets passing through the dryer during a subsequent drying cycle in that a different type pellet is dried.

The region between the screen support section 1450 at the lower end of the dryer and the inner wall of the housing 1410 includes flat areas at the port openings and seams that connect the components of the dryer housing together. The high pressure water from the spray nozzle assembly 1700 effectively rinses this region as well. The base screen support section 1450 is attached to the bottom plate 1412 of the housing 1410 and reservoir 1600 by screws or other fasteners to stationarily secure the housing and screen to the reservoir 1600. The base screen support section 1450 is in the form of a tub or basin as shown in FIG. 24. Alternatively, in other dryers the base screen support section 1450 can be in the form of an inverted tub or inverted base (not shown).

The rotor 1425 includes a substantially tubular member 1427 provided with inclined rotor blades 1485 thereon for lifting and elevating the pellets and subsequently impacting them against the screen 1500. In other dryers, the rotor 1410 can be square, round, hexagon, octagon or other shape in cross-section. A hollow shaft 1432 extends through the rotor 1425 in concentric spaced relation to the tubular member 1427 forming the rotor. The hollow shaft guides the lower end of the rotor as it extends through an opening 1482 in a guide bushing 1488 at the lower end of the rotor 1425, as well as aligned openings in bottom plate 1412 and the top wall of the reservoir 1600, respectively. A rotary coupling 1490 is connected to the hollow shaft 1432 and to a source of fluid pressure, preferably air (not shown) through hose or line 1492 supply to pressurize the interior of the hollow shaft 1432.

The hollow shaft 1432 includes apertures to communicate the interior of the hollow rotor member 1427. These holes introduce the pressurized fluid, preferably air, into the interior of the rotor 1425. The rotor 1425 in turn has apertures in the bottom wall that communicate the bottom end of the rotor 1425 with the interior of the base or tub section 1450 to enable the lower end of the rotor 1425 and the tub section 1450 to be cleaned. Pellets flushed from the rotor and inside screen 1500 are discharged preferentially through the dried pellet outlet chute 1460.

The top of the rotor 1425 inside top section 1455 is also a hang-up point and subjected to high pressure fluid, preferably air, to dislodge accumulated pellets. As shown in FIG. 24, a nozzle 1710 directs the high pressure air across the top of the rotor 1425 to drive accumulated pellets out of the top section and preferentially into the pellet outlet chute 1460. The nozzle 1710 is fed by an air hose or line, not shown, that extends through top plate 1480 and is connected to a high pressure air source.

In addition to hang-up points or areas occurring in the dryer structure, the agglomerate catcher 1300 can also be cleaned by a separate pipe or hose 1720 controlled by a solenoid valve that directs high pressure fluid onto the pellet contact side of the angled agglomerate grate or catcher plate and bar rod grid 1310 to clean off agglomerates that are then discharged through the discharge tube or chute 1305.

A hose and nozzle supply bursts of air to discharge chute or pipe 1460 in a direction such that it cleans the top of the rotor 1425 and the pellet discharge outlet 1460. The air discharge blows pellets past pipe connections and the diverter plate 1465 in outlet 1467 for discharge of dried pellets out of the dryer.

The rotor 1425 is preferably turning continuously during the full cleaning cycle. Solenoid valves are provided to supply air preferably at about 60 psi to 80 psi, or more, to additional hang-up points not shown that include the water box bypass air port, rotor air ports, top section air port, pellet outlet air port and diverter valve air port. The solenoid valves include timers to provide short air bursts, preferably about three seconds, which cleans well and does not require a lot of time. A clean cycle button (not shown) activates the cleaning cycle with the water box bypass air port being energized first to allow air to purge the bypass with a multiplicity of air bursts, preferably five or more. The top section air port is then activated. This is followed sequentially with activation of the diverter plate 1465. This valve closes prior to activation of the spray nozzle assembly 1700 that washes the screen for one to ten seconds, preferably about six seconds. The blower 1760 should be deactivated during the water spray cycles and is then reactivated when the spray nozzle pump is de-energized thus completing one cleaning cycle. The cycle as herein described is not limited in scope and each component of the cycle can be varied in frequency and/or duration as necessitated to achieve appropriate removal of the residual pellets.

Figure 28:
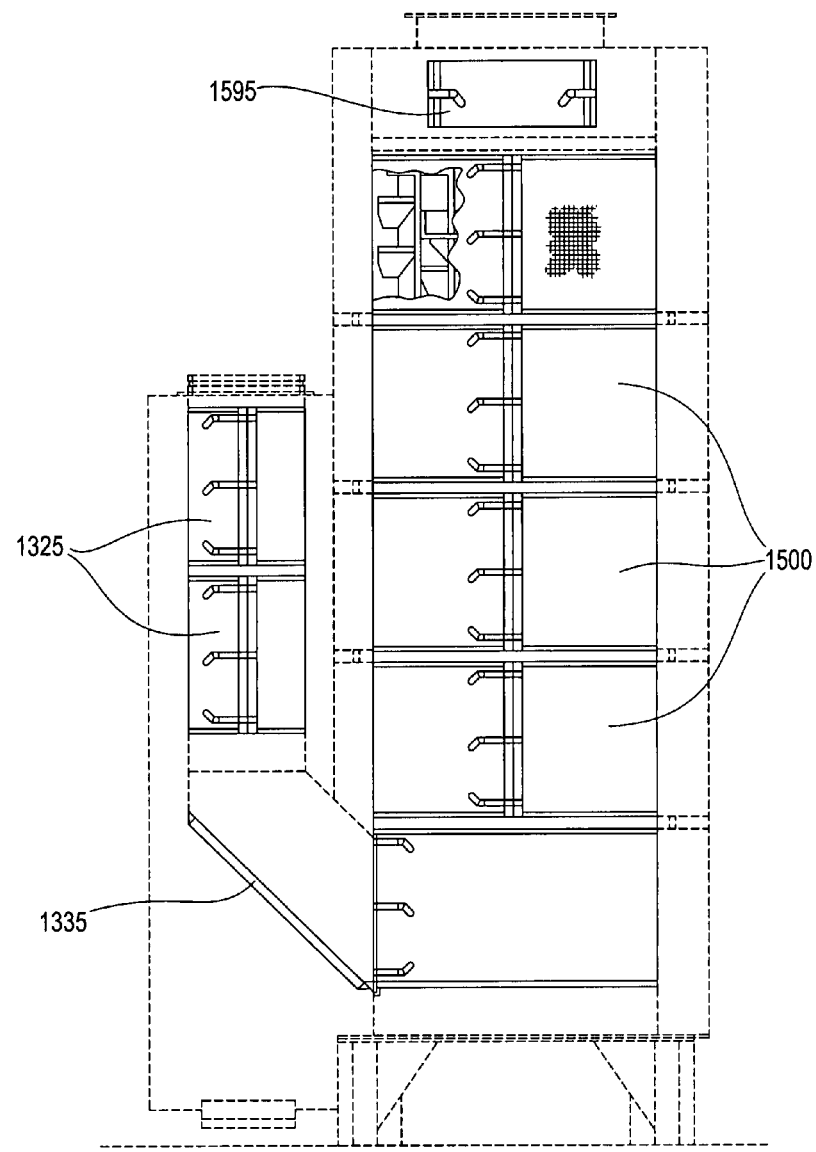
FIG. 28 is a schematic illustration of a dryer showing dewatering screen and centrifugal drying screen positioning.

The screens for the process include none, one or more horizontal or vertical dewatering screens 1325, inclined dewatering screen 1335, port screens 1595, and/or one or more cylindrically attachable screens 1500 as illustrated in FIG. 28. The size, composition, and dimensions of the screens should accommodate the pellets being generated and can be perforated, punched, pierced, woven, or of another configuration known to those skilled in the arts and can be the same or different in construction, composition, and style. As the pellet size decreases in diameter, preferably the screens will be composed of two or more layers that can be of similar or different composition, design, and size. The screens are fixedly attached by latches, clamps, bolts, or any mechanism appropriately understood by those skilled in the arts.

Figures 31, 32:
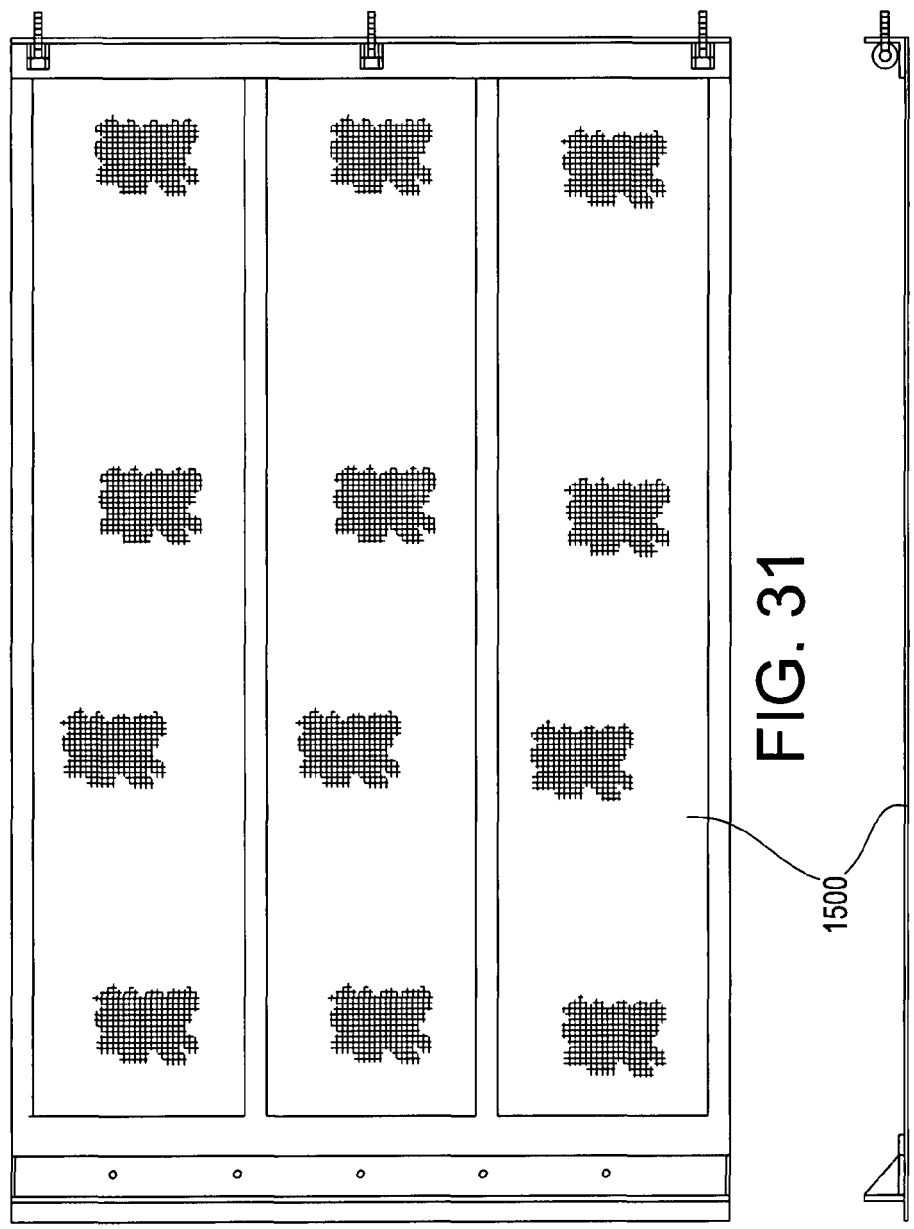
FIG. 31 illustrates a dryer screen of a configuration not requiring deflector bars.
FIG. 32 is a cross-sectional illustration of the dryer screen of FIG. 31 without deflector bars.
Figure 33:
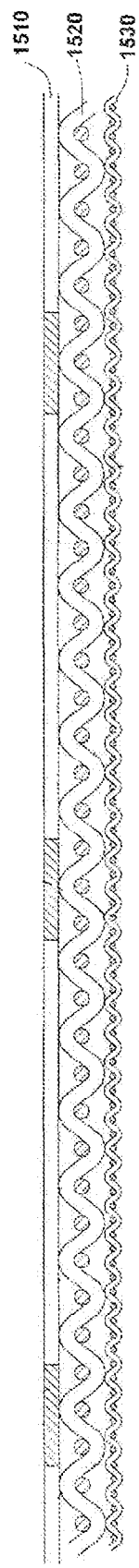
FIG. 33 illustrates an enlarged edge-on view of a three-layer screen.
Figure 34:
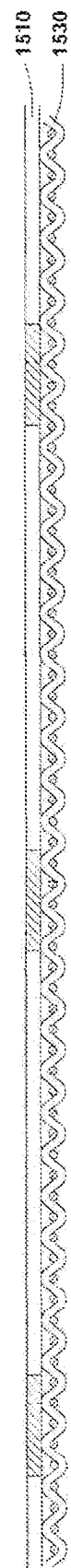
FIG. 34 illustrates an enlarged edge-on view of a two-layer screen.
Figure 35:
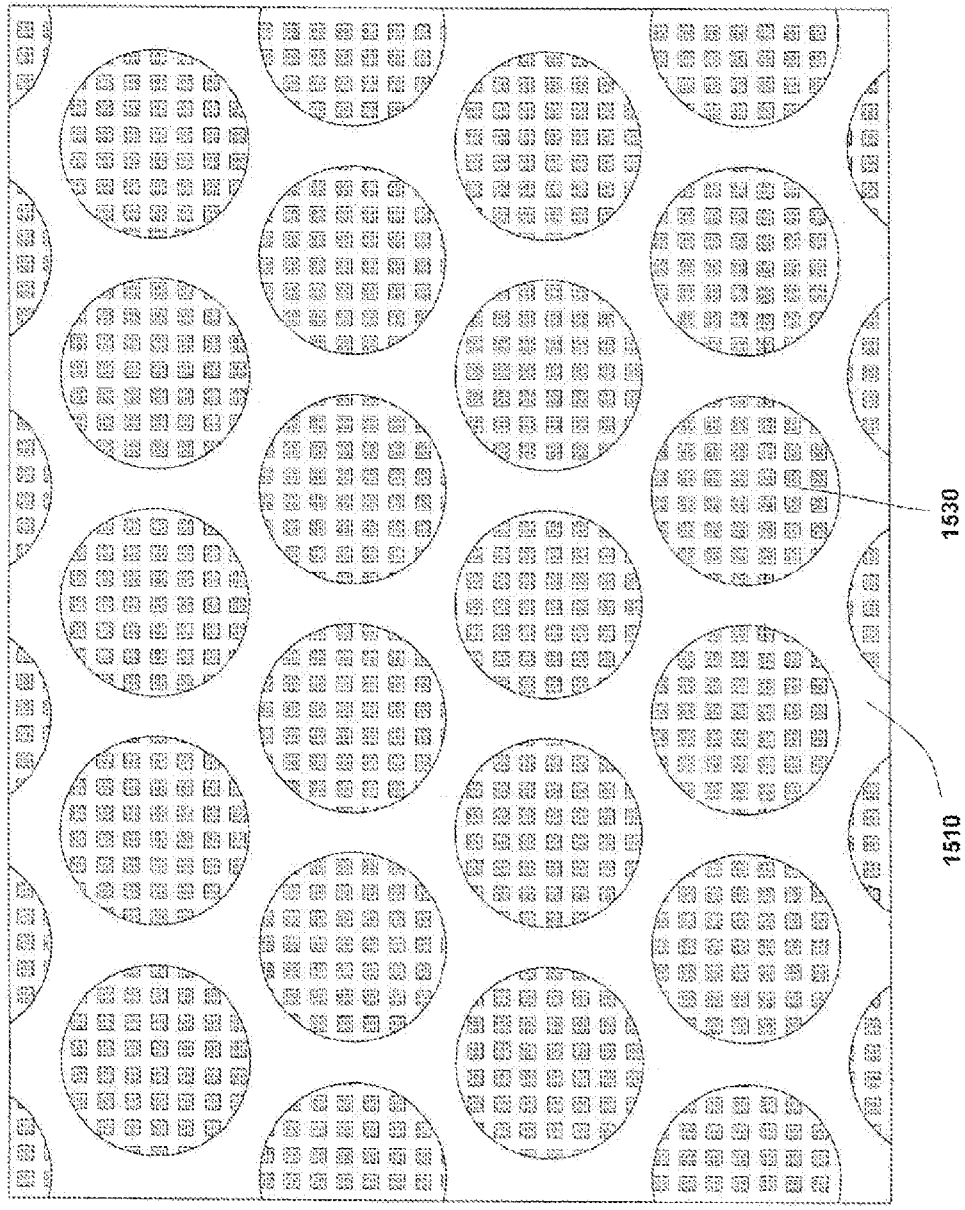
FIG. 35 illustrates an enlarged external view of a multi-layer screen following FIG. 34.

The screens 1500 are preferably of suitably flexible construction as to be circumferentially placed around the dryer 1400 and rotor 1425 and can contain deflector bars 1550 as illustrated in FIG. 29, face view, and FIG. 30, edge view, that are bolted in placed effectively segmentalizing the screen area into approximately equal areas. Alternatively, the screens can by free of deflector bars as seen face view in FIG. 31 with an edge view illustrated in FIG. 32. Preferably screens 1500 are compositionally two or more layers functionally incorporating an outer support screen and an inner screen that accomplishes the effective drying of the pellets and smaller micropellets. Additionally, one or more screen layers can be sandwiched between the outer support screen and the inner screen depending upon the particular application. FIG. 33 illustrates an edge view of a three-layer composition and FIG. 34 illustrates a similar edge view of a two-layer composition. FIG. 35 illustrates a surface view of a two-layer screen composition in that the view is from the side of the support layer through that is visualized the finer mesh screen layer.

The outer support screen 1510 can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers. Preferably the outer support screen 1510 is a metal plate of suitable thickness to maintain the structural integrity of the overall screen assembly and flexible enough to be contoured, exemplarily cylindrically, to fit tightly and positionally in the appropriate centrifugal pellet dryer. The metal plate is preferably 18 gauge to 24 gauge and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel as necessitated environmentally by the chemical processes undergoing the drying operation.

The metal plate can be pierced, punched, perforated, or slotted to form openings that can be round, oval, square, rectangular, triangular, polygonal, or other dimensionally equivalent structure to provide open areas for separation and subsequent drying. Preferably the openings are round perforations and geometrically staggered to provide the maximum open area while retaining the structural integrity of the outer support screen. The round perforations are preferably at least approximately 0.075 inches in diameter and are positionally staggered to provide an open area of at least approximately 30%. More preferred is an open area geometric orientation such that the effective open area is approximately 40% or more. Most preferred are round perforations having a diameter of at least approximately 0.1875 inches that are positionally staggered to achieve an open area of approximately 50% or more.

Alternatively, the outer support screen can be an assembled structure or screen composed of wires, rods, or bars, stacked angularly or orthogonally, or interwoven, and welded, brazed, resistance welded or otherwise permanently adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal or structurally similar. The wires, rods, or bars across the width or warp of the screen can be the same as or different dimensionally as the wires, rods, or bars longitudinally contained as the weft, shute, or otherwise known to those skilled in the art.

Preferably the wires, rods, or bars are a minimum of approximately 0.020 inches in the narrowest dimension, more preferably are at least approximately 0.030 inches in the narrowest dimension, and most preferably are approximately 0.047 inches in the narrowest dimension. Open areas are dimensionally dependent on the proximal placement of adjacent structural elements and are positionally placed so as to maintain a percent open area of at least about 30%, more preferably above about 40%, and most preferably about 50% or greater.

The optional middle screen 1520 or screens and the inner screen 1530 are structurally similar to that described herein for the outer support screen. Dimensionally and compositionally the screens in the respective layers can be similar or different. The percent open area of the respective screens can be similar or different wherein lesser percent open area will reduce the effective open area of the screen and the least percent open area will be the most restrictive and therefore the delimiting percent open area for the screen assembly. The orientation of any screen relative to other layers of the assembly as well as the dimension and structural composition of the screens can be similar or different.

The inner screen 1530 is preferably a woven wire screen that can be in a square, rectangular, plain, Dutch or similar weave wherein the warp and weft wire diameters can be the same or different dimensionally or compositionally. More preferably the inner screen is a plain square or rectangular weave wire screen wherein the warp and weft wires are similar compositionally and dimensionally and the open area is approximately 30% or greater. Even more preferably, the inner layer screen is plain square or rectangular approximately 30 mesh or larger mesh grade 304 or grade 316 stainless steel wherein the warp and weft wires are of a size to allow at least approximately 30% open area and most preferably are approximately 50% open area. Still more preferred is an inner screen of a plain square or rectangular weave of approximately 50 mesh or greater mesh, with a percent open area of approximately 50% or greater. If incorporated, the middle screen 1520 would be of a mesh intermediate between the support screen 1510 and the inner screen 1530 and can be similar or different structurally, geometrically, compositionally, and orientationally. The two-layer screen is the preferred composition as delineated in the disclosure.

Pellets discharged from the pellet discharge chute 1460 can be sized, sieved, packaged, additionally dried or subjected to further processing such as fluidization or transported for storage or immediate manipulation in accordance with the process requirements. Processes exemplarily included herein are by way of reference and in themselves are not limited for use or application as is known and understood by those skilled in the arts.

The dryer 1400 and screens 1500 can be treated or coated for optimization of performance, reduction of static charge, improved wear resistance, enhancement of corrosion resistance, better abrasion resistance, facilitation of drying or similar process improvement.

The pellets produced by the above described process can be of many shapes, including but not limited to round, square, rectangular, triangular, pentagonal, hexagonal or otherwise geometric in cross-section, star-shaped or other decorative designs and can be the same or different when viewed in a second cross-section perpendicularly to the first. Preferably, the pellets and micropellets are spherical to lenticular for the major or preponderant rotational component. It is additionally preferred that they be free of tailing, sharp points or protrusions that can readily fracture to produce unnecessary fines. Considerations for decorative inclusions to be incorporated into the molded article need realize that such ornamentation of the pellets and micropellets can be compromised in its three-dimensionality by contact, impact, abrasion and/or agitation that arise potentially from the drying process, through conveyance, transport, or through the rotational process itself.

For purposes of clarification and simplification, pellet size hereinafter reflects the dimensions of the die hole used to make them rather than take into consideration any variance due to increases or decreases from die swell or potential shrinkage. Pellet size is not limited and typically ranges from approximately 3.5 mm to approximately 0.5 mm (approximately 0.138 inches to approximately 0.020 inches) or smaller readily encompassing any conception of differentiation between pellet and micropellet. As the pellet size decreases, pressure typically increases and throughput can be necessarily compromised. It is preferred that the major or preponderant rotational component be approximately 1.6 mm (approximately 0.063 inches) or smaller, more preferably is approximately 1.0 mm (approximately 0.040 inches) or smaller, and most preferably is approximately 0.7 mm (approximately 0.028 inches) or smaller. Pellets 0.7 mm (approximately 0.028 inches) and smaller are also described herein as "micropellets". For intricately detailed or small molded articles it is preferred to use approximately 0.35 mm (approximately 0.014 inches) or smaller as herein detailed.

Pellets and micropellets preferably contain less than 1% powder or fines less than approximately 0.007 inches (approximately 0.18 mm) in cross-section, more preferably less than approximately 0.5% fines and most preferably less than approximately 0.1% fines. It has been found that smaller size pellets typically contain fewer fines.

Similarly material and pellet composition is not limited to rotational molding grades as heretofore identified. Historically, for minimal shear molding, the material has typically been represented in a range of melt flow index from 200 grams/10 minutes to 1 gram/10 minutes as evaluated using ASTM D1238 at condition E (190° C. at 2.16 kilogram load) or at the appropriate standard temperature for the material in consideration. More recently the range preferably has been 50 grams/10 minutes to 1 gram/10 minutes and more preferably is 30 grams/10 minutes to 1 gram/10 minutes. The higher the melt flow index typically the lower the average molecular weight range and subsequently the lower the viscosity. For a particular material there will exist a viscosity that is too high to allow reasonable flow for laydown at the conditions useful for rotational molding and similarly will also exist too low a viscosity practicably applicable. Thus the criterion for choice of materials to pelletize in this application is similarly within but not limited to these preferable flow constraints.

The material, and more specifically the pellet, melt temperature constraint is defined by the limitations of the minimal shear molding equipment itself moreso than it is compositionally. The melt temperature should be sufficiently low as to avoid premature reaction or expansion of the material, and should be such that undue volatilization of critical ingredients is similarly avoided. Melting temperatures leading to decomposition or degradation of the material are preferably circumvented as well. Purging of processing, conveyance, storage, and molding equipment can be necessary to minimize this risk regardless of melt or processing temperatures. Inert gases such as nitrogen or carbon dioxide are preferred but in themselves are not limiting. Application in the molding process will be described later in this document.

Physical property constraints would include avoidance of materials of sufficiently low glass transition temperature to be tacky at the processing, transport and conveyance temperatures to avoid potential agglomeration, blockage, or undesirable adhesion to surfaces outside the mold. Brittleness of the material is preferably avoided to minimize or eliminate the risk of fragmentation at any stage of the processing that can lead to undue formation of fines and potential dust and other safety hazards.

Chemical composition of the material, and specifically the pellets, meeting the preferential qualifications heretofore described are not limited to the traditionally marketed rotational molding grades and the subsequent listing in itself is not limiting. Pellets and appropriately micropellets can be made of polyethylenes (PE) including ultra-low density PE, linear low density PE, low density PE, medium density PE, high density PE, cross-linkable polyolefins, polypropylenes and other polyolefins, amorphous or crystalline, and copolymers thereof. Similarly, derivatized polyolefins including alkyl substituted polyolefins, polyvinyl esters and acids and their derivatives, polyvinyl halides, polyvinyl alcohols and their esters, aromatic and substituted-aromatic polyolefins, and their copolymers with these or other polyolefins can be pelletized. Adhesive materials and waxes, typically within the above described compositions are readily pelletized using the process of the instant invention.

Additionally, polyesters, polyamides, polyethers, polycarbonates, and polyurethanes, amorphous or crystalline, and their copolymers are capable of pelletization. Cellulosics and biodegradable polymers are within the scope of the pelletization process as well.

The pellets can incorporate the polymeric components individually or in combination with any or all of the following components or additives in any or all levels of loading such that the constraints of the molding criteria set forth above are accomplished. Such additives can include and are not limited to antioxidants and antioxidant stabilizers or formulations, ultraviolet absorbers and ultraviolet absorption stabilizers or formulations, thermal stabilizers or formulations, extrusional processing aids, flow and rheology aids, melt processing aids, viscosity modifiers, pigments including liquid or solid formulations, pellet coatings, fillers, fibers, structural modifiers, impact modifiers, chemical and/or physical expanding agents and their respective formulations, nucleating agents, rheology modifiers, cross-linking agents or formulations, cross-linking facilitating agents and catalysts or formulations containing such, waxes, tackifiers or detackifiers, and can be solid or liquid or any combination.

Additionally, the pellets for use in molding can be similar or different in composition and can be similar or different dimensionally and/or morphologically. Pellets for use in minimal shear molding of one, two, or more layers, can be used singularly or can be a multiplicity dimensionally, compositionally and/or morphologically for each respective layer.

Although it is preferred to use pellets or micropellets in their appropriate geometries, sizes, and compositions, the invention is not specifically limited to use of pellets in that additives or minor components, solid or liquid, can be included in the molding composition.

The actual design of the minimal shear molding equipment can be found in the representational list of prior art references that in themselves are not intended to be limiting in design or scope or in their application to the instant invention.

Minimal shear molding includes processes that inherently rely on the melting and flowing of materials to generate a molded article on cooling and resetting of that melt flow. Rotational molding and its variant rock-and-roll molding are principle though not limiting examples of this technology. The process rotationally lends itself to one, two, or multiple dimensions, or more appropriately axes, about that that rotation occurs either continuously and circularly or oscillatorily and arcuately relative to its motion as transcribed by the mold and/or the arms of the molding apparatus.

One-dimensional or uniaxial rotation in one example circumscribes an arc of 360° or less and oscillates back and forth in a rock-and-roll motion for the defined distance of that arc that preferentially is less than approximately 360°, more preferentially is less than approximately 270°, and most preferentially is approximately 180° or less. Exemplarily though not limiting, this would be of use in molding a portion of a part in a limited area of the mold. As an alternative, and more typically, one dimensional rotation circumscribes a continuous 360° circle about a singular axis. This is commonly applied to formation of linings in a pipe by way of example and without limitation being implied.

Two-dimensional or biaxial rotation combines the options for one-dimensional rotation as herein described with the same options for a second axis of rotation circumscribing at an angle different than the first axis and preferentially perpendicular or orthogonal to that first rotation axis. Thus one two-dimensional mode involves continuous circulation of one axis 360° about its center with simultaneous rotation of the second and preferably perpendicular axis circularly 360° about its center. Alternatively, the second mode involves continuous rotation circularly 360° about the first axis and oscillatorily about the second and perpendicular axis as similarly as preferentially indicated for the one-dimensional rotation discussion. Yet a third two-dimensional or biaxial mode involves oscillatory rotations as herein described with similar preference of degree of rotation about both perpendicular axes of rotation. The rotation rates and/or the degree of arcuate oscillation can be the same or different for the two axes. Additional detail as to possible limitations or constraints to these rotations will be discussed later in this document.

Multidimensional or multiaxial rotation follows from the discussion of two-dimension rotation as delineated herein in that each respective axis of rotation can be continuous and circular or can be oscillatory and arcuate and can be of the same or different rotation rate and/or degree of arcuate oscillation and each respective axis is oriented differently than each or any of the other axes.

The minimal shear molding apparatus can be heated while rotating within a confined heated area exemplary of that but not limited to an oven and can be electrically, forced air convection, fuel oil, gas, steam, infrared radiation, or oil heated or can be heated by direct open flame applied to the mold or by use of a jacketed mold that can be heated electrically, with steam, or by through-circulation of a heat transfer fluid such as oil or water without any intent of limitation therein. Alternatively, the mold can be variably heated in differing zones or portions.

The mold design can be of suitable metal or ceramic material that can be vented or not in which the size of the vent is reasonable as determined by someone skilled in the art of mold design and mold usage. The depth into the mold the vent pipe penetrates should be such that loss of material is minimized and the vent pipe can be permeably plugged allowing efflux of gas on heating or remain unplugged. The size and design of the mold should be appropriate to the intended article including appropriate allowances for shrinkage of the molding material and any multiplicity of the layering requisite for the intended article. Size of the mold is limited by the part needed and by the minimal shear molding apparatus such that it does not prevent or interfere with the respective rotations in any way. The mold can be provided with inert gas purge and/or direct supply lines as detailed in prior art references cited previously.

Figure 36A:
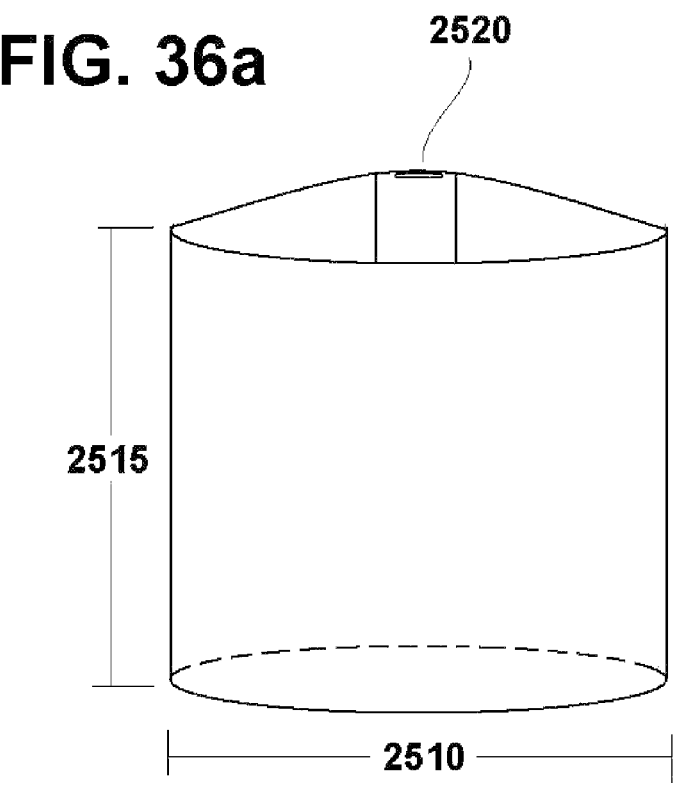
FIG. 36a is a schematic drawing of an exemplary cylindrical tank with vent port.
Figure 36B:
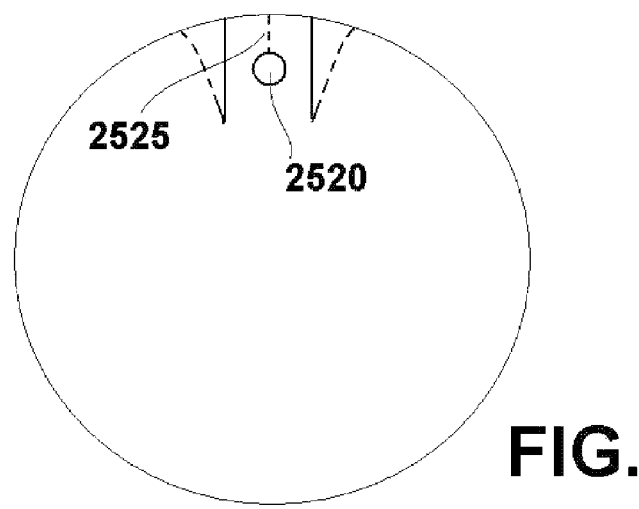
FIG. 36b is a schematic drawing of a top view of the tank in FIG. 36a illustrating the acentric vent position.

It is with this information heretonow disclosed or summarized that discussion of molding process optimization can proceed. Initial evaluations were conducted on a tank as shown in FIGS. 36a and 36b that is approximately 17 inches in height 2515, approximately 9.5 inches (approximately 24.13 centimeters) in diameter 2510, and has a vent 2520 that is approximately 0.5 inches (approximately 1.27 centimeters) in outside diameter and is inset approximately 1 inch (approximately 2.54 centimeters) from the outside wall of the tank. The vent was initially permeably plugged at its innermost end with fiberglass wool. Powder conditions for the tank were defined as an oven temperature of approximately 550° F. (approximately 288° C.), approximately 37 minute heating time, approximately 3.7:1 rotation ratio (major axis to minor axis) with a rotation rate of approximately 6 rpm. Internal air temperature was not measured and cooling on completion of the heating cycle was achieved with fan forced air to a temperature of no more than approximately 100° F. (or approximately 38° C.). Approximately five pounds (2.3 kilograms) of material, powder or micropellet was charged into the mold. Tanks were compared using 35 mesh or approximately 0.020 inch (approximately 0.5 mm) ground powder and approximately 0.014 inch (approximately 0.36 mm) micropellets produced using the apparatus of the instant invention. Evaluations were done on high density polyethylene (HDPE). These preliminary tests for MDPE and HDPE showed that at equivalent temperatures, the powder tanks were satisfactory in terms of color and impact resistance while micropellet tanks were darker in color though satisfactory in impact resistance. Reduction of time for the MDPE and HDPE of approximately 2 to approximately 5 minutes in heating time achieved comparable color to the powder tanks of longer heating duration.

Analogously, a more detailed study was conducted for black-pigmented XLPE, using approximately 0.020 inch (approximately 0.5 mm) ground powder, and micropellets of approximately 0.014 inch, approximately 0.020 inch, and approximately 0.038 inch (approximately 0.36 mm, 0.5 mm, and 0.97 mm, respectively) at oven temperatures of approximately 500° F., 475° F., 450° F., 425° F., 400° F., 375° F., and 350° F. (approximately 260°, 246° C., 232° C., 218° C., 204° C., 191° C., and 177° C. respectively). The heating time was reduced to approximately 27 minutes in accordance with the preliminary testing. It is important to note that conditions other than oven temperature and cure time were also modified to improve the uniformity of the laydown on the inner tank surface such that the rotation ratio was adjusted to 5:1.2 and the rotation ratio was increased to approximately 10 rpm. Melting temperatures for all materials were approximately 240° F. to 250° F. (approximately 116° C. to 121° C.) and cross-linking temperatures for the XLPE are approximately 350° F. or 177° C.

Gel Test Results for XLPE Evaluations

| Sample | Temp. | Powder | 0.014" | 0.020" | 0.038" |
|---|---|---|---|---|---|
| Black | 400° F. | — | 78.0% | 73.3% | 76.8% |
|  | 425° F. | — | 90.1% | 89.2% | 89.9% |
|  | 450° F. | 87.2% | 83.4% | 85.8% | 85.9% |
|  | 475° F. | 87.5% | 90.8% | 90.7% | 88.7% |
|  | 500° F. | 89.3% | 90.5% | 91.4% | 91.5% |

Impact tests for the successfully gelled samples, >70%, all passed the 200 ft.-lb. testing level.

Gel formation and low temperature impact were determined in accordance with ASTM D 1998-97 with the powder standards defined as a minimum of 70% gel formation for XLPE and low temperature impact of a minimum 100 ft-lbs for this tank for all of the cited materials. Values for gel formation of 84% and low temperature impact of 200 ft.-lbs. are preferred for the instant tank.

It is readily apparent from this data that successful molding and cross-linking is achieved at significantly lower temperatures in micropellets than is possible in the standard powder. The quality of the inner surface of the tank actually improves as the temperature of the oven is reduced and as the pellet size increases such that a approximately 0.038 inch (approximately 0.97 mm) pellet at approximately 450° F. or approximately 232° C. is comparable to a powder tank or an approximately 0.014 inch (approximately 0.36 mm) micropellet tank prepared at approximately 500° F. or approximately 260° C. This phenomenon was originally attributed to competition between the rate of melting and laydown as compared with the cross-linking rate in that it appeared both reasonable and logical that cross-linking proceeded more rapidly as the temperature increased resulting in a rougher surface due to the improper laydown.

Gel tests were determined on the micropellets to insure no cross-linking was occurring. All sizes contained no presence of gels.

It has also been observed in making natural and white-pigmented powder XLPE tanks that discoloration decreased as the oven temperature decreased. To evaluate this tanks were similarly prepared as above and measured for gel formation and impact.

Gel Tests for XLPE Powder Tanks

| Sample | Temp. | % Gel |
|---|---|---|
| Black | 400° F. | 0% |
| White | 400° F. | 0% |
| Natural | 400° F. | 41.2% |
| Black | 425° F. | 0% |
| White | 425° F. | 81.0% |
| Natural | 425° F. | 90.4% |
| Black | 450° F. | 87.2% |
| White | 450° F. | 80.1% |
| Natural | 450° F. | 90.9% |
| Black | 475° F. | 87.9% |
| White | 475° F. | 82.7% |
| Natural | 475° F. | 91.2% |
| Black | 500° F. | 89.3% |
| White | 500° F. | 82.5% |
| Natural | 500° F. | 82.9% |

Impact tests for the successfully gelled samples, >70%, all passed the 200 ft.-lb. testing level.

The color of the natural tanks progressively lightened and the inside surface of the white tank lightened from brown to tan to faintly yellow to ultimately white as the oven temperature was reduced from approximately 500° F. to approximately 425° F. (approximately 260° C. to 218° C.).

To investigate the color improvement and the inner surface improvement, testing was conducted on the MDPE at comparable temperature intervals and approximately 0.020 inch, approximately 0.030 inch, and approximately 0.045 inch (approximately 0.5 mm, 0.76 mm, and 1.14 mm, respectively) pellets as well as the standard powder were used to make tanks. Color improved with both reduction of temperature as well as with increase in pellet size and, as had been observed with the XLPE, the inner surface of the larger pellets improved as the temperature decreased resulting in a rough and uneven surface at approximately 500° F. or approximately 260° C. with improvement to a very smooth surface at approximately 425° F. or approximately 218° C. comparable to both the powder tanks and the smaller size pellet tanks. In all cases, the color of the powder tank was considerably more brown than the micropellet tanks and similarly improved as the oven temperature was reduced. Of particular note, the powder tank and the approximately 0.020 inch or approximately 0.5 mm pellet tank failed impact testing at the approximately 100 ft. lb. level while all other testing proved successful.

From these examples it is readily apparent that micropellets can readily be made into tanks using considerably lower oven temperatures, reduced heating times, and can be of varying sizes. Additional testing allowed tanks to be made with larger MDPE pellets including approximately 0.063 inch, approximately 0.090 inch, and even the irregular and cylindrical approximately 0.125 inch (approximately 1.6 mm, 2.3 mm, and 3.2 mm, respectively) as supplied pellets. As the pellet size increased, the laydown of the inner surface was not as uniform and heating times would have to have been increased to effect the requisite uniformity. Conclusively, it is reasonable to work in the approximately 0.020 inch to approximately 0.040 inch (approximately 0.5 mm to 1.0 mm) micropellet sizes with considerably reduced oven temperature and/or reduced heating times.

Figure 37A:
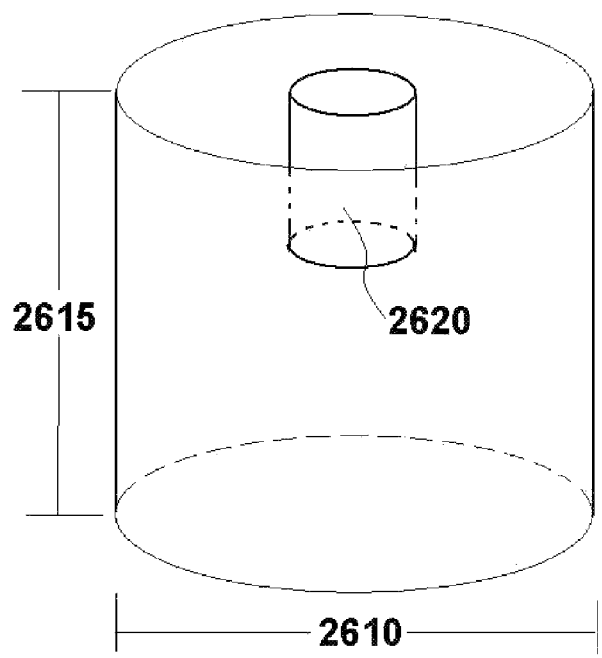
FIG. 37a is an illustration of a second exemplary tank illustrating concentric vent position.
Figure 37B:
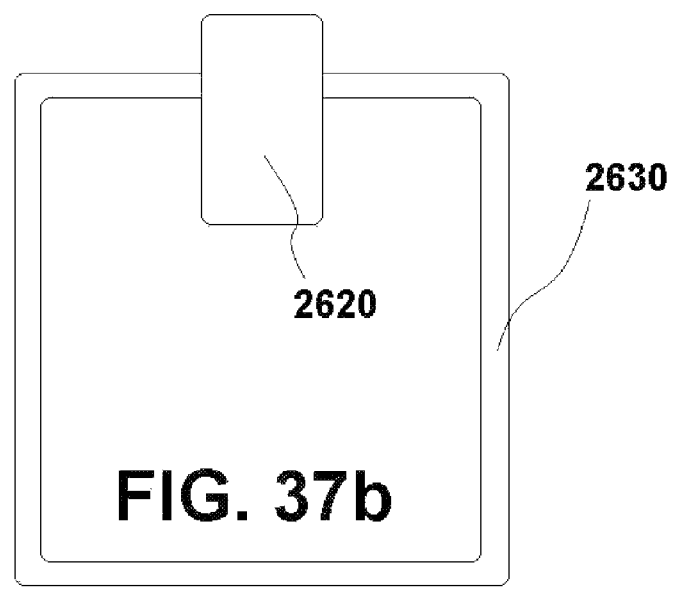
FIG. 37b is a cross-sectional view of the tank in FIG. 37a illustrating through-penetration of vent pipe into internal space of tank.

To investigate venting phenomena, rotation ratio and rotation rate variance a smaller tank illustrated in FIGS. 37a and 37b was used that is approximately 9.5 inches (approximately 24 centimeters) in height 2615, approximately 8.25 inches (approximately 20.1 centimeters) in diameter 2610, and has an approximately 2.25 inch (approximately 5.7 centimeter) vent 2620 centered in the top of the tank. Approximately two pounds (0.9 kilograms) of approximately 0.038 inch or approximately 0.97 mm black XLPE micropellets were charged into the tank and molding conditions were set to monitor failure of tank formation thus the oven temperature was evaluated at approximately 400° F. to as low as approximately 350° F. (approximately 204° C. to 177° C.), heating time was reduced to approximately 25 minutes, rotation ratios were evaluated at 5:1.2, 4:1.2, and 3:1.2 and rotation rates were reduced from the previous 10 rpm or 8 rpm to only approximately 1.75 rpm and ultimately approximately 1.5 rpm. Tanks were successfully prepared with acceptable inner surface laydown. Gel formation was not evaluated as it was not anticipated to pass the requisite 70% following original data. It is important to note that the oversize venting compared to previous testing did not appear to alter the melt or laydown processes. Powder was particularly problematic to use with the vent as it poured out readily without some obstruction whereas the pellets were well-contained as long as the vent length was sufficiently inside the mold that the cumulative volume of pellets was contained in inverted positioning. It was found that the slower the rotation ratio the better the pellets were retained inside and the greater were the losses of the powder. This is in tremendous contrast to the early prior art that reflect rotation rates of 20 rpm to as high as 100 rpm or more that would reasonably be expected to serious compromise and impose significant stress on the minimal shear molding equipment itself. The larger the mold design and thus the requisite molding apparatus, the more significantly detrimental the high rotation ratios and rotation rates become.

Without intending to be bound by any theory it seems reasonable to conclude that higher rotation ratios and higher rotation rates are necessary with the powder to overcome the various flow irregularities that are not issues with the more spherical, easily rollable pellets. These increased rates are anticipated to sufficiently agitate the powders as to keep significant amounts suspended in the air attributing to the improved smoothness and uniformity of the inner surface at the higher temperatures. This latter phenomenon attributes to the excessive loss of powder as it is rigorously tossed throughout the interior of the mold. Only a small amount of powder is initially in contact with the heating surface of the mold and this appears to contribute to the need for longer heating times at higher temperatures. Since the pellets are free to roll, the rotation times and rotation ratios can readily be lowered allowing more intimate and prolonged time in contact with the heating mold surface and the better laydown at the lower temperature. With less agitation, there is reduced proclivity for the micropellets to be tossed or to roll out the vent even when the vent is considerably oversize.

An added benefit to the facility with that the micropellets roll is the ease of conveyance and transport from a storage facility to the molding equipment. Many means of conveyance from pouring by hand to mechanically dumping the pellets, vacuum conveyance, vibratory or belt conveyance to pneumatic conveyance is well within the scope of the instant invention. Such means are often highly problematic for powders because of the various constraints on ease of flow in combination with particularly serious dust and fines generation that is a maintenance, and more importantly, a potentially serious health and safety hazard for both personnel and equipment. Micropellets have significantly reduced or eliminated the dust issues with the proviso that the minimization of brittleness of the compositions chosen adheres to the preferences heretofore describe.

Pellets of various sizes were evaluated for bulk density to determine the further impacts this can have on storage, transport, conveyance, and mold loading. Both powders and micropellets were compared for XLPE and MDPE by way of example.

Table of Approximate Bulk Density Determinations

| Material | Size | Bulk Density |
| --- | --- | --- |
| Black XLPE | powder | 24.14 lb./cu. ft. |
| Black XLPE | 0.014" | 33.59 lb./cu. ft. |
| Black XLPE | 0.020" | 34.35 lb./cu. ft. |
| Black XLPE | 0.038" | 34.69 lb./cu. ft. |
| MDPE | powder | 25.60 lb./cu. ft. |
| MDPE | 0.020" | 36.14 lb./cu. ft. |
| MDPE | 0.030" | 37.24 lb./cu. ft. |
| MDPE | 0.045" | 37.59 lb./cu. ft. |

| Material | Size | Bulk Density |
| --- | --- | --- |
| MDPE | 0.063" | 38.18 lb./cu. ft. |
| MDPE | 0.078" | 36.14 lb./cu. ft. |
| MDPE (as is) | 0.125" | 36.48 lb./cu. ft. |

Bulk determinations are considered approximate as they were made by weighing the powder or pellets in an irregular container and comparing those weights to the weight of water determined for that container with appropriate conversions.

This data illustrates that the bulk density of the micropellets in the preferred size range as previously defined is significantly greater than the comparable powder thus significantly reducing the storage and transportation costs as compared with that powder. Assuming tremendous error in the elementary technique used and for the lesser anticipated possible compaction of the pellets on transport and storage, a conservative savings of approximately 30% seems reasonable. Exemplarily only two silos instead of three would be necessary for storage, or a shipment of ten railcars now requires only seven.

Figure 38A:
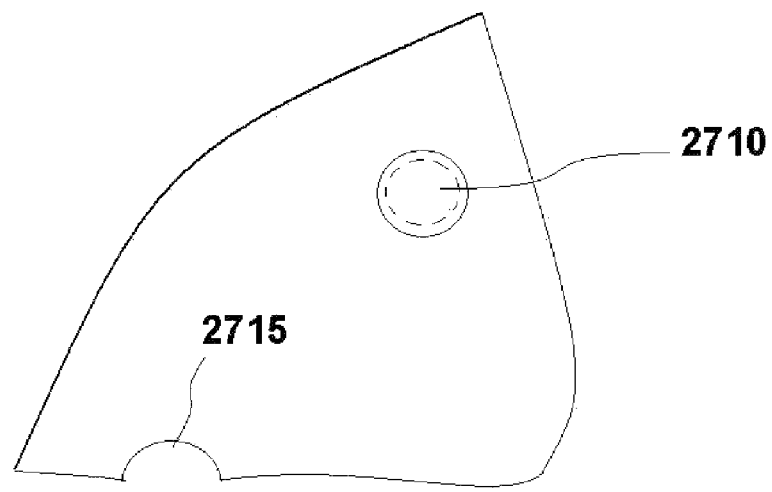
FIG. 38a is a top-view illustration of a molded part showing through-penetrating orifice.
Figure 38B:
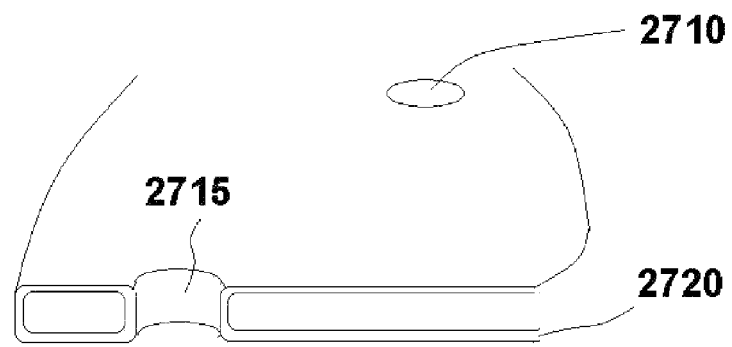

Bulk density and its relation to volume is of significant importance in high surface area molds that have small volumes and therefore often have required more than one charge of powder. FIG. 38a illustrates a cut-away view of a portion of a small unvented mold that is only approximately 0.75 inches or approximately 1.9 centimeters in height with orifices 2710 penetrating completely through the part with a partial cut orifice indicated as 2715. FIG. 38b illustrates a cross-section of this same molded part of molded wall 2720. The charge required approximately 0.5 pounds (approximately 0.2 kilograms) of powder that physically had to be packed into the mold as tightly as possible to obtain a satisfactory part. Micropellets of approximately 0.014 inches, approximately 0.020 inches, or approximately 0.038 inches (approximately 0.36 mm, 0.5 mm, and 0.97 mm respectively) were used alternatively without need for packing or undue challenge as the volume fit comfortably into the mold. Molded articles of the approximately 0.014 inch or approximately 0.36 mm micropellets were at least equivalent to the powder in terms of surface quality, free from pinholes and other surface imperfections. Approximately 0.020 inch and approximately 0.038 inch (approximately 0.5 mm and 0.97 mm respectively) micropellets contained pinholes that were not eliminated by variation of oven temperature, heating time or rotation ratios or rotation rates. This is important as it illustrates the need for specific micropellet sizing as the mold size decrease and/or intricacy increases. Importantly, no compromise was obtained by using the micropellets when chosen to be dimensionally appropriate for the molded article design while being of particular importance in satisfactorily charging the mold in only one portion without packing or other manipulations not accomplished with powders.

Additionally, pinhole reduction was evaluated using micropellets of polypropylene and copolymers of polypropylene and polyethylene. The tank illustrated in FIGS. 36a and 36b was charged with approximately five pounds (approximately 2.3 kilograms) of the respective material and molded at approximately 550° F. or approximately 288° C. for approximately 30 minutes using a rotation ratio of 4:1.2 and a rotation rate of approximately 8 rpm. The result tanks were full of numerous pinholes many of that through-penetrated the wall of the tank. Pinholes are generally thought to be indicative of gas entrapment be that from air or potentially from volatiles that can include moisture. Assumingly, the testing was repeated by charging a comparable amount of respective material in approximately 0.030 inch and approximately 0.020 inch (approximately 0.76 mm and 0.0.5 mm, respectively) micropellets into the mold and heating each at approximately 300° F. (approximately 149° C.) for 15 minutes and then at approximately 550° F. (approximately 288° C.) for approximately 18 minutes keeping rotation ratios and rates the same. The number of pinholes was drastically reduced and ultimately eliminated when the approximately 300° F. or approximately 149° C. first stage heating was increased to approximately 20 minutes followed by the same second stage heating at approximately 550° F. (approximately 288° C.) for approximately 18 minutes similarly rotated. This suggests that volatilization or gas entrapment can be eliminated in a vented mold effectively with reasonably appropriate modification of the molding conditions.

Another particular challenge in molding rotational grade powders is to achieve intricate threading without bubble formation and entrapment in the thinnest portions of the lead-in thread. Such a design is illustrated in FIGS. 39a, 39b, and 39c. FIG. 39a illustrates a side view of such threads 2810 with the encircled area 2805 being the most significant point of concern. Tanks were molded with HDPE powder using standard powder conditions previously described and, as illustrated in FIG. 39b, resulted in large numbers of bubbles in the circled region as indicated, many of that through-penetrated the thin thread leading to a highly irregular ragged appearance. Comparable molding with approximately 0.014 inch (0.36 mm approximately) micropellets of HDPE resulted in a much whiter tank with only a few very minor granules in the thinnest-most portion of the thread with minimal bubbles and no through-penetration as noted in FIG. 39c.

Figure 40A:
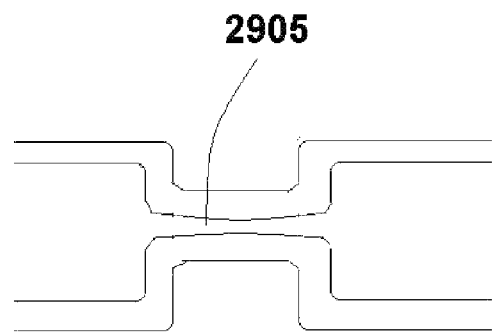
FIG. 40a is a cross-sectional view of a marginal contact kiss-off region of molded tank.
Figure 40B:
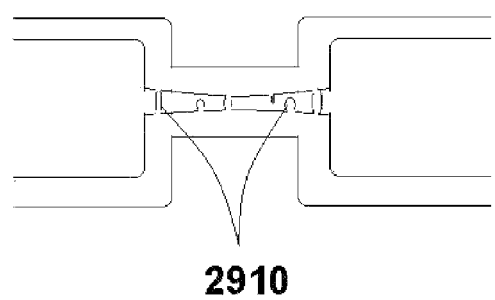
FIG. 40b is a cross-sectional view of a marginal contact kiss-off region of molded tank with bridging.
Figure 40C:
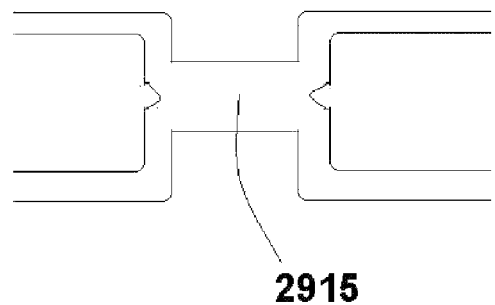
FIG. 40c is a cross-sectional view of an intimate contact kiss-off region of molded tank.

FIG. 40a illustrates a "kiss-off" region in that proximal regions are very close to touching 2905, or physically and intimately touch 2915 as in FIG. 40c. Use of rotational molding grade powders often has proven problematic leading to bridging 2910 that can be small strands or larger columns in that portions of the "kiss-off" region of the two walls touch as shown diagramatically in FIG. 40b. This proved to be equally challenging for micropellets. It was discovered, however, that choice of materials can lead to the desired effect. Molding utilizing HDPE resulted in significant bridging be it in powder or micropellet form and bridging in various "kiss-off" regions was different regardless of the particulate used. However, satisfactory and reproducibly uniform "kiss-off" regions were made throughout molded articles when micropellets or powder of XLPE were used. This presents options wherein material selection and/or particle selection can be chosen such that the desired effect is achieved.

Figure 41A:
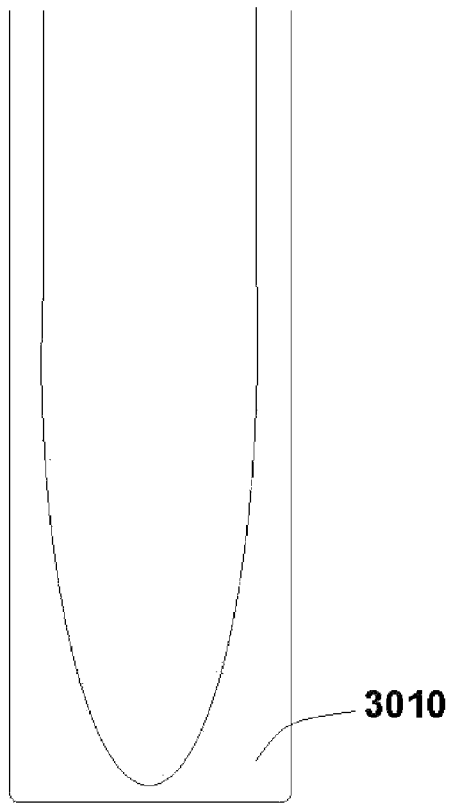
FIG. 41a is a cross-sectional view of an angular deformity typical of powder in molds where the long side is significantly greater in length than is the width.
Figure 41B:
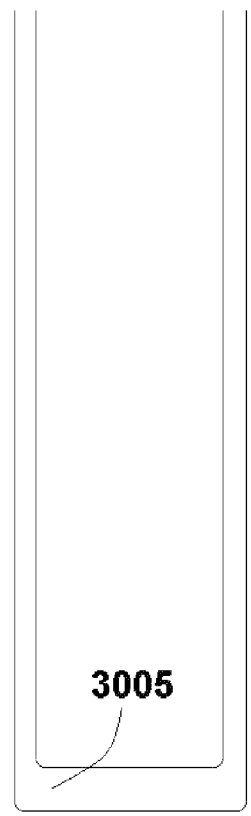
FIG. 41b is a cross-sectional view illustrating minimal angular deformity typical of micropellets in molds where the long side is significantly greater in length than is the width.

Long walls of a molded article that are in close proximity as illustrated in FIGS. 41a and 41b are equally difficult to mold with powders that typically result in uneven wall thickness favoring areas of angles where multiple wall junctures receive more cumulative heating and thus result in thicker walls 4010, FIG. 41a. The use of approximately 0.020 inch (0.5 mm approximately) micropellets of HDPE resulted in a significant lessening of the buildup in the angular deposition 3005 as compared with the powder but use of approximately 0.020 inch or approximately 0.5 mm micropellets of XLPE showed considerable improvement as illustrated in FIG. 41b. Reduction of rotation rates are believed to significantly affect the laydown of micropellets allowing more reasonable time to distribute themselves more uniformly. As detailed above such rate reduction is not workable in the use of powders. This demonstrates a combination of use of micropellets with proper selection of material as potentially impacted by rotation rates as an effective method to achieve otherwise problematic molded articles as compared with powders.

Tanks were also made in accordance with FIG. 36 using materials such as polyethylene terephthalate glycolate (PETG) in approximately 0.025 inch (approximately 0.64 mm) micropellets and mixtures of amorphous and crystalline polyesters coextruded in approximately 0.040 inch (approximately 1.0 mm) micropellets. Both materials are off the shelf non-rotational molding grade materials and were not modified with additives. Molding conditions were at an oven temperature of approximately 550° F. or approximately 288° C. for heating times of 30 minutes utilizing rotation ratios of 4:1.2 and rotation rates of approximately 10 rpm. Charges of seven pounds were used anticipating the volume necessary at higher densities than are typical of the polyolefins cited previously. Both were successfully molded and only minimal shrink rate making removal from the mold a considerable challenge. Tapered mold design is anticipated as a reasonable solution for minimal molded article shrinkage situations as exhibited here. Discussions of the appearance of the tanks will be deferred until decorative effects are discussed later in the instant invention.

In addition to the various tanks described, approximately 0.014 inch (approximately 0.36 mm) micropellets of HDPE were made into approximately 1450 gallon, approximately 3900 gallon, and approximately 12500 gallon (5488 liters, 14762 liters, 47,313 liters, respectively) tanks comparable in design to FIG. 36 and were found to be much smoother on the inside wall of the tank than comparably molded powders as explained due to the various problems with powder flow and laydown. All tanks passed impact testing and showed no ill effects fully loaded with water. No unzipping or vertical splitting of tank walls was observed as would be anticipated if the hoop stresses circumferentially about the tank were not appropriately offset by the structural integrity of the molded tank wall.

Two layer tanks have been molded for many years in that the first powder material that forms the outside wall of the part is charged into an appropriate mold, molded at the appropriate conditions for a particular heating time, optionally cooled or removed from the oven, and then an additional powder material is charged into the mold now containing the first layer. This is subjected to the same or different molding conditions. Alternatively, additional layers can be added as well. Once completed, the mold is removed from the oven, cooled appropriately, and the molded article is removed. The second and any subsequent shots can be introduced manually by opening the mold and physically removing a small portion of the first layer to introduce the second material for molding, or prior art has demonstrated the use of meltable containers within the mold or various designs of "drop boxes" that are mechanically or thermally opened at an appropriate time, temperature, or other appropriately determined point to introduce the material for the next layer.

Traditionally each layer is made from powder that can be the same or different dimensionally and/or compositionally. The layers can also contain reactive or expandable materials of that cross-linking or foam production is exemplary but not limiting. In particular, prior art has also demonstrated use of foams in large pellets introduced simultaneously with powders such that the powder melts initially to laydown a continuous and non-perforated wall inside of that is deposited the foamable material that can form a distinct layer and is then foamed or can be foamed to completely fill the core of the part. Two layer technology exemplarily is valuable to add a barrier layer to a structural element, or to provide decorative enhancement, or to serve as a reinforcing layer for improved structural rigidity, though these examples are not to be construed as limiting.

Two layer or multi-layer tank manufacturing is not without its hazards and safety issues as the second layer material should be added as quickly as possible while rotation and heating are effectively discontinued. The bigger the tank, the greater the heat retained by the molding equipment, the higher the worker is off the floor, the larger is the amount of the material required, the greater is the dust hazard imposed while attempting to add a powder into a hot tank while the heated and potentially hazardous or toxic gases are pouring out of the inside. Tremendous potential for safety hazards and the increased likelihood for accidents are self-evident.

Figure 42A:
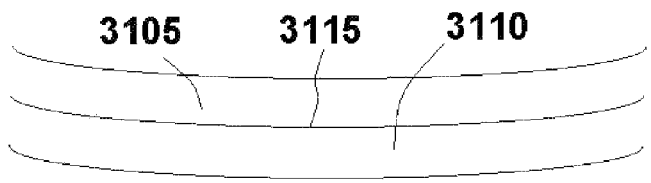
FIG. 42a is a schematic drawing illustrating a segment of a two-layer molded part wall with intimate and uniform contact of layers at interface.

As such it is important to determine the effectiveness of use of micropellets in lieu of at least one material and preferably as replacement for all components. As such black XLPE micropellets and natural MDPE or natural HDPE micropellets were chosen for the important color contrast for ease of visualization and because of the volume of experimentation done on these same materials. FIG. 42a illustrates the idealized two-layer concept with outer layer 3110, inner layer 3105 and interface 3115. Particular problems common to two-layer molding such as a continuous line of very small bubbles or microbubbles 3120 at the material interface, FIG. 42b, or a series of both large and small bubbles, macrobubbles 3125 and microbubbles 3120 respectively, at the interface as in FIG. 42c, or an irregular juncture 3130 at the interface of the two layers as demonstrated in FIG. 42d, or bubbles 3135 entrapped at varying depths and frequency as seen in FIG. 42e. FIG. 42f illustrates a three layer tank with uniform intimate contact at all interfaces. Discussions concerning FIGS. 42a, 42b, 2c, 42d, 42e, and 42f are specifically exclusive of expandable materials. An additional problem is complete or partial separation of the inner layer from the outer layer. Inherent in multiple layer molding is a tendency for the second layer to influence the structural integrity of the initial layer as cooling of the two layers is not necessarily of similar rate and shrinkage rates can similarly be different. As a consequence pockmarks or sinks can develop on the outside wall of the tank. Note most be made here that similar phenomena can occur in one or more layer tanks if the choice of or inappropriate application of mold release is not prudently administered.

Using the tank illustrated in FIGS. 37a and 37b, powder conditions were optimized using approximately two (2) pounds (0.9 kilograms) of black XLPE powder that was charged into the mold and heated at an oven temperature of approximately 425° F. or approximately 218° C. for a heating time of 27 minutes at a rotation ratio of 4:1.2 and a rotation rate of approximately 10 rpm. On completion of the first layering, rotation was temporarily discontinued and the vent pipe optionally was removed. The MDPE powder was added carefully, the vent pipe reinserted if required and rotation was continued at the same oven temperature, rotation ratio, and rotation rate for a heating time of approximately 15 minutes. A cross-linked black outer layer and a well-defined white inner layer were obtained as obviated by cutting the tank in half after cooling and removal from the mold. Layerage was comparable to that ideally illustrated in FIG. 42a.

Previous work as detailed above demonstrated the facility of laydown of approximately 0.014 inch and approximately 0.020 inch (approximately 0.36 mm and 0.5 mm respectively) micropellets at the lowest temperatures with the most uniform surface properties, inside and outside, for the molded tank. Optimization of conditions resulted in a tank comparable to that produced from powder when molding conditions were at an oven temperature of approximately 400° F. (approximately 204° C.) for approximately 19 minutes at a rotation ratio of 4:1.2 and rotation rate of approximately 10 rpm for approximately two (2) pounds of the approximately 0.014 inch or approximately 0.36 mm black XLPE micropellets followed by molding conditions for the inner layer using approximately 1.25 pounds (approximately 0.57 kilograms) of approximately 0.020 inch or approximately 0.5 mm micropellets of MDPE at similar oven temperature, rotation ratio, and rotation rate for approximately 15 minutes. Somewhat higher rotation rates are important in the second layer in particular to minimize the nonuniformity of the laydown. Optimization using approximately 1.25 pounds (approximately 0.57 kilograms) of HDPE in lieu of MDPE yielded comparable results.

Importantly, introduction of the second material was initially done by discontinuing heating and rotation, removing the vent pipe, and charging the second material through a funnel with a layer of insulation around the base to prevent premature heating or melting of the materials being added. Introduction of micropellets was considerably easier than powder and required approximately one-half the time. Additionally, it was discovered that micropellets could easily be poured directly through the vent pipe that significantly reduced the time the heating and rotation had to be discontinued. Optimization as described above utilized the technique of introduction of powder, though challenging and somewhat dusty, as well as the micropellets directly through the vent tube. Such direct addition without manipulation or damaging of the first layer is an important improvement over more standard two-layer molding techniques as revealed hereinabove.

Figure 42B:
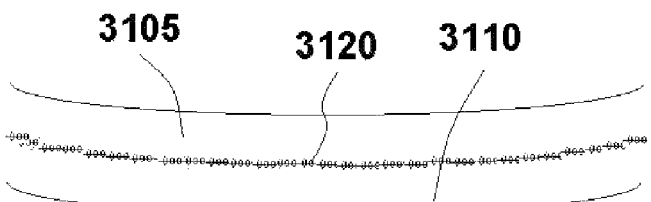
FIG. 42b is a schematic drawing illustrating a segment of a two-layer molded part wall with entrainment of microbubbles at contact interface of two layers.
Figure 42C:
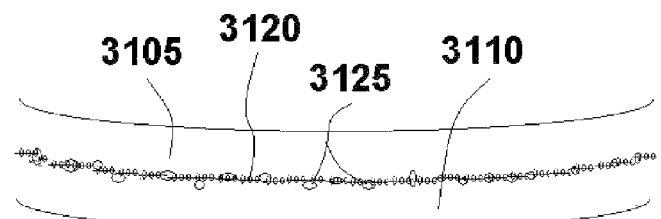
FIG. 42c is a schematic drawing illustrating a segment of a two-layer molded part wall with entrainment of microbubbles in combination with macrobubbles at contact interface of two layers.
Figure 42D:
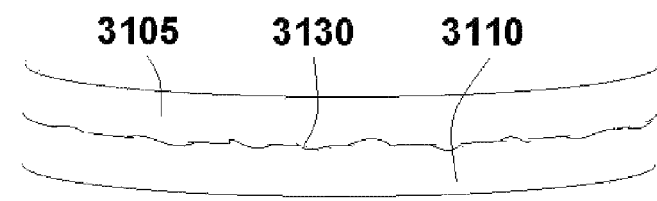
FIG. 42d is a schematic drawing illustrating a segment of a two-layer molded part wall with irregular contact interface of two layers.
Figure 42E:
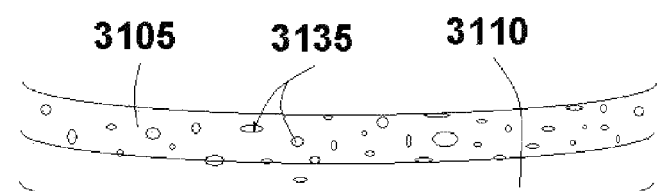
FIG. 42e is a schematic drawing illustrating a segment of a two-layer molded part wall with entrainment of macrobubbles randomly dispersed near interface of two layers and in inner layer.
Figure 42F:
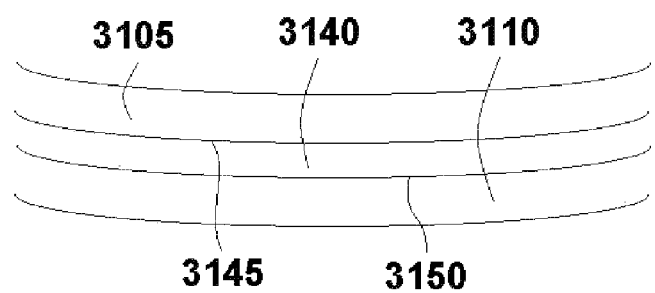
FIG. 42f is a schematic drawing illustrating a segment of a three-layer molded part wall with intimate and uniform contact of layers at interfaces.

Optimization of the two layer process resulted in generation of the various phenomena as described for the illustrations in FIGS. 42a, 42b, 42c, 42d, 42e, and 42f. Without being bound by theory it is believed that the small bubble layer as illustrated in FIG. 42b is an indication of incomplete outgassing, devolatilization, or possible overcure of the first layer. By way of but not limited to an example, if the XLPE material in particular is cross-linked excessively, a liquid layer is observed on the inside surface that is not able to dissipate prior to laydown of the second layer. Large bubbles in concert with smaller bubbles in FIG. 42c is an indication of undercure or incomplete devolatilization or incomplete outgassing of air from the laydown of the material. Thus material that is released after the second layer is trapped can form large bubbles as observed at the interlayer interface. FIG. 42d indicates unevenness of the inner surface of the outside layer prior to laydown of the second or inner layer and FIG. 42e is an indication of serious air entrapment or volatile outgassing or chemical incompatibility of at least some of the ingredients in a particular formulation. This was observed in formulations in that an additional amount of antioxidant package was introduced into the MDPE. Following comparable molding it was observed that bubble phenomena illustrated as in FIGS. 42c and 42e were significantly increased. Further testing revealed that formulations containing the added antioxidant package darkened considerable more than formulations without and as oven temperatures were reduced, tanks made from the MDPE with additive failed impact testing at higher temperatures than did MDPE without the additive. This was considered to be additional indication of the countereffects of the additive package as similarly observed in the two layer evaluations.

With two layer tanks satisfactorily and improvedly accomplished, evaluations of two-layer single-shot molding were pursued. Initially, attempts were made using black XLPE powder and approximately ⅛ inch (approximately 3.2 mm) cylindrical pellets of MDPE as received from the manufacturer. Some tendency to separation was observed in the various attempts but admixture was problematic throughout the wall of the tank with some minor through-penetration of the white MDPE material into the outside layer of the wall. More problematic was the roughness of the inside surface wherein the uniform laydown of the large pellets was not successful. Similar results were achieved by the inventors of the extant invention following this lead though utilizing pellets of MDPE in sizes not commercially available at the time of his testing.

Prior art using powder and pellets for single layer moldings and usage in foamables has favored laydown of the powder first theorizing that the smaller particle sizes more readily absorb heat thus softening sufficient to become slightly tacky and adhere to the wall of the tank before sufficient heat energy has been absorbed by the larger pellet to begin similar softening. It was with this premise work was initiated using the tank illustrated in FIGS. 36a and 36b. Regardless of pellet sizes, it was realized that increased rotation rates facilitated a better laydown of a predominant layer. For a mixture of powder A and micropellet B, slower rotation rates favored laydown of the powder more preferentially whereas with increased rotation rate the pellets became the preferential layer. Similarly, it was reasoned as follows from prior art that lower melting materials would lay down preferentially. Therefore it seemed reasonable to assume that lower melting point and smaller particle size should yield a preponderance of that material in initial laydown. Surprisingly, even this could be countered by increase in rotation rate. It was further reasoned that use of a polyethylene for one layer and a higher melting material such as a polypropylene or polyester for the second layer should yield a predominant lower melting polyethylene layer with later laydown of the higher melting layer. Once again, increase in rotation rates could reverse this depending on that was the smaller particle size. Investigations of similar melting point materials demonstrated that once again the smaller material could be forced to the outside with increased rotation regardless of the melting point. It followed in review that varying rotation rates could similarly reverse laydown of higher melt density material or lower melt density and it was readily observable that pellet density could be reversed putting the lower density material down first or the heavier. Similar conflicts were observed with differing size micropellets in that variance of rotation rates could lay down the largest pellet first or the smaller pellet. Varying rotation ratios had significantly less effect than anticipated and uniform tank formation was found to lie in a very narrow range of rotation ratios. From these initial explorations it became readily apparent that multiple variables including but not limited to particle or pellet size, chemical composition, melting point, softening point, polarity, melt density, particle density, rotation rates, and rotation ratios are all involved in the integral laydown of the layers. It was also realized that the ability of a melting or softening material to lay down on a metal surface required appropriate ability to wet the surface as well as an ability to adhere to the surface. All of the materials cited exemplarily throughout the instant document were investigated in at least one and often many of the aspects as detailed herein.

Separation of any significance was first achieved combining approximately two (2) pounds or approximately 0.9 kilograms of approximately 0.014 inch (approximately 0.36 mm) black XLPE micropellets and approximately 1.25 pounds or approximately 0.57 kilograms of approximately 0.020 inch (approximately 0.5 mm) MDPE micropellets. The oven temperature was approximately 400° F. (approximately 204° C.)

with a heating time of approximately 27 minutes using a rotation ratio of 4:1.2 and a rotation rate of approximately 10 rpm. Rotation rates were lowered sequentially to approximately 6 rpm with additional gain in separation, thus oven temperature was lowered sequentially to approximately 350° F. or approximately 177° C. this time with minimal gain. The rotation rate was again lowered to approximately 4 rpm with an increase in heating time to approximately 35 minutes with additional marginal gain. Variance of rotation ratios was marginal at best and cross-linking could not occur at the lower temperature so the temperature was raised incrementally with subsequent lowering of the rotation rate to obtain a reasonable separation. Replacing the MDPE with HDPE effected even more acceptable separation but resulted in poorer quality of the innermost layer surface and increasing the size of the XLPE facilitated even greater improvement. Acceptable separation was at last achieved using approximately 1.75 pounds of approximately 0.038 inch (approximately 0.8 kilograms and 0.97 mm) black XLPE micropellets and approximately 1.5 pounds (0.68 kilograms approximately) of HDPE at an oven temperature of approximately 450° F. (approximately 232° C.) for a heating time of approximately 30 minutes and then increasing the oven temperature for approximately 7 minutes at approximately 475° F. or approximately 246° C. at a rotation ratio of 4:1.2 at a surprising rotation rate of approximately 1.75 rpm. These conditions were repeated replacing the HDPE with MDPE with even more uniform laydown of the innermost surface area. As a result, no through-penetration of the white MDPE or HDPE to the outside surface of the black XLPE was observed and minor interlayering was observed at the interface of the two materials. The formation of two significant layers in that the outside surface of the tank was cross-linked XLPE and the inner tank surface was either MDPE or HDPE was achievable. An added benefit was found in using less compatible materials such as XLPE and polyester in that the small interlayering at the interface better-facilitated the adhesion of otherwise challengingly incompatible materials.

Advisedly, need for absolute and distinct two-layer or multi-layer moldings wherein barrier properties or other critical avoidance of any penetration of one-layer into the next is best retained in the introduction of each individual layer. Adherence issues are markedly improved by introduction of a meltable adhesive layer to serve as bonding agent between such incompatible or limitedly compatible layers.

The evaluations leading to the formation of significant layerage provides an excellent pathway to achieve extensive decorative effects. Polycarbonates and other clear materials, PETG for example, particularly amorphous materials, make clear molded items into that can be incorporated other shaped pellets or higher melting pellets to introduce unique and unusual decorative items. Admixture of amorphous and crystalline materials of similar melting point such as the polyester described herein resulted in a tank that uniquely contained a swirl pattern that was found to vary in accordance with minor variation of rotation ratios. Unusual pigmentation effects can be achieved by incorporation of that pigment or of different pigments in the components of the varied layering effects described above. Utilization of constrained rock and roll in one or more dimensions allows laydown of one layer in a localized area over that can be layered other materials or similar materials in other colors. Use of fractional melt and low melt index micropellets was found to give exceptionally strong tanks that were permeable to other lower melting materials to make unusually patterned items. Decorative combinations are essentially unlimited by utilizing the uniaxial, biaxial, or multiaxial capacity in combination with continuous and circular rotation with oscillatory and arcuate motion alone or in any combination.

What is claimed is:

1. A minimal shear molding composition for minimal shear molding of two or more layers, the minimal shear molding composition comprising:
    two or more layers, at least one layer of the two or more layers comprising micropellets that are spherical to lenticular in geometric configuration and smaller than 0.7 mm in cross-section;
    wherein each layer is compositionally different.

2. The minimal shear molding composition according to claim 1 further comprising at least one chemical composition selected from the group consisting of polymers, copolymers, additives, and combinations thereof.

3. The minimal shear molding composition according to claim 2, wherein the at least one chemical composition comprises reactive functionalities.

4. The minimal shear molding composition according to claim 2, wherein the at least one chemical composition is selected from the group consisting of amorphous, crystalline, and combinations thereof.

5. The minimal shear molding composition according to claim 3, wherein the reactive functionalities are cross-linkable.

6. The minimal shear molding composition according to claim 3, wherein the reactive functionalities are modified by chemical reaction.

7. The minimal shear molding composition according to claim 2, wherein the polymers are selected from the group consisting of polyolefins, polyamides, polyesters, polycarbonates, polyurethanes, polyethers, cellulosics and copolymers thereof.

8. The minimal shear molding composition according to claim 7, wherein the polyolefins are selected from the group consisting of ultra-low density polyethylene, linear low density polyethylene, low density polyethylene, medium density polyethylene, high density polyethylene, polypropylene, alkyl and aryl substituted vinylics, halogenated and polyhalogenated vinylics, polyvinyl esters, polyvinyl alcohol, and copolymers thereof.

9. The minimal shear molding composition according to claim 2, wherein the additives are selected from the group consisting of rheology modifiers, cross-linking facilitating agents, antioxidant agents, ultraviolet stabilizers, thermal stabilizers, pigments, fillers, fibers, nucleating agents, expanding agents, tackifiers, detackifiers, pellet coatings, plasticizers, waxes, processing aids, and pelletizing aids.

10. The minimal shear molding composition according to claim 9, wherein the additives are single-component formulations.

11. The minimal shear molding composition according to claim 9, wherein the additives are multi-component formulations.

12. The minimal shear molding composition according to claim 1, further comprising pellets, wherein the pellets and micropellets are of different geometric configuration.

13. The minimal shear molding composition according to claim 1, further comprising pellets, wherein the pellets are spherical to lenticular in geometric configuration.

14. The minimal shear molding composition according to claim 1, wherein the micropellets comprise less than 1% of fines, wherein the fines are less than 0.007 inches in cross-section.

15. The minimal shear molding composition according to claim 1, further comprising pellets between 0.7 mm and 3.5 mm in cross-section.

16. The minimal shear molding composition according to claim 15, the pellets between 0.7 mm and 1.6 mm in cross-section.

17. The minimal shear molding composition according to claim 16, the pellets between 0.7 mm and 1.0 mm in cross-section.

18. The minimal shear molding composition according to claim 1, at least one layer of the two or more layers comprising micropellets smaller than 0.6 mm in cross-section.

19. The minimal shear molding composition according to claim 2, further comprising pellets, and comprising one size of at least one of pellets and micropellets of one chemical composition for each of the at least two layers formed.

20. A rotationally molded article comprising:
two or more layers, at least one layer of the two or more layers formed from a rotationally molded composition comprising micropellets that are spherical to lenticular in geometric configuration and smaller than 0.7 mm in cross-section;
wherein each layer is compositionally different.

21. The rotationally molded article according to claim 20, further comprising pellets, wherein the pellets and micropellets comprise less than 1% of fines, wherein the fines are less than 0.007 inches in cross-section.

22. A minimal shear molding composition for minimal shear molding of two or more layers, the minimal shear molding composition comprising:
a first layer comprising at least one of pellets, micropellets, or powders; and
a second layer adjacent to the first layer and comprising at least one of pellets or micropellets;
wherein at least one layer of the two or more layers comprises micropellets that are spherical to lenticular in geometric configuration and smaller than 0.7 mm in cross-section.

23. The minimal shear molding composition according to claim 1, at least one layer of the two or more layers comprising micropellets smaller than 0.5 mm in cross-section.

24. The rotationally molded article according to claim 20, at least one layer of the two or more layers formed from a rotationally molded composition comprising micropellets smaller than 0.6 mm in cross-section.

25. The rotationally molded article according to claim 21, at least one layer of the two or more layers formed from a rotationally molded composition comprising micropellets smaller than 0.5 mm in cross-section.

26. The minimal shear molding composition according to claim 22, at least one layer of the two or more layers comprising micropellets smaller than 0.6 mm in cross-section.

27. The minimal shear molding composition according to claim 22, at least one layer of the two or more layers comprising micropellets smaller than 0.5 mm in cross-section.

28. The minimal shear molding composition according to claim 22, wherein the pellets, micropellets, or powders are compositionally different for each layer, such that each layer is compositionally different.

* * * * *